United States Patent
Hargis et al.

(10) Patent No.: US 11,673,832 B1
(45) Date of Patent: Jun. 13, 2023

(54) COMPOSITIONS, METHODS, AND SYSTEMS RELATED TO MULTI-MODAL DISTRIBUTION OF VATERITE PARTICLES

(71) Applicant: Arelac, Inc., San Jose, CA (US)

(72) Inventors: Craig W Hargis, Campbell, CA (US); Ryan J Gilliam, San Jose, CA (US)

(73) Assignee: Arelac, Inc., San Jose, CA (US)

( * ) Notice: Subject to any disclaimer, the term of this patent is extended or adjusted under 35 U.S.C. 154(b) by 0 days.

(21) Appl. No.: 18/086,081

(22) Filed: Dec. 21, 2022

Related U.S. Application Data

(60) Provisional application No. 63/292,897, filed on Dec. 22, 2021.

(51) Int. Cl.
*C04B 7/345* (2006.01)
*C04B 28/04* (2006.01)

(52) U.S. Cl.
CPC ............ *C04B 7/3453* (2013.01); *C04B 28/04* (2013.01); *C04B 2201/10* (2013.01); *C04B 2201/20* (2013.01)

(58) Field of Classification Search
CPC ... C04B 7/3453; C04B 28/04; C04B 2201/10; C04B 2201/20
See application file for complete search history.

(56) References Cited

U.S. PATENT DOCUMENTS 11,377,363 B2   7/2022   Gilliam et al.
2021/0261428 A1   8/2021   Weiss et al.

*Primary Examiner* — Anthony J Green
(74) *Attorney, Agent, or Firm* — Arelac, Inc.

(57) ABSTRACT

Provided herein are compositions, methods, and systems related to bimodal, trimodal, and/or multi-modal distribution of reactive vaterite cement particles.

20 Claims, 13 Drawing Sheets

Trimodal Distribution of the reactive vaterite cement composition Y

Bimodal Distribution of the reactive vaterite cement composition X

Multi-modal Distribution of the reactive vaterite cement composition Z

Unimodal Distribution of the reactive vaterite cement composition W

COMPOSITIONS, METHODS, AND SYSTEMS RELATED TO MULTI-MODAL DISTRIBUTION OF VATERITE PARTICLES

CROSS-REFERENCE TO RELATED APPLICATION

This application claims benefit of U.S. Provisional Application No. 63/292,897, filed Dec. 22, 2021, which is incorporated herein by reference in its entirety in the present disclosure.

BACKGROUND

Carbon dioxide ($CO_2$) emissions have been identified as a major contributor to the phenomenon of global warming. $CO_2$ is a by-product of combustion, and it creates operational, economic, and environmental problems. It may be expected that elevated atmospheric concentrations of $CO_2$ and other greenhouse gases can facilitate greater storage of heat within the atmosphere leading to enhanced surface temperatures and rapid climate change. In addition, elevated levels of $CO_2$ in the atmosphere may also further acidify the world's oceans due to the dissolution of $CO_2$ and formation of carbonic acid. Reducing potential risks of climate change requires sequestration and avoidance of $CO_2$ from various anthropogenic processes. Concrete is the second most consumed product on earth behind water and cement production accounts for up to 8% of world's $CO_2$ emissions. Cement material needs to be properly selected to be environment friendly, durable, blended for optimum efficiency, and properly controlled to produce consistent concrete strength, workability, finish-ability, and durability.

SUMMARY

Provided herein are compositions, methods, and systems related to preparing compositions comprising bimodal, or multi-modal (e.g., trimodal or higher) distribution of reactive vaterite cement which results in cement, concrete, and mortar materials that are environmentally friendly and high in workability, strength, and durability.

In one aspect, there is provided a cement composition, comprising: a bimodal distribution of reactive vaterite cement comprising reactive vaterite cement A having an average particle size of between about 0.1-10 μm and reactive vaterite cement B having an average particle size of between about 11-50 μm.

In one aspect, there is provided a cement composition, comprising: a trimodal distribution of reactive vaterite cement comprising reactive vaterite cement A having an average particle size of between about 0.1-10 μm; reactive vaterite cement B having an average particle size of between about 11-50 μm; and reactive vaterite cement C having an average particle size of between about 51-100 μm.

In some embodiments of the foregoing aspects, the reactive vaterite cement A is between about 5-95% by weight in the composition and the reactive vaterite cement B is between about 5-95% by weight in the composition. In some embodiments of the foregoing aspects and embodiments, the reactive vaterite cement A is between about 5-75% by weight in the composition and the reactive vaterite cement B is between about 25-95% by weight in the composition. In some embodiments of the foregoing aspects and embodiments, the reactive vaterite cement A is between about 5-40% by weight; the reactive vaterite cement B is between about 25-50% by weight; and the reactive vaterite cement C between about 5-10% by weight. In some embodiments of the foregoing aspects and embodiments, the composition increases packing density of cement paste in water by between about 1-35%. In some embodiments of the foregoing aspects and embodiments, the reactive vaterite cement A in the composition increases packing density of cement paste in water by between about 1-35%. In some embodiments of the foregoing aspects and embodiments, the composition reduces viscosity of cement paste in water by 10-50%. In some embodiments of the foregoing aspects and embodiments, the reactive vaterite cement B and/or C in the composition reduces viscosity of cement paste in water by 10-50%. In some embodiments of the foregoing aspects and embodiments, the bimodal or the trimodal composition provides paste viscosity in water of between about 800-1600 mPa*s. In some embodiments of the foregoing aspects and embodiments, ratio of the reactive vaterite cement A:reactive vaterite cement B is between about 1:20-20:1. In some embodiments of the foregoing aspects and embodiments, the reactive vaterite cement A has a specific surface area of between about 4,000-40,000 $m^2$/kg and the reactive vaterite cement B has a specific surface area of between about 100-6,000 $m^2$/kg. In some embodiments of the foregoing aspects and embodiments, the reactive vaterite cement A and the reactive vaterite cement B (and reactive vaterite cement C in the trimodal or the multi-modal distribution) have spherical morphology.

In some embodiments of the foregoing aspects and embodiments, the composition further comprises Portland cement to form a blended cement composition. In some embodiments of the foregoing aspects and embodiments, the reactive vaterite cement A having a specific surface area of between about 4,000-40,000 $m^2$/kg provides high surface area to nucleate calcium silicate hydrate and dissolve Portland cement in water. In some embodiments of the foregoing aspects and embodiments, the reactive vaterite cement A in the blended composition increases packing density of cement paste in water by between about 1-35%. In some embodiments of the foregoing aspects and embodiments, the reactive vaterite cement B and/or C in the blended composition reduces viscosity of cement paste in water by 10-50%. In some embodiments of the foregoing aspects and embodiments, the bimodal distribution and/or trimodal distribution in the blended cement composition provides paste viscosity in water of between about 800-1600 mPa*s.

In some embodiments of the foregoing aspects and embodiments, the reactive vaterite cement A and/or the reactive vaterite cement B further comprises magnesium oxide. In some embodiments of the foregoing aspects and embodiments, the cement composition further comprises aluminosilicate material. In some embodiments of the foregoing aspects and embodiments, the aluminosilicate material comprises heat-treated clay, natural or artificial pozzolan, shale, granulated blast furnace slag, or combination thereof. In some embodiments of the foregoing aspects and embodiments, the heat-treated clay comprises calcined clay, aluminosilicate glass, calcium aluminosilicate glass, or combination thereof. In some embodiments of the foregoing aspects and embodiments, the pozzolan is selected from the group consisting of fly ash, volcanic ash, and mixture thereof. In some embodiments of the foregoing aspects and embodiments, the cement composition further comprises slag from metal production, Portland cement clinker, calcium aluminate cement clinker, and/or calcium sulfoaluminate cement clinker. In some embodiments of the foregoing aspects and embodiments, the cement composition further comprises a carbonate material comprising limestone, calcium carbonate, magnesium carbonate, calcium magnesium carbonate, or combination thereof. In some embodiments of the foregoing aspects and embodiments, the cement composition further comprises alkali metal accelerator or an alkaline earth metal accelerator. In some embodiments of the foregoing aspects and embodiments, the alkali metal accelerator or the alkaline earth metal accelerator is selected from sodium sulfate, sodium carbonate, sodium nitrate, sodium nitrite, sodium hydroxide, potassium sulfate, potassium carbonate, potassium nitrate, potassium nitrite, potassium hydroxide, lithium sulfate, lithium carbonate, lithium nitrate, lithium nitrite, lithium hydroxide, calcium sulfate, calcium nitrate, calcium nitrite, and combination thereof. In some embodiments of the foregoing aspects and embodiments, the composition comprises by weight between about 5-50% the composition comprising reactive vaterite cement, between about 5-40% heat-treated clay, between about 0-10% limestone, and between about 15-90% Portland cement clinker. In some embodiments of the foregoing aspects and embodiments, the composition after setting and hardening has a 28-day compressive strength of at least 21 MPa. In some embodiments of the foregoing aspects and embodiments, the cement composition further comprises admixture selected from the group consisting of set accelerator, set retarder, air-entraining agent, foaming agent, defoamer, alkali-reactivity reducer, bonding admixture, dispersant, coloring admixture, corrosion inhibitor, dampproofing admixture, gas former, permeability reducer, pumping aid, shrinkage compensation admixture, fungicidal admixture, germicidal admixture, insecticidal admixture, rheology modifying agent, finely divided mineral admixture, pozzolan, aggregate, wetting agent, strength enhancing agent, water repellent, reinforcing material, and combination thereof. In some embodiments of the foregoing aspects and embodiments, the reinforcing material is a fiber selected from the group consisting of zirconia containing material, aluminum, glass, steel, carbon, ceramic, grass, bamboo, wood, fiberglass, synthetic material, and combination thereof. In one aspect, there is provided a concrete mix comprising the aforementioned cement compositions.

In one aspect, there is provided cement paste or cement slurry composition, comprising: reactive vaterite cement A having an average particle size of between about 0.1-10 μm; reactive vaterite cement B having an average particle size of between about 11-50 μm; and optionally reactive vaterite cement C having an average particle size of between about 51-100 μm; water, and interlocking acicular shaped aragonite. In some embodiments of the foregoing aspect, the cement paste or cement slurry composition further comprises Portland cement. In some embodiments of the foregoing aspect and embodiments, the reactive vaterite cement A having a specific surface area of between about 4,000-40,000 $m^2/kg$ provides high surface area to nucleate calcium silicate hydrate and dissolve Portland cement in water. In some embodiments of the foregoing aspect and embodiments, the reactive vaterite cement A and B or reactive vaterite cement A, B, and C provides paste viscosity of between about 800-1600 mPa*s. In some embodiments of the foregoing aspect and embodiments, the cement paste or cement slurry composition further comprises aluminosilicate material, (e.g., heat treated clay) and carboaluminate.

In one aspect, there is provided a cement product, comprising: an interlocking acicular shaped aragonite microstructure. In some embodiments of the foregoing aspect, the interlocking acicular shaped aragonite surrounds one or more voids. In some embodiments of the foregoing aspect and embodiments, the interlocking acicular shaped aragonite surrounding one or more voids forms a honeycomb structure.

In one aspect, there are provided methods of producing a cement composition, comprising: (a) calcining limestone to form a mixture comprising lime and a gaseous stream comprising carbon dioxide; (b) dissolving the mixture comprising lime in a N-containing salt solution to produce an aqueous solution comprising calcium salt; and (c) treating the aqueous solution comprising calcium salt with the gaseous stream comprising carbon dioxide to form a composition comprising a bimodal distribution of reactive vaterite cement comprising reactive vaterite cement A having an average particle size of between about 0.1-10 μm and reactive vaterite cement B having an average particle size of between about 11-50 μm.

In one aspect, there are provided methods of producing a cement composition, comprising: (a) calcining limestone to form a mixture comprising lime and a gaseous stream comprising carbon dioxide; (b) dissolving the mixture comprising lime in a N-containing salt solution to produce an aqueous solution comprising calcium salt; (c) treating the aqueous solution comprising calcium salt with the gaseous stream comprising carbon dioxide to form a composition comprising reactive vaterite cement A having an average particle size of between about 0.1-10 μm; and treating the aqueous solution comprising calcium salt with the gaseous stream comprising carbon dioxide to form a composition comprising reactive vaterite cement B having an average particle size of between about 11-50 μm; (d) mixing the composition comprising reactive vaterite cement A and the composition comprising reactive vaterite cement B to form a composition comprising a bimodal distribution of reactive vaterite cement comprising reactive vaterite cement A having an average particle size of between about 0.1-10 μm and reactive vaterite cement B having an average particle size of between about 11-50 μm.

In one aspect, there are provided methods of producing a cement composition, comprising: (a) dissolving limestone in a N-containing salt solution to produce an aqueous solution comprising calcium salt and a gaseous stream comprising carbon dioxide; and (b) treating the aqueous solution comprising calcium salt with the gaseous stream comprising carbon dioxide to form a composition comprising a bimodal distribution of reactive vaterite cement comprising reactive vaterite cement A having an average particle size of between about 0.1-10 μm and reactive vaterite cement B having an average particle size of between about 11-50 μm.

In one aspect, there are provided methods of producing a cement composition, comprising: (a) dissolving limestone in a N-containing salt solution to produce an aqueous solution comprising calcium salt and a gaseous stream comprising carbon dioxide; (b) treating the aqueous solution comprising calcium salt with the gaseous stream comprising carbon dioxide to form a composition comprising reactive vaterite cement A having an average particle size of between about 0.1-10 μm; and treating the aqueous solution comprising calcium salt with the gaseous stream comprising carbon dioxide to form a composition comprising reactive vaterite cement B having an average particle size of between about 11-50 μm; (c) mixing the composition comprising reactive vaterite cement A and the composition comprising reactive vaterite cement B to form a composition comprising a bimodal distribution of reactive vaterite cement comprising reactive vaterite cement A having an average particle size of between about 0.1-10 μm and reactive vaterite cement B having an average particle size of between about 11-50 μm.

In some embodiments of the foregoing aspects and embodiments, the methods further comprise adding water to the cement composition and transforming the reactive vaterite cement A and the reactive vaterite cement B to interlocking acicular shaped aragonite and/or optionally calcite upon dissolution and re-precipitation in water. In some embodiments of the foregoing aspects and embodiments, the method further comprise setting and hardening of the aragonite and/or the calcite and forming a cement product. In some embodiments of the foregoing aspects and embodiments, the cement product has bulk density of between about 25-200 lb/ft$^3$.

In some embodiments of the foregoing aspects and embodiments, the reactive vaterite cement A and/or the reactive vaterite cement B improves or increases packing density of cement paste by between about 1-35% and/or reduces viscosity of cement paste by 10% or more or between 10-50%.

In one aspect, there are provided systems to form a composition, comprising:

(i) a calcining reactor configured to calcine limestone to form a mixture comprising lime and a gaseous stream comprising carbon dioxide;

(ii) a dissolution reactor operably connected to the calcination reactor configured for dissolving the mixture comprising lime in an aqueous N-containing salt solution to produce an aqueous solution comprising calcium salt;

(iii) a treatment reactor operably connected to the dissolution reactor configured for treating the aqueous solution comprising calcium salt with the gaseous stream comprising carbon dioxide to form a composition comprising a bimodal distribution of reactive vaterite cement comprising reactive vaterite cement A having an average particle size of between about 0.1-10 μm and reactive vaterite cement B having an average particle size of between about 11-50 μm.

In one aspect, there are provided systems to form a composition, comprising:

(i) a calcining reactor configured to calcine limestone to form a mixture comprising lime and a gaseous stream comprising carbon dioxide;

(ii) a dissolution reactor operably connected to the calcination reactor configured for dissolving the mixture comprising lime in an aqueous N-containing salt solution to produce an aqueous solution comprising calcium salt;

(iii) a treatment reactor operably connected to the dissolution reactor configured for treating the aqueous solution comprising calcium salt with the gaseous stream comprising carbon dioxide to form a composition comprising reactive vaterite cement A having an average particle size of between about 0.1-10 μm;

(iv) a treatment reactor operably connected to the dissolution reactor configured for treating the aqueous solution comprising calcium salt with the gaseous stream comprising carbon dioxide to form a composition comprising reactive vaterite cement B having an average particle size of between about 11-50 μm; and (v) a mixing reactor operably connected to the treatment reactors configured for mixing the composition comprising reactive vaterite cement A and the composition comprising reactive vaterite cement B to form a composition comprising a bimodal distribution of reactive vaterite cement comprising reactive vaterite cement A having an average particle size of between about 0.1-10 μm and reactive vaterite cement B having an average particle size of between about 11-50 μm.

In one aspect, there is provided a cement composition, comprising a bimodal distribution of reactive vaterite cement comprising reactive vaterite cement A having an average particle size of between about 0.1-10 μm and reactive vaterite cement B having an average particle size of between about 11-50 μm. In some embodiments of the foregoing aspect, the cement composition further comprises reactive vaterite cement C having an average particle size of between about 51-100 μm in a trimodal distribution. In some embodiments of the foregoing aspect and embodiments, the reactive vaterite cement A is between about 5-95% by weight in the composition and the reactive vaterite cement B is between about 5-95% by weight in the composition. In some embodiments of the foregoing aspect and embodiments, the composition increases packing density of cement paste in water by between about 1-35%. In some embodiments of the foregoing aspect and embodiments, the composition reduces viscosity of cement paste in water by between about 10-50%. In some embodiments of the foregoing aspect and embodiments, the composition provides paste viscosity in water of between about 800-1600 mPa*s. In some embodiments of the foregoing aspect and embodiments, ratio of the reactive vaterite cement A:reactive vaterite cement B is between about 1:20-20:1. In some embodiments of the foregoing aspect and embodiments, the reactive vaterite cement A has a specific surface area of between about 4,000-40,000 m$^2$/kg and the reactive vaterite cement B has a specific surface area of between about 100-6,000 m$^2$/kg. In some embodiments of the foregoing aspect and embodiments, the cement composition further comprises Portland cement to form a blended cement composition. In some embodiments of the foregoing aspect and embodiments, the reactive vaterite cement A having a specific surface area of between about 4,000-40,000 m$^2$/kg provides high surface area to nucleate calcium silicate hydrate and dissolve Portland cement in water. In some embodiments of the foregoing aspect and embodiments, the bimodal distribution in the blended cement composition provides paste viscosity in water of between about 800-1600 mPa*s. In some embodiments of the foregoing aspect, the cement composition further comprises slag from metal production, Portland cement clinker, calcium aluminate cement clinker, and/or calcium sulfoaluminate cement clinker.

In one aspect, there is provided a cement paste or cement slurry composition, comprising reactive vaterite cement A having an average particle size of between about 0.1-10 μm; reactive vaterite cement B having an average particle size of between about 11-50 μm; water; and interlocking acicular shaped aragonite. In some embodiments of the foregoing aspect, the cement paste or cement slurry composition further comprises Portland cement. In some embodiments of the foregoing aspect and embodiments, the reactive vaterite cement A having a specific surface area of between about 4,000-40,000 m$^2$/kg provides high surface area to nucleate calcium silicate hydrate and dissolve Portland cement in water. In some embodiments of the foregoing aspect and embodiments, the reactive vaterite cement A and the reactive vaterite cement B provides paste viscosity of between about 800-1600 mPa*s.

In one aspect, there is provided a method of producing a cement composition, comprising (a) calcining limestone to form a mixture comprising lime and a gaseous stream comprising carbon dioxide; (b) dissolving the mixture comprising lime in a N-containing salt solution to produce an aqueous solution comprising calcium salt; and (c) treating the aqueous solution comprising calcium salt with the gaseous stream comprising carbon dioxide to form a composition comprising a bimodal distribution of reactive vaterite cement comprising reactive vaterite cement A having an average particle size of between about 0.1-10 μm and reactive vaterite cement B having an average particle size of between about 11-50 μm. In some embodiments of the foregoing aspect and embodiments, the method further comprises adding water to the cement composition and transforming the reactive vaterite cement A and the reactive vaterite cement B to interlocking acicular shaped aragonite upon dissolution and re-precipitation in water. In some embodiments of the foregoing aspect and embodiments, the reactive vaterite cement A and/or the reactive vaterite cement B improves packing density of cement paste in water by between about 1-35% and/or reduces viscosity of cement paste in water by between about 10-50%. In some embodiments of the foregoing aspect and embodiments, the method further comprises setting and hardening of the interlocking acicular shaped aragonite and forming a cement product.

DRAWINGS

The features of the invention are set forth with particularity in the appended claims. A better understanding of the features and advantages of the invention will be obtained by reference to the following detailed description that sets forth illustrative embodiments, in which the principles of the invention are utilized, and the accompanying drawings of which:

DESCRIPTION

Figure 1:
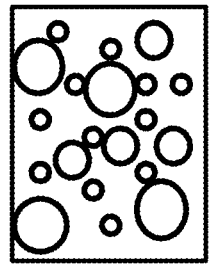
FIG. 1 illustrates some embodiments of the compositions, methods, and systems provided herein related to the unimodal, bimodal, trimodal, or multi-modal distribution of the reactive vaterite cement particles.
Figure 1:
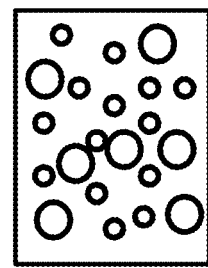
Figure 1:
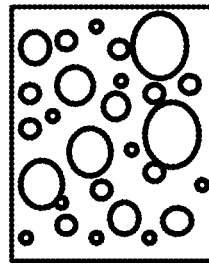
Figure 1:
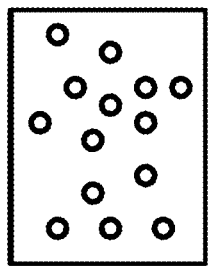

Disclosed herein are unique compositions, methods, and systems related to compositions comprising bimodal and/or multi-modal, e.g., trimodal or more distribution of reactive vaterite cement particles which result in cement, concrete, and mortar materials that are environmentally friendly and high in workability, strength, and durability. The "unimodal distribution" as used herein includes a material which has same median or average particle size, span, or other particle size distribution characteristic. The "bimodal distribution" as used herein includes a combination of two materials which have different median or average particle sizes, spans, or other particle size distribution characteristic that differentiates them. The "trimodal distribution" as used herein includes a combination of three materials which have different median or average particle sizes, spans, or other particle size distribution characteristic that differentiates them. The "multi-modal distribution" as used herein includes a combination of three or more materials which have different median or average particle sizes, spans, or other particle size distribution characteristic that differentiates them.

I. Compositions

Typically, in making cement, concrete or mortar; consistency, setting time, and flow may play an important role. For example, the consistency of the cement mix plays a role in the performance of the mix when poured through reinforcing bars within a form, and in the time taken for the mortar or concrete to set. The consistency test may be performed to estimate the amount of water needed to form a paste of normal consistency, defined as the percentage water requirement of the cement paste. When water is added to the cement, the resulting paste may begin to harden and gain compressive strength. For example only, Vicat needle test may measure the time taken for the cement-water mixture to harden or set. Consistency may be measured by the Vicat test, which provides both initial and final setting times—measurements that can be regarded as the two stiffening states of the cement. The beginning of solidification, or the initial set, may mark the point in time when the paste has become unworkable, and the time taken to completely solidify marks the final set. This needs to be short enough that construction activity can be resumed within a reasonable time after the placement of the concrete. Determination of the consistency can also be carried out by using a Flow Table Test Apparatus. Cement paste may act as a separator for aggregates in mortar, and a lack of sufficient mortar may result in a mixture of limited flow. Such mixtures may be prone to segregation and may be difficult to finish. Therefore, adequate flow of the cement paste, mortar or concrete is needed since if the paste has too much flow it can take too long to set and if the flow is too low then the paste has difficult workability and may cause premature hardening.

Provided herein are the composition, methods and systems related to certain particle distribution mixes of the reactive vaterite cement of different median or average particle sizes to improve reactivity and flow of the cement, the concrete or the mortar. Applicants surprisingly and unexpectedly found that mixing certain particle sizes of the reactive vaterite cement particles results in high reactivity of the cement to set and harden as well as high flow and workability of the cement paste, the concrete, or the mortar (examples provided herein). Applicants also surprisingly found that the particle distribution and the median particle size of the reactive vaterite cement particle in the composition affect the packing density or the bulk density of the cement product such that the cement products with ranges of the packing density or the bulk densities can be formed by using the desired particle distribution and the median particle size of the reactive vaterite cement particle in the composition.

The "reactive vaterite" or "reactive vaterite cement" as used interchangeably herein, includes vaterite material that transforms to the interlocking acicular shaped aragonite and/or calcite and/or carboaluminate during and/or after dissolution-re-precipitation process in water and sets and hardens into the cement product. In some embodiments, the reactive vaterite cement provided herein has spherical morphology. The carboaluminate or the carboaluminate hydrates include, but not limited to, monocarboaluminate, hemicarboaluminate, or combination thereof.

Applicants unexpectedly and surprisingly found that the unimodal particle distribution of the reactive vaterite cement of smaller size particles may result in high reactivity due to high surface area, however, it may also result in rapid setting and hardening of the cement, high viscosity, or low flow. In some embodiments, the unimodal particle distribution of the reactive vaterite cement of larger size particles may result in low reactivity due to low surface area, however, it may result in low viscosity or high flow. The properties of the reactive vaterite cement in the cement paste, concrete or mortar may also interact with other components added to the paste (described herein) affecting its reactivity and flow.

Applicants also unexpectedly and surprisingly found that water demand of the reactive vaterite cement particles of different sizes differs affecting the packing density or the bulk density of the cement product. For example, in the unimodal distribution of the reactive vaterite cement particles, one average size of the spherical vaterite particles may fit together to leave space or voids between the particles. Depending on the particle size of the reactive vaterite cement, the volume of the space or the void can be modified to result in the space or the voids in the resulting cement product with varying packing density or bulk density. Further, increased surface area in the small sized reactive vaterite cement particles may require more water to wet. More water in the paste may result in lower density cement product as the water after evaporation and drying may leave porosity or voids. In some embodiments, when the reactive vaterite cement is a bimodal distribution, the small sized vaterite particles mix in with the large sized vaterite particles, where the small particles may pack between the large particles thereby increasing the solid volume and density hence increasing the packing density or the bulk density of the cement product.

Therefore, the particle size and the distribution of the reactive vaterite cement plays an important role in the workability, the flow, the packing density and compressive strength of the cement product. Provided herein are the composition, methods and systems related to bimodal, trimodal, or multimodal particle distribution of the reactive vaterite cement that provides high packing density yet high flow. While various examples of the bimodal and the multimodal, e.g., trimodal distribution of the reactive vaterite cement particles are provided herein, the other multi-modal distribution including 4, or 5, or 6, or higher distribution of the particle sizes is well within the scope of the invention. It is also to be understood that within the range of the average particle sizes, e.g., the reactive vaterite cement A having an average particle size between about 0.1-10 μm, there may be more than one median particle size distribution. For example only, in Example 4, Table 2 herein, the blend B1 comprises two different median particle sizes of 4 μm and 7 μm within the average particle size of between about 0.1-10 μm. The average particle size or the median particle size are used interchangeably herein.

FIG. 1 illustrates unimodal, bimodal, trimodal, or multimodal particle distribution of the reactive vaterite cement. It is to be understood that FIG. 1 is merely a pictorial representation of particle size mixes and is in no way limiting to the particle size or mix design or the packing density or the flow or any other property of the mixes.

In some embodiments of the cement compositions provided herein, the reactive vaterite cement has spherical particle shape having an average particle size between about 0.1-100 μm (microns). The average particle size (or average particle diameter) may be determined using any conventional particle size determination method, such as, but not limited to, multi-detector laser scattering or laser diffraction or sieving.

In one aspect, there is provided a cement composition, comprising: a bimodal distribution of reactive vaterite cement comprising reactive vaterite cement A having an average particle size of between about 0.1-10 μm, and reactive vaterite cement B having an average particle size of between about 11-50 μm.

It is to be understood that A, B, and C terminology for the reactive vaterite cement is for distinguishing purposes only based on the particle sizes of the reactive vaterite cement.

In one aspect, there is provided a cement composition, comprising: a bimodal distribution of reactive vaterite cement comprising:

reactive vaterite cement A having an average particle size of between about 0.1-10 μm, or between about 0.1-9 μm, or between about 0.1-8 μm, or between about 0.1-7 μm, or between about 0.1-6 μm, or between about 0.1-5 μm, or between about 0.1-4 μm, or between about 0.1-3 μm, or between about 0.1-2 μm, or between about 0.1-1 μm, or between about 1-10 μm, or between about 1-8 μm, or between about 1-5 μm, or between about 1-3 μm, or between about 3-10 μm, or between about 3-8 μm, or between about 4-6 μm, or between about 6-8 μm; and reactive vaterite cement B having an average particle size of between about 11-50 μm, or between about 11-45 μm, or between about 11-40 μm, or between about 11-35 μm, or between about 11-30 μm, or between about 11-25 μm, or between about 11-20 μm, or between about 11-15 μm, or between about 15-50 μm, or between about 15-45 μm, or between about 15-40 μm, or between about 15-35 μm, or between about 15-30 μm, or between about 15-25 μm, or between about 15-20 μm, or between about 20-50 μm, or between about 20-40 μm, or between about 30-50 μm, or between about 30-40 μm, or between about 40-50 μm, or between about 20-30 μm.

In one aspect, there is provided a cement composition, comprising: a bimodal distribution of reactive vaterite cement comprising: reactive vaterite cement A having an average particle size of between about 0.1-10 μm, or between about 0.1-8 μm, or between about 0.1-5 μm, or between about 0.1-2 μm, or between about 0.1-1 μm, or between about 3-10 μm, or between about 4-6 μm, or between about 6-8 μm; and reactive vaterite cement B having an average particle size of between about 11-50 μm, or between about 11-25 μm, or between about 11-20 μm, or between about 15-30 μm, or between about 20-50 μm, or between about 30-50 μm, or between about 40-50 μm.

In one aspect, there is provided a cement composition, comprising: a trimodal distribution of reactive vaterite cement comprising reactive vaterite cement A having an average particle size of between about 0.1-10 μm; reactive vaterite cement B having an average particle size of between about 11-50 µm; and reactive vaterite cement C having an average particle size of between about 51-100 µm.

In one aspect, there is provided a cement composition, comprising: a trimodal distribution of reactive vaterite cement comprising:

reactive vaterite cement A having an average particle size of between about 0.1-10 µm, or between about 0.1-9 µm, or between about 0.1-8 µm, or between about 0.1-7 µm, or between about 0.1-6 µm, or between about 0.1-5 µm, or between about 0.1-4 µm, or between about 0.1-3 µm, or between about 0.1-2 µm, or between about 0.1-1 µm, or between about 1-10 µm, or between about 1-8 µm, or between about 1-5 µm, or between about 1-3 µm, or between about 3-10 µm, or between about 3-8 µm, or between about 4-6 µm, or between about 6-8 µm;

reactive vaterite cement B having an average particle size of between about 11-50 µm, or between about 11-45 µm, or between about 11-40 µm, or between about 11-35 µm, or between about 11-30 µm, or between about 11-25 µm, or between about 11-20 µm, or between about 11-15 µm, or between about 15-50 µm, or between about 15-45 µm, or between about 15-40 µm, or between about 15-35 µm, or between about 15-30 µm, or between about 15-25 µm, or between about 15-20 µm, or between about 20-50 µm, or between about 20-40 µm, or between about 30-50 µm, or between about 30-40 µm, or between about 40-50 µm, or between about 20-30 µm; and reactive vaterite cement C having an average particle size of between about 51-100 µm; between about 51-90 µm; or between about 51-75 µm; or between about 51-60 µm; or between about 60-100 µm; or between about 60-75 µm; or between about 70-100 µm; or between about 70-80 µm; or between about 80-100 µm; or between about 80-90 µm.

In one aspect, there is provided a cement composition, comprising: a trimodal distribution of reactive vaterite cement comprising:

reactive vaterite cement A having an average particle size of between about 0.1-10 µm, or between about 0.1-8 µm, or between about 0.1-5 µm, or between about 0.1-2 µm, or between about 0.1-1 µm, or between about 3-10 µm, or between about 4-6 µm, or between about 6-8 µm;

reactive vaterite cement B having an average particle size of between about 11-50 µm, or between about 11-25 µm, or between about 11-20 µm, or between about 15-30 µm, or between about 20-50 µm, or between about 30-50 µm, or between about 40-50 µm; and reactive vaterite cement C having an average particle size of between about 51-100 µm; or between about 51-75 µm; or between about 60-100 µm; or between about 60-75 µm; or between about 70-80 µm; or between about 80-90 µm.

In one aspect, there is provided a cement composition, comprising: a bimodal distribution of reactive vaterite cement B having an average particle size of between about 11-50 µm; and reactive vaterite cement C having an average particle size of between about 51-100 µm.

In one aspect, there is provided a cement composition, comprising: a bimodal distribution of reactive vaterite cement comprising:

reactive vaterite cement B having an average particle size of between about 11-50 µm, or between about 11-45 µm, or between about 11-40 µm, or between about 11-35 µm, or between about 11-30 µm, or between about 11-25 µm, or between about 11-20 µm, or between about 11-15 µm, or between about 15-50 µm, or between about 15-45 µm, or between about 15-40 µm, or between about 15-35 µm, or between about 15-30 µm, or between about 15-25 µm, or between about 15-20 µm, or between about 20-50 µm, or between about 20-40 µm, or between about 30-50 µm, or between about 30-40 µm, or between about 40-50 µm, or between about 20-30 µm; and reactive vaterite cement C having an average particle size of between about 51-100 µm; between about 51-90 µm; or between about 51-75 µm; or between about 51-60 µm; or between about 60-100 µm; or between about 60-75 µm; or between about 70-100 µm; or between about 70-80 µm; or between about 80-100 µm; or between about 80-90 µm.

In one aspect, there is provided a cement composition, comprising: a bimodal distribution of reactive vaterite cement comprising: reactive vaterite cement B having an average particle size of between about 11-50 µm, or between about 11-25 µm, or between about 11-20 µm, or between about 15-30 µm, or between about 20-50 µm, or between about 30-50 µm, or between about 40-50 µm; and reactive vaterite cement C having an average particle size of between about 51-100 µm; or between about 51-75 µm; or between about 60-100 µm; or between about 60-75 µm; or between about 70-80 µm; or between about 80-90 µm.

In some embodiments, the reactive vaterite cement includes two or more, or three or more, or multi-modal, such as, e.g., or four or more, or five or more, or ten or more, or 20 or more, or 3-20, or 4-10 different sizes of the particles in the composition. For example, the composition may include two or more, or three or more, or between 3-20 particle distribution ranging from 0.1-100 µm sizes of the particles.

Bimodal, trimodal, or multi-modal distributions may allow the surface area to be minimized (due to larger size particles mixed in with the smaller sized particles of the aforementioned ranges), thus allowing a lower liquids/solids mass ratio (water to cement ratio) when composition is mixed with water allowing for higher flow rate. The smaller sized particles with high surface area may provide reactive particles for early reaction to set and harden into the interlocking acicular shaped aragonite form and/or the calcite form and/or the carboaluminate (formed with alumina in other components of the cement, such as, e.g., Portland cement).

In some embodiments of the aforementioned aspects, the cement composition comprises the bimodal distribution of reactive vaterite cement comprising: reactive vaterite cement A between about 5-95% by weight in the composition and the reactive vaterite cement B between about 5-95% by weight in the composition. Accordingly, in some embodiments of the aforementioned aspects, the cement composition comprises the bimodal distribution of reactive vaterite cement comprising: reactive vaterite cement A having an average particle size of between about 0.1-10 µm in between about 5-95% by weight in the composition; and the reactive vaterite cement B having an average particle size of between about 11-50 µm in between about 5-95% by weight in the composition.

In some embodiments of the aforementioned aspects and embodiments, the cement composition comprises the aforementioned bimodal distribution of reactive vaterite cement A and B comprising:

the reactive vaterite cement A between about 5-95% by weight, or between about 5-85% by weight, or between about 5-75% by weight, or between about 5-65% by weight, or between about 5-55% by weight, or between about 5-45% by weight, or between about 5-35% by weight, or between about 5-25% by weight, or between about 5-15% by weight, or between about 15-95% by weight, or between about 15-85% by weight, or between about 15-75% by weight, or between about 15-65% by weight, or between about 15-55% by weight, or between about 15-45% by weight, or between about 15-35% by weight, or between about 15-25% by weight, or between about 25-95% by weight, or between about 25-85% by weight, or between about 25-75% by weight, or between about 25-65% by weight, or between about 25-55% by weight, or between about 25-45% by weight, or between about 25-35% by weight, or between about 35-95% by weight, or between about 35-85% by weight, or between about 35-75% by weight, or between about 35-65% by weight, or between about 35-55% by weight, or between about 35-45% by weight, or between about 50-95% by weight, or between about 50-75% by weight, or between about 60-95% by weight, or between about 60-75% by weight, or between about 75-95% by weight, or between about 80-95% by weight; and the reactive vaterite cement B between about 5-95% by weight, or between about 5-85% by weight, or between about 5-75% by weight, or between about 5-65% by weight, or between about 5-55% by weight, or between about 5-45% by weight, or between about 5-35% by weight, or between about 5-25% by weight, or between about 5-15% by weight, or between about 15-95% by weight, or between about 15-85% by weight, or between about 15-75% by weight, or between about 15-65% by weight, or between about 15-55% by weight, or between about 15-45% by weight, or between about 15-35% by weight, or between about 15-25% by weight, or between about 25-95% by weight, or between about 25-85% by weight, or between about 25-75% by weight, or between about 25-65% by weight, or between about 25-55% by weight, or between about 25-45% by weight, or between about 25-35% by weight, or between about 35-95% by weight, or between about 35-85% by weight, or between about 35-75% by weight, or between about 35-65% by weight, or between about 35-55% by weight, or between about 35-45% by weight, or between about 50-95% by weight, or between about 50-75% by weight, or between about 60-95% by weight, or between about 60-75% by weight, or between about 75-95% by weight, or between about 80-95% by weight.

In some embodiments of the aforementioned aspects and embodiments, the cement composition comprises the aforementioned bimodal distribution of reactive vaterite cement A and B comprising: the reactive vaterite cement A between about 5-75% by weight in the composition and the reactive vaterite cement B between about 25-95% by weight in the composition.

In some embodiments of the aforementioned aspects and embodiments, the cement composition comprises the aforementioned bimodal distribution of reactive vaterite cement A and B comprising:

the reactive vaterite cement A between about 5-75% by weight, or between about 5-65% by weight, or between about 5-55% by weight, or between about 5-45% by weight, or between about 5-35% by weight, or between about 5-25% by weight, or between about 5-15% by weight, or between about 15-75% by weight, or between about 15-55% by weight, or between about 15-35% by weight, or between about 25-75% by weight, or between about 25-55% by weight, or between about 35-75% by weight, or between about 35-55% by weight, or between about 50-75% by weight, or between about 60-75% by weight, and the reactive vaterite cement B between about 25-95% by weight, or between about 25-75% by weight, or between about 25-55% by weight, or between about 35-95% by weight, or between about 35-75% by weight, or between about 35-55% by weight, or between about 50-95% by weight, or between about 50-75% by weight, or between about 60-95% by weight, or between about 60-75% by weight, or between about 75-95% by weight, or between about 80-95% by weight.

In some embodiments of the aforementioned aspects and embodiments, the cement composition comprises the aforementioned trimodal distribution of reactive vaterite cement A, B, and C comprising: the reactive vaterite cement A between about 5-40% by weight in the composition, the reactive vaterite cement B between about 25-50% by weight in the composition, and the reactive vaterite cement C between about 5-10% by weight in the composition.

In some embodiments of the aforementioned aspects and embodiments, the cement composition comprises the trimodal distribution of reactive vaterite cement comprising:

the reactive vaterite cement A having an average particle size of between about 0.1-10 μm in between about 5-40% by weight in the composition, the reactive vaterite cement B having an average particle size of between about 11-50 μm in between about 25-50% by weight in the composition, and the reactive vaterite cement C having an average particle size of between about 51-100 μm in between about 5-10% by weight in the composition.

In some embodiments of the aforementioned aspects and embodiments, the cement composition comprises the reactive vaterite cement A between about 5-40% by weight, or between about 5-35% by weight, or between about 5-25% by weight, or between about 5-15% by weight, or between about 15-40% by weight, or between about 15-25% by weight, or between about 25-40% by weight, or between about 30-40% by weight, the reactive vaterite cement B between about 25-50% by weight, or between about 35-50% by weight, and the reactive vaterite cement C between about 5-10% by weight, or between about 8-10% by weight.

In some embodiments of the aforementioned aspects and embodiments, the cement composition comprises the bimodal distribution of reactive vaterite cement comprising: the reactive vaterite cement B between about 25-50% by weight in the composition, and the reactive vaterite cement C between about 5-10% by weight in the composition. In some embodiments of the aforementioned aspects and embodiments, the cement composition comprises the reactive vaterite cement B between about 25-50% by weight, or between about 35-50% by weight, and the reactive vaterite cement C between about 5-10% by weight, or between about 8-10% by weight in the composition.

In some embodiments of the aforementioned aspects and embodiments, the cement composition comprises the bimodal distribution of reactive vaterite cement comprising: the reactive vaterite cement B having an average particle size of between about 11-50 μm in between about 25-50% by weight in the composition, and the reactive vaterite cement C having an average particle size of between about 51-100 μm in between about 5-10% by weight in the composition.

In some embodiments, the reactive vaterite cement A, B and/or C or the multi-modal composition improves or increases packing density of the cement paste (in water) by between about 1-35%, or between about 1-30%, or between about 1-25%, or between about 1-20%, or between about 1-15%, or between about 1-10%, or between about 1-5%, or between about 5-35%, or between about 5-30%, or between about 5-25%, or between about 5-20%, or between about 5-15%, or between about 5-10%, or between about 10-35%, or between about 10-25%, or between about 10-15%, or between about 20-35%, or between about 25-35%.

As described herein, the larger size particles in the bimodal, trimodal or the multi-modal distribution of the particles may improve the flow of the cement paste, the mortar, or the concrete by allowing a lower liquids/solids mass ratio (or water to cement ratio) when composition is mixed with water.

In some embodiments of the aforementioned aspects and embodiments, the reactive vaterite cement B of the particle size between about 11-50 μm in the composition comprising bimodal, trimodal or the multi-modal distribution as provided herein reduces viscosity (or increases flow or increases slump) of the cement paste or the cement paste in the concrete or the mortar by about 10% or more, or about 20% or more, or about 30% or more, or about 35% or more, or about 40% or more, or about 50% or more, or between about 10-50%, or between about 10-40%, or between about 10-30%, or between about 10-20%, or between about 30-50%, or between about 30-40%.

In some embodiments of the aforementioned aspects and embodiments, the reactive vaterite cement B of the particle size between about 11-50 μm and/or the reactive vaterite cement C of the particle size between about 51-100 μm in the composition comprising bimodal, trimodal or the multi-modal distribution as provided herein reduce viscosity (or increase flow) of the cement paste or the cement paste in the mortar or the concrete by about 10% or more, or about 20% or more, or about 30% or more, or about 35% or more, or about 40% or more, or about 50% or more, or between about 10-50%, or between about 10-40%, or between about 10-30%, or between about 10-20%, or between about 30-50%, or between about 30-40%.

In some embodiments of the aforementioned aspects and embodiments, ratio of the reactive vaterite cement A:reactive vaterite cement B (of the particle sizes and/or the amounts described herein) is between about 1:20-20:1, or between about 1:15-15:1, or between about 1:10-10:1, or between about 1:5-5:1, or between about 1:2-2:1.

In some embodiments of the aforementioned aspects and embodiments, ratio of the reactive vaterite cement B:reactive vaterite cement C (of the particle sizes and/or the amounts described herein) is between about 1:20-20:1, or between about 1:15-15:1, or between about 1:10-10:1, or between about 1:5-5:1, or between about 1:2-2:1.

As described herein, the size of the particles affects the surface area of the reactive vaterite cement particles which in turn affects the water to cement ratio as well as the reactivity of the cement and the flow of the cement paste. In some embodiments, the composition comprises the bimodal distribution of the reactive vaterite cement comprising the reactive vaterite cement A and the reactive vaterite cement B having total specific surface area of between about 100-40,000 $m^2$/kg. In some embodiments, the composition comprises the bimodal distribution of the reactive vaterite cement comprising the reactive vaterite cement A with the average particle size of between about 0.1-10 μm having a specific surface area of between about 4,000-40,000 $m^2$/kg, and the reactive vaterite cement B with the average particle size of between about 11-50 μm having a specific surface area of between about 100-6,000 $m^2$/kg. In some embodiments, the composition comprises the bimodal distribution of the reactive vaterite cement comprising the reactive vaterite cement A having the average particle size of between about 0.1-10 μm having the specific surface area of between about 4,000-40,000 $m^2$/kg, and between about 5-95% by weight in the composition, and the reactive vaterite cement B having the average particle size of between about 11-50 μm having the specific surface area of between about 100-6,000 $m^2$/kg, and between about 5-95% by weight in the composition.

In some embodiments, the composition comprises the bimodal distribution of the reactive vaterite cement comprising the reactive vaterite cement A with the average particle size of between about 0.1-10 μm having the specific surface area of between about 4,000-40,000 $m^2$/kg, or between about 4,000-10,000 $m^2$/kg, or between about 4,000-5,000 $m^2$/kg, or between about 5,000-40,000 $m^2$/kg, or between about 5,000-10,000 $m^2$/kg, or between about 10,000-40,000 $m^2$/kg, or between about 10,000-20,000 $m^2$/kg, or between about 20,000-40,000 $m^2$/kg; and the reactive vaterite cement B with the average particle size of between about 11-50 μm having the specific surface area of between about 100-6,000 $m^2$/kg, or between about 100-5,000 $m^2$/kg, or between about 100-4,000 $m^2$/kg, or between about 100-3,000 $m^2$/kg, or between about 100-2,000 $m^2$/kg, or between about 100-1,000 $m^2$/kg, or between about 100-500 $m^2$/kg, or between about 500-6,000 $m^2$/kg; or between about 500-3,000 $m^2$/kg; or between about 500-1,000 $m^2$/kg; or between about 1,000-6,000 $m^2$/kg; or between about 1,000-4,000 $m^2$/kg; or between about 2,000-6,000 $m^2$/kg; or between about 3,000-6,000 $m^2$/kg; or between about 5,000-6,000 $m^2$/kg.

In some embodiments, the composition comprises the trimodal distribution of the reactive vaterite cement comprising the reactive vaterite cement A with the average particle size of between about 0.1-10 μm having the specific surface area of between about 4,000-40,000 $m^2$/kg; the reactive vaterite cement B with the average particle size of between about 11-50 μm having the specific surface area of between about 100-6,000 $m^2$/kg; and the reactive vaterite cement C with the average particle size of between about 51-100 μm having the specific surface area of between about 50-1000 $m^2$/kg.

In some embodiments, the composition comprises the trimodal distribution of the reactive vaterite cement comprising the reactive vaterite cement A with the average particle size of between about 0.1-10 μm having the specific surface area of between about 4,000-40,000 $m^2$/kg, or between about 4,000-10,000 $m^2$/kg, or between about 4,000-5,000 $m^2$/kg, or between about 5,000-40,000 $m^2$/kg, or between about 5,000-10,000 $m^2$/kg, or between about 10,000-40,000 $m^2$/kg, or between about 10,000-20,000 $m^2$/kg, or between about 20,000-40,000 $m^2$/kg;

the reactive vaterite cement B with the average particle size of between about 11-50 having the specific surface area of between about 100-6,000 $m^2$/kg, or between about 100-5,000 $m^2$/kg, or between about 100-4,000 $m^2$/kg, or between about 100-3,000 $m^2$/kg, or between about 100-2,000 $m^2$/kg, or between about 100-1,000 $m^2$/kg, or between about 100-500 $m^2$/kg, or between about 500-6,000 $m^2$/kg; or between about 500-3,000 $m^2$/kg; or between about 500-1,000 $m^2$/kg; or between about 1,000-6,000 $m^2$/kg; or between about 1,000-4,000 $m^2$/kg; or between about 2,000-6,000 $m^2$/kg; or between about 3,000-6,000 $m^2$/kg; or between about 5,000-6,000 $m^2$/kg; and the reactive vaterite cement C with the average particle size of between about 51-100 having the specific surface area of between about 50-1000 $m^2$/kg; or between about 50-500 $m^2$/kg; or between about 50-200 $m^2$/kg; or between about 100-1000 $m^2$/kg; or between about 100-500 $m^2$/kg; or between about 500-1000 $m^2$/kg.

In some embodiments, the composition comprises the bimodal distribution of the reactive vaterite cement comprising the reactive vaterite cement B with the average particle size of between about 11-50 μm having the specific surface area of between about 100-6,000 m$^2$/kg; and the reactive vaterite cement C with the average particle size of between about 51-100 μm having the specific surface area of between about 50-1000 m$^2$/kg.

In some embodiments, the composition comprises the bimodal distribution of the reactive vaterite cement comprising the reactive vaterite cement B with the average particle size of between about 11-50 having the specific surface area of between about 100-6,000 m$^2$/kg, or between about 100-5,000 m$^2$/kg, or between about 100-4,000 m$^2$/kg, or between about 100-3,000 m$^2$/kg, or between about 100-2,000 m$^2$/kg, or between about 100-1,000 m$^2$/kg, or between about 100-500 m$^2$/kg, or between about 500-6,000 m$^2$/kg; or between about 500-3,000 m$^2$/kg; or between about 500-1,000 m$^2$/kg; or between about 1,000-6,000 m$^2$/kg; or between about 1,000-4,000 m$^2$/kg; or between about 2,000-6,000 m$^2$/kg; or between about 3,000-6,000 m$^2$/kg; or between about 5,000-6,000 m$^2$/kg; and the reactive vaterite cement C with the average particle size of between about 51-100 having the specific surface area of between about 50-1000 m$^2$/kg; or between about 50-500 m$^2$/kg; or between about 50-200 m$^2$/kg; or between about 100-1000 m$^2$/kg; or between about 100-500 m$^2$/kg; or between about 500-1000 m$^2$/kg.

The compositions provided herein comprising bimodal, trimodal, or multi-modal distribution of the reactive vaterite cement may optionally further comprise magnesium oxide. The magnesium oxide may be introduced into the reactive vaterite cement during its production (described further herein) or may be added to the reactive vaterite cement after its production. The magnesium oxide in the compositions comprising reactive vaterite cement has been described in detail, in U.S. Provisional Application No. 63/176,709, filed Apr. 19, 2021, which is incorporated herein by reference in its entirety.

The compositions provided herein comprising bimodal, trimodal, or multi-modal distribution of the reactive vaterite cement may optionally further comprise other one or more components (to form a blend) selected from the group consisting of slag from metal production, Portland cement clinker, calcium aluminate clinker, calcium sulfoaluminate cement clinker, aluminosilicate material, supplementary cementitious material (SCM), and combination thereof. In some embodiments, the cement composition provided herein further comprises Portland cement or Portland cement clinker to form a blended cement composition.

In some embodiments, there is provided a cement composition, comprising the bimodal distribution of reactive vaterite cement comprising reactive vaterite cement A having the average particle size of between about 0.1-10 μm and reactive vaterite cement B having the average particle size of between about 11-50 μm; and Portland cement. In some embodiments, there is provided a cement composition, comprising the bimodal distribution of reactive vaterite cement comprising reactive vaterite cement A having the average particle size of between about 0.1-10 μm and reactive vaterite cement B having the average particle size of between about 11-30 μm; and the Portland cement.

In some embodiments, there is provided a cement composition, comprising the trimodal distribution of reactive vaterite cement comprising reactive vaterite cement A having the average particle size of between about 0.1-10 μm; reactive vaterite cement B having the average particle size of between about 11-50 μm; and reactive vaterite cement C having the average particle size of between about 51-100 μm; and the Portland cement.

Applicants unexpectedly and surprisingly found that the bimodal or the multi-modal (e.g., trimodal) distribution of the reactive vaterite cement particles when blended with the Portland cement results in high reactivity of the cement as well as low paste viscosity or high flow, both of which properties are desirable and hard to attain for the workability, the flow, the packing density, and compressive strength of the cement product. It was found that when the reactive vaterite particles were combined in multi-modal distribution (e.g., as bimodal or trimodal blend) to create blend with the Portland cement, the blend had lower paste viscosity than their surface areas would indicate if the pastes were produced using unimodal reactive vaterite. Lower paste viscosity is related to higher flow in mortar and higher slump in concrete. In some embodiments, the reactive vaterite cement A (e.g., having a specific surface area of between about 4,000-40,000 m$^2$/kg) in the aforementioned blended compositions with the Portland cement, provides high surface area to nucleate calcium silicate hydrate (C-S-H) and dissolve the Portland cement in water.

In some embodiments of the aforementioned blended compositions, the bimodal distribution and/or trimodal distribution in the blended cement composition provides paste viscosity of between about 800-1600 mPa*s; or between about 800-1500 mPa*s; or between about 800-1400 mPa*s; or between about 800-1300 mPa*s; or between about 800-1200 mPa*s; or between about 800-1150 mPa*s; or between about 800-1100 mPa*s; or between about 800-1050 mPa*s; or between about 800-1000 mPa*s; or between about 900-1500 mPa*s; or between about 1000-1500 mPa*s; or between about 1100-1500 mPa*s; or between about 1000-1200 mPa*s.

Additionally, it was also found that the more the surface area in the reactive vaterite cement particles present in the blended cement, the more the surface area was available to nucleate calcium silicate hydrate (C-S-H) of the Portland cement. The more calcium silicate hydrate that nucleated, the faster the Portland cement dissolved and produced strength in the blended cement composite. The acceleratory effect of the reactive vaterite cement particle bimodal or multimodal distribution on the Portland cement hydration may enable the blended cement composite to be produced that has similar workability or paste viscosity or flow to their Portland cement control (100% Portland cement), while providing additional surface area for C-S-H formation and strength enhancement, compared to blended cements produced with the unimodal reactive vaterite.

In some embodiments, there is provided a cement paste or cement slurry composition, comprising reactive vaterite cement A having the average particle size of between about 0.1-10 μm; reactive vaterite cement B having the average particle size of between about 11-50 μm; and optionally reactive vaterite cement C having the average particle size of between about 51-100 μm; water; and the Portland cement. As described herein, the reactive vaterite cement in bimodal or multi-modal distribution upon dissolution and re-precipitation in water forms interlocking acicular shaped aragonite. In some embodiments, there is provided a cement paste or cement slurry composition, comprising reactive vaterite cement A having the average particle size of between about 0.1-10 μm; reactive vaterite cement B having the average particle size of between about 11-50 μm; and optionally reactive vaterite cement C having the average particle size of between about 51-100 μm; water; the Portland cement; and the interlocking acicular shaped aragonite.

In some embodiments, the reactive vaterite cement A (e.g., having a specific surface area of between about 4,000-40,000 m$^2$/kg) provides high surface area to nucleate calcium silicate hydrate and dissolve the Portland cement in water. In some embodiments, there is provided a cement paste or cement slurry composition, comprising reactive vaterite cement A having the average particle size of between about 0.1-10 μm; reactive vaterite cement B having the average particle size of between about 11-50 μm; and optionally reactive vaterite cement C having the average particle size of between about 51-100 μm; water; the Portland cement; the interlocking acicular shaped aragonite; and the calcium silicate hydrate.

In some embodiments, the reactive vaterite cement A and B or reactive vaterite cement A, B, and C provides paste viscosity of between about 800-1600 mPa*s in the cement paste or the cement slurry compositions. In some embodiments, there is provided a cement paste or cement slurry composition, comprising reactive vaterite cement A having the average particle size of between about 0.1-10 μm; reactive vaterite cement B having the average particle size of between about 11-50 μm; and optionally reactive vaterite cement C having the average particle size of between about 51-100 μm; water; the Portland cement; the interlocking acicular shaped aragonite; and the calcium silicate hydrate, wherein the cement paste or the cement slurry has the paste viscosity of between about 800-1600 mPa*s.

As used herein, "supplementary cementitious material" (SCM) includes SCM as is well known in the art. In some embodiments, the SCM comprises slag, fly ash, silica fume, or combination thereof. The aluminosilicate material includes any material that is rich in aluminate and silicate minerals. These materials can be natural or man-made. In some embodiments, the aluminosilicate material comprises heat-treated clay, e.g., calcined clay, natural or artificial pozzolan, shale, granulated blast furnace slag, or combination thereof. In some embodiments, the natural or artificial pozzolan is selected from the group consisting of fly ash, volcanic ash, or mixture thereof. Pozzolan may be naturally available and comprise fine particles of siliceous and aluminous material that in presence of water may react with Ca ions in the reactive vaterite to form cementitious materials. In some embodiments, the heat-treated clay includes, but not limited to, calcined clay, aluminosilicate glass, calcium aluminosilicate glass, or combination thereof.

Various other components that can be blended in the compositions provided herein, include but not limited to, carbonate material, such as limestone or calcium carbonate or magnesium carbonate or calcium magnesium carbonate; alkali metal accelerator; or alkaline earth metal accelerator etc. The alkali metal or the alkaline earth metal accelerator includes, but not limited to any alkali metal or an alkaline earth metal salt, such as e.g., sodium sulfate, sodium carbonate, sodium nitrate, sodium nitrite, sodium hydroxide, potassium sulfate, potassium carbonate, potassium nitrate, potassium nitrite, potassium hydroxide, lithium sulfate, lithium carbonate, lithium nitrate, lithium nitrite, lithium hydroxide, calcium sulfate (or gypsum), calcium nitrate, calcium nitrite, and combination thereof.

In some embodiments, the compositions provided herein comprising bimodal, trimodal, or multi-modal distribution of the reactive vaterite cement may further comprise a magnesium and/or strontium cation. In some embodiments, the magnesium and/or strontium cation may facilitate the transformation of the reactive vaterite into the interlocking acicular shaped aragonite (described further herein). In some embodiments, the magnesium and/or strontium cation may be present in the form of a salt including, but not limited to, magnesium and/or strontium halide, or magnesium and/or strontium sulfate, or magnesium and/or strontium nitrate etc. In some embodiments, the magnesium and/or strontium salt is selected from the group consisting of magnesium carbonate, magnesium halide (fluoride, chloride, iodide, or bromide), magnesium hydroxide, magnesium silicate, magnesium sulfate, magnesium nitrate, magnesium nitrite, strontium carbonate, strontium halide, strontium hydroxide, strontium silicate, strontium sulfate, strontium nitrate, strontium nitrite, and combination thereof.

In some embodiments, the magnesium and/or strontium is present in range of between about 0.05-0.1 M. In some embodiments of the aforementioned methods and systems aspects and embodiments, amount of the magnesium salt and or the strontium salt used is between about 0-1M; or between about 0-0.5M; or between about 0.01-1M; or between about 0.01-0.5M; or between about 0.05-1M; or between about 0.05-0.5M; or between about 0.05-0.1M; or between about 0.1-1M; or between about 0.1-0.5M. In some embodiments of the aforementioned methods and systems aspects and embodiments, ratio of the magnesium salt to the strontium salt is between about 2:1 or about 1.5:1 or between about 1:1.

In some embodiments of the foregoing aspects and embodiments, the compositions provided herein comprising bimodal, trimodal, or multi-modal distribution of the reactive vaterite cement may further comprise less than 30% by weight aragonite; or less than 25% by weight aragonite; or less than 20% by weight aragonite; or less than 10% by weight aragonite; or less than 5% by weight aragonite; or less than 1% by weight aragonite; or between 1-10% by weight; or between 1-30% by weight.

In some embodiments of the foregoing aspects and embodiments, the compositions provided herein comprising bimodal, trimodal, or multi-modal distribution of the reactive vaterite cement may further comprise aluminosilicate material, e.g. calcined or heat treated clay; and optionally limestone and/or alkali metal or alkaline earth metal accelerator, and further comprises between 5-90% by weight of the Portland cement clinker; or between 5-80% by weight; or between 5-70% by weight; or between 5-60% by weight; or between 5-50% by weight; or between 5-40% by weight; or between 5-30% by weight; or between 5-20% by weight; or between 5-10% by weight; or between 10-90% by weight; or between 10-80% by weight; or between 10-70% by weight; or between 10-60% by weight; or between 10-50% by weight; or between 10-40% by weight; or between 10-30% by weight; or between 10-20% by weight; or between 20-90% by weight; or between 20-80% by weight; or between 20-70% by weight; or between 20-60% by weight; or between 20-50% by weight; or between 20-40% by weight; or between 20-30% by weight; or between 30-90% by weight; or between 30-80% by weight; or between 30-70% by weight; or between 30-60% by weight; or between 30-50% by weight; or between 30-40% by weight; or between 40-90% by weight; or between 40-80% by weight; or between 40-70% by weight; or between 40-60% by weight; or between 40-50% by weight; or between 50-90% by weight; or between 50-80% by weight; or between 50-70% by weight; or between 50-60% by weight; or between 60-90% by weight; or between 60-80% by weight; or between 60-70% by weight; or between 70-90% by weight; or between 70-80% by weight; or between 80-90% by weight of the Portland cement clinker.

In some embodiments of the compositions provided herein, the composition comprises between about 0.1-5% by weight alkali metal or alkaline earth metal accelerator, e.g., lithium carbonate; or between about 0.1-4% by weight; or between about 0.1-3% by weight; or between about 0.1-2% by weight; or between about 0.1-1% by weight; or between about 0.1-0.5% by weight; or between about 1-5% by weight; or between about 1-4% by weight; or between about 1-3% by weight; or between about 1-2% by weight; or between about 2-5% by weight; or between about 2-4% by weight; or between about 2-3% by weight; or between about 3-5% by weight; or between about 3-4% by weight; or between about 4-5% by weight.

In some embodiments of the foregoing aspects and embodiments, the composition may include a blend of by weight about 75% OPC or Portland cement clinker and between about 1-25% of the bimodal or the trimodal distribution of the reactive vaterite cement as provided herein; or about 80% OPC or Portland cement clinker and between about 1-20% of the bimodal or the trimodal distribution of the reactive vaterite cement; or about 85% OPC or Portland cement clinker and between about 1-15% of the bimodal or the trimodal distribution of the reactive vaterite cement; or about 90% OPC or Portland cement clinker and between about 1-10% of the bimodal or the trimodal distribution of the reactive vaterite cement; or about 95% OPC or Portland cement clinker and between about 1-5% of the bimodal or the trimodal distribution of the reactive vaterite cement. The amounts and/or the particle sizes and/or the surface area of the distribution of the particles in the reactive vaterite cement have all been described herein and all of them apply to various blends described herein. In some embodiments of the foregoing aspects and embodiments, the remaining amount in the composition may include one or more of the aluminosilicate materials, and optionally the carbonate material and the alkali metal or alkaline earth metal accelerator.

In some embodiments of the reactive vaterite cement compositions provided herein, the compositions comprise by weight between about 5-50% reactive vaterite cement A and B or reactive vaterite cement A, B, and C or reactive vaterite cement B and C (particle size, amount, ratio, and/or surface area are all described herein), between about 5-40% heat-treated clay, between about 0-10% limestone, and between about 15-90% Portland cement clinker.

In some embodiments of the reactive vaterite cement compositions provided herein, the compositions comprise by weight between about 10-50% reactive vaterite cement A and B or reactive vaterite cement A, B, and C or reactive vaterite cement B and C (particle size, amount, ratio, and/or surface area are all described herein), between about 10-35% aluminosilicate material, between about 0-10% carbonate material, and between about 15-90% Portland cement clinker.

In some embodiments of the reactive vaterite cement compositions provided herein, the compositions comprise by weight between about 10-50% reactive vaterite cement A and B or reactive vaterite cement A, B, and C or reactive vaterite cement B and C (particle size, amount, ratio, and/or surface area are all described herein), between about 10-35% aluminosilicate material, between about 0-10% carbonate material, between about 15-90% Portland cement clinker, and between about 0.1-5% alkali metal or alkaline earth metal accelerator.

In some embodiments of the reactive vaterite cement compositions provided herein, the compositions comprise by weight between about 10-50% reactive vaterite cement A and B or reactive vaterite cement A, B, and C or reactive vaterite cement B and C (particle size, amount, ratio, and/or surface area are all described herein), between about 10-35% calcined clay, between about 0-10% limestone, and between about 15-90% Portland cement clinker.

In some embodiments of the reactive vaterite cement compositions provided herein, the compositions comprise by weight between about 10-50% reactive vaterite cement A and B or reactive vaterite cement A, B, and C or reactive vaterite cement B and C (particle size, amount, ratio, and/or surface area are all described herein), between about 10-35% calcined clay, between about 0-10% limestone, between about 15-90% Portland cement clinker, and between about 0.1-5% gypsum or lithium carbonate.

In some embodiments of the reactive vaterite cement compositions provided herein, the compositions comprise by weight between about 10-20% reactive vaterite cement A and B or reactive vaterite cement A, B, and C or reactive vaterite cement B and C (particle size, amount, ratio, and/or surface area are all described herein), between about 10-25% calcined clay, between about 0-10% limestone, between about 25-55% Portland cement clinker, and between about 2-5% gypsum or lithium carbonate.

In some embodiments of the reactive vaterite cement compositions provided herein, the compositions comprise by weight between about 25-35% reactive vaterite cement A and B or reactive vaterite cement A, B, and C or reactive vaterite cement B and C (particle size, amount, ratio, and/or surface area are all described herein), between about 25-35% calcined clay, between about 0-5% limestone, between about 25-35% Portland cement clinker, and between about 2-5% gypsum or lithium carbonate.

In some embodiments of the reactive vaterite cement composition provided herein after setting and hardening has a 28-day compressive strength of at least 21 MPa.

In some embodiments, the reactive vaterite cement composition provided herein in wet or dried form may further include one or more plasticizers. Examples of plasticizer include, without limitation, polycarboxylate based superplasticizer, MasterGlenium 7920, MasterGlenium 7500, Fritz-Pak Supercizer PCE, sodium salt of poly(naphthalene sulfonic acid), Fritz-Pak Supercizer 5, and the like.

In some embodiments, the compositions provided herein comprising bimodal, trimodal, or multi-modal distribution of the reactive vaterite cement may further include one or more admixtures to impart one or more properties to the product including, but not limited to, strength, flexural strength, compressive strength, porosity, thermal conductivity, etc. The amount of admixture that is employed may vary depending on the nature of the admixture. In some embodiments, the amount of the one or more admixtures ranges from 0.1 to 10% w/w. Examples of the admixture include, but not limited to, set accelerator, set retarder, air-entraining agent, foaming agent, defoamer, alkali-reactivity reducer, bonding admixture, dispersant, coloring admixture, corrosion inhibitor, damp-proofing admixture, gas former, permeability reducer, pumping aid, shrinkage compensation admixture, fungicidal admixture, germicidal admixture, insecticidal admixture, rheology modifying agent, finely divided mineral admixture, pozzolan, aggregate, wetting agent, strength enhancing agent, water repellent, reinforced material such as fiber, and any other admixture. When using an admixture, the reactive vaterite cement composition to which the admixture raw material is introduced, is mixed for sufficient time to cause the admixture raw material to be dispersed relatively uniformly throughout the composition.

In some embodiments, the compositions provided herein comprising bimodal, trimodal, or multi-modal distribution of the reactive vaterite cement may further include reinforcing material such as fiber, e.g., where fiber-reinforced product is desirable. Fiber can be made of zirconia containing material, aluminum, glass, steel, carbon, ceramic, grass, bamboo, wood, fiberglass, or synthetic material, e.g., polypropylene, polycarbonate, polyvinyl chloride, polyvinyl alcohol, nylon, polyethylene, polyester, rayon, high-strength aramid, (i.e., Kevlar®), or mixture thereof.

In one aspect, there is provided concrete mix comprising any of the foregoing compositions comprising bimodal, trimodal, or multi-modal distribution of the reactive vaterite cement. The "concrete" as used herein includes water, aggregate (e.g., rock, sand, or gravel) and the cement compositions provided herein.

In one aspect, there is provided mortar mix comprising any of the foregoing compositions comprising bimodal, trimodal, or multi-modal distribution of the reactive vaterite cement. The "mortar" as used herein includes water, sand, and the cement compositions provided herein.

In one aspect, there is provided cement paste or cement slurry composition, comprising: reactive vaterite cement A having an average particle size of between about 0.1-10 μm; reactive vaterite cement B having an average particle size of between about 11-50 μm; and water, and optionally interlocking acicular shaped aragonite, calcite, carboaluminate, or combination thereof. In one aspect, there is provided cement paste or cement slurry composition, comprising: reactive vaterite cement A having an average particle size of between about 0.1-10 μm; reactive vaterite cement B having an average particle size of between about 11-50 μm; water, and interlocking acicular shaped aragonite, calcite, carboaluminate, or combination thereof. In one aspect, there is provided cement paste or cement slurry composition, comprising: reactive vaterite cement A having an average particle size of between about 0.1-10 μm; reactive vaterite cement B having an average particle size of between about 11-50 μm; water, and interlocking acicular shaped aragonite.

In one aspect, there is provided cement paste or cement slurry composition, comprising: reactive vaterite cement A having an average particle size of between about 0.1-10 μm; reactive vaterite cement B having an average particle size of between about 11-50 μm; reactive vaterite cement C having an average particle size of between about 51-100 μm; water, and optionally interlocking acicular shaped aragonite, calcite, carboaluminate, or combination thereof. In one aspect, there is provided cement paste or cement slurry composition, comprising: reactive vaterite cement A having an average particle size of between about 0.1-10 μm; reactive vaterite cement B having an average particle size of between about 11-50 μm; reactive vaterite cement C having an average particle size of between about 51-100 μm; water, and interlocking acicular shaped aragonite, calcite, carboaluminate, or combination thereof. In one aspect, there is provided cement paste or cement slurry composition, comprising: reactive vaterite cement A having an average particle size of between about 0.1-10 μm; reactive vaterite cement B having an average particle size of between about 11-50 μm; reactive vaterite cement C having an average particle size of between about 51-100 μm; water, and interlocking acicular shaped aragonite.

In one aspect, there is provided cement paste or cement slurry composition, comprising: reactive vaterite cement B having an average particle size of between about 11-50 μm; reactive vaterite cement C having an average particle size of between about 51-100 μm; water, and optionally interlocking acicular shaped aragonite, calcite, carboaluminate, or combination thereof. In one aspect, there is provided cement paste or cement slurry composition, comprising: reactive vaterite cement B having an average particle size of between about 11-50 μm; reactive vaterite cement C having an average particle size of between about 51-100 μm; water, and interlocking acicular shaped aragonite, calcite, carboaluminate, or combination thereof. In one aspect, there is provided cement paste or cement slurry composition, comprising: reactive vaterite cement B having an average particle size of between about 11-50 μm; reactive vaterite cement C having an average particle size of between about 51-100 μm; water, and interlocking acicular shaped aragonite.

In some embodiments, the aforementioned cement paste or cement slurry further comprises one or more of other components described herein. In embodiments where the cement composition further comprises Portland cement or Portland cement clinker, and/or aluminosilicate material, the cement paste and/or the slurry further comprises carboaluminate.

II. Methods and Systems

Methods and Systems to Form Cement Products

Disclosed herein are methods and systems to form the cement products comprising the interlocking acicular shaped aragonite, calcite, and/or carboaluminate. Also disclosed herein are the methods and systems to form the cement products with varying bulk densities comprising the interlocking acicular shaped aragonite, calcite, and/or carboaluminate. The "interlocking acicular shaped aragonite" as used herein, includes acicular shaped aragonite that randomly interlock. In some embodiments, the acicular shaped aragonite grows from the surface of the reactive vaterite during the transformation and in some embodiments, due to the bimodal or the multi-modal (e.g., the trimodal) distribution of the reactive vaterite cement particles results in interlocking of the acicular shaped aragonite. In some embodiments, the unique interlocking acicular shaped aragonite provides high shear resistance thereby providing high compressive strength and durability.

In some embodiments of the methods and systems described herein, the composition results in the formation of the cement products with unique morphology of the interlocking acicular shaped aragonite microstructure that provides unique lightness, durability, and strength to the cement products. For example, the interlocking acicular shaped aragonite structure of the aggregates has been illustrated, for example, in FIG. 5 and FIG. 6 and is described in Examples herein.

Figure 6:
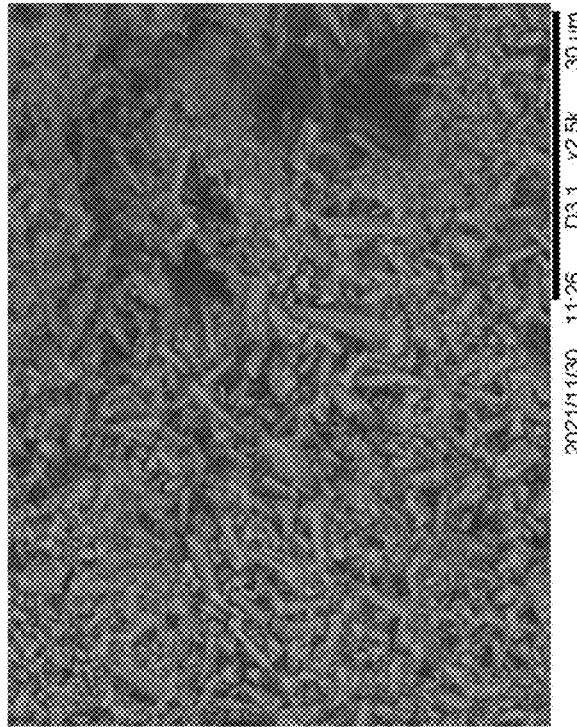
FIG. 6 illustrates SEM images of the aragonitic acicular shaped microstructure surrounding one or more voids to form the honeycomb like structure, as provided in Example 2 herein.
Figure 6:
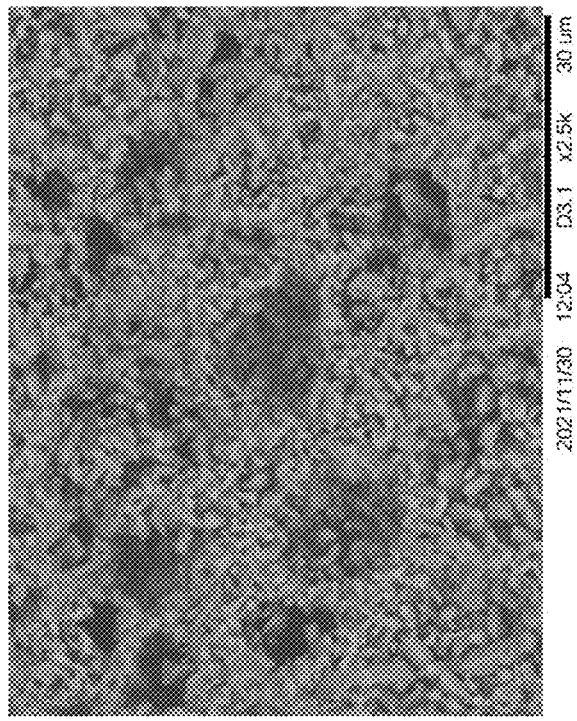

The varying packing densities or the bulk densities may be achieved by selecting unique bimodal, trimodal, or multi-modal particle distribution compositions of the reactive vaterite cement particles provided herein which after mixing in water and after curing result in the cement products comprising interlocking acicular shaped aragonite that optionally surrounds one or more voids. The one or more voids along with the surrounding interlocking acicular shaped aragonite forms a honeycomb structure (with aciculars radiating outwards from the vaterite sphere or its prior location), e.g., as shown in FIG. 6, which provides porosity or lightweight to the cement product (lowering the packing density or the bulk density). The unique compositions of the bimodal, trimodal, or multi-modal particle distribution of the reactive vaterite cement particles that result in the cement products with varying bulk densities have been described herein.

In one aspect, there is provided method to form cement product of desired bulk density, comprising preparing a wet composition comprising the reactive vaterite cement and water, by adding water to the composition comprising bimodal, trimodal, or multimodal particle distribution of the reactive vaterite cement as provided herein; and curing the cement product to transform the reactive vaterite cement into the interlocking acicular shaped aragonite to form the cement product of desired bulk density. In some embodiments, by varying the amount of the reactive vaterite cement A, reactive vaterite cement B, and/or reactive vaterite cement C in the bimodal or the trimodal compositions, as provided herein, the cement product of varying bulk densities can be obtained.

The compositions comprising bimodal, trimodal, or multimodal particle distribution of the reactive vaterite cement have been described herein in detail. The methods and systems to produce the reactive vaterite cement composition have been provided herein. In some embodiments, the mixer system configured to prepare the wet composition by adding water to the composition comprising reactive vaterite cement is rotary mixer, static mixer, pin mixer, Hobart mixer, slant cylinder mixer, Omni Mixer, Henschel mixer, V-type mixer, or Nauta mixer. Such mixers are commercially known in the art.

In some embodiments, the aragonite may be produced along with the reactive vaterite cement during the production of the reactive vaterite cement composition and/or the aragonite is added to the reactive vaterite cement composition and/or to the water used to make the wet composition and/or to the wet composition itself. In some embodiments, the aragonite acts as a seed to transform the reactive vaterite cement into interlocking acicular shaped aragonite during and/or after the curing.

In some embodiments, the water-to-cement ratio may affect the packing density or the bulk density of the cement product (as described herein). In some embodiments, the water-to-cement ratio is between about 0.1:1 to 1.2:1; or between about 0.1:1 to 1:1; or between about 0.1:1-0.5:1.

In some embodiments, depending on the water-to-cement ratio and additive used, the average particle size, and/or the particle distribution of the composition comprising reactive vaterite cement, the porosity of the cement product may be controlled to be between about 10%-90% and/or bulk density of between about 25-110 lb/ft$^3$. For example only, when the cement product is aggregates, the aggregate is lightweight aggregate having porosity of between about 10-90% and/or bulk density of between about 25-75 lb/ft$^3$. Production of aggregates has been described in detail in US Provisional Application titled "Compositions, methods, and systems related to aggregates," filed on even date herewith.

After the formation of the cement product, the product may be cured by providing one or more of pressure, heat, and/or humidity to transform the reactive vaterite cement in the cement product into the interlocking acicular shaped aragonite, and/or calcite, and/or carboaluminate to form the set and hardened cement product. The systems used for curing include any commercially known curing systems in the art, such as, but not limited to autoclaves, heated conveyer belts, and/or curing chambers. In some embodiments, the pressure during curing is between about 10-10,000 psi; heat is between about 20-150° C.; and/or humidity is between about 40-100% relative humidity (RH). These ranges may vary depending on the constitution of the cement product including its water content or the desired bulk density.

In some embodiments of the foregoing embodiments, the pressure is between about 10-100,000 psi, or between about 10-75,000 psi, or between about 10-50,000 psi, or between about 10-25,000 psi, or between about 10-10,000 psi, or between about 10-2,000 psi, or between about 10-1,000 psi, or between about 10-500 psi;

heat is between about 20-300° C., or between about 20-200° C., or between about 20-150° C., or between about 20-125° C., or between about 20-100° C., or between about 20-75° C., or between about 20-50° C., or between about 40° C.-60° C., or between about 40° C.-50° C., or between about 40° C.-100° C., or between about 50° C.-60° C., or between about 50° C.-80° C., or between about 50° C.-100° C., or between about 60° C.-80° C., or between about 60° C.-100° C.; and/or humidity is between about 40-100% RH, or between about 40-75% RH, or between about 40-50% RH, or between about 50-75% RH, or 40%, or 50%, or 60%, or 70%, or 90%, or 98% RH.

In some embodiments of the foregoing embodiments, the pressure is between about 10-1,000 psi, or between about 10-500 psi, or between about 10-100 psi; heat is between about 40-150° C., or between about 40-95° C., or between about 60-80° C., or between about 75-100° C., or between about 100-150° C.; and/or humidity is between about 75-100% RH, or between about 80-100% RH, or between about 90-100% RH, or 100% RH.

In some embodiments, the curing system provides heat and humidity in the form of steam to the reactive vaterite cement composition. The combination of the curing conditions, such as the pressure, the temperature, the relative humidity, and the time of exposure, etc., can be varied according to the size and constitution of the cement products and the desired results.

During the curing process of the cement products, in some embodiments, the bimodal or the multi-modal distribution of the reactive vaterite cement in the wet composition may dissolve in water and reprecipitate into the interlocking acicular shaped aragonite instead of participating in the actual cementing reactions like traditional cements. Therefore, the water may remain in the cement products after the cementing reaction is completed and the interlocking acicular shaped aragonite is formed. The water after evaporation and drying may leave porosity or voids. Further, the reactive vaterite has a lower specific gravity than the aragonite and it is contemplated that the transformation from the reactive vaterite to the interlocking acicular shaped aragonite may leave extra pore space or voids in the matrix. In some embodiments, the unique interlocking acicular shaped aragonite in the cement products surround the one or more voids left behind by the dissolution of the reactive vaterite cement, forming the honeycomb structure. The unique honeycomb structure with one or more voids surrounded by the interlocking acicular shaped aragonite reduces the bulk density of the cement product and the unique interlocking acicular shaped aragonite provides high compressive strength and durability. As described herein, water to reactive vaterite cement ratio, average particle size and the particle distribution of the composition comprising reactive vaterite cement influences the packing density or the bulk density of the cement product and therefore, cement product with varying bulk densities may be formed by selecting unique combinations of the water to reactive vaterite cement ratio, the average particle size and the particle distribution of the composition comprising reactive vaterite cement. As described herein, in some embodiments, the smaller size particles and the larger sized particles pack together in the bimodal or the trimodal distribution of the reactive vaterite cement and result in a unique morphology of the interlocking acicular shaped aragonite surrounding the one or more voids and forming the honeycomb like structure.

In some embodiments, the aggregate formed by the methods and systems described herein has porosity of between about 10-90%; has bulk density of between about 25-110 lb/ft$^3$; has Mohs hardness of less than 6; and/or has an abrasion resistance of less than 50%.

In some embodiments, the methods and systems described herein further comprise forming the cement product of bulk density between 25-65 lb/ft$^3$ when the reactive vaterite cement has spherical morphology; has a specific surface area of 100-1,000 m$^2$/kg; and/or has a bimodal distribution with the reactive vaterite cement having an average particle size of between 0.1-10 µm and the reactive vaterite cement having an average particle size of between 11-50 µm, wherein ratio of the water to the reactive vaterite cement in the wet composition is between about 0.1:1-1.2:1.

In some embodiments, the methods and systems described herein further comprise forming the lightweight aggregate of bulk density between 25-65 lb/ft$^3$ when the reactive vaterite cement has spherical morphology; has a specific surface area of 100-1,000 m$^2$/kg; and/or has a bimodal distribution with the reactive vaterite cement having an average particle size of between 0.1-10 µm and the reactive vaterite cement having an average particle size of between 11-50 µm, wherein ratio of the water to the reactive vaterite cement in the wet composition is between about 0.1:1-1.2:1.

In some embodiments, the methods and systems described herein further comprise forming the cement product of bulk density between 25-65 lb/ft$^3$ when the reactive vaterite cement has spherical morphology; has a specific surface area of 100-1,000 m$^2$/kg; and/or has a trimodal distribution with the reactive vaterite cement A having an average particle size of between 0.1-10 µm, the reactive vaterite cement B having an average particle size of between 11-50 µm, and the reactive vaterite cement C having an average particle size of between 51-100 µm, wherein ratio of the water to the reactive vaterite cement in the wet composition is between about 0.1:1-1.2:1.

In some embodiments, the methods and systems described herein further comprise forming the lightweight aggregate of bulk density between 25-65 lb/ft$^3$ when the reactive vaterite cement has spherical morphology; has a specific surface area of 100-1,000 m$^2$/kg; and/or has a trimodal distribution with the reactive vaterite cement A having an average particle size of between 0.1-10 µm, the reactive vaterite cement B having an average particle size of between 11-50 µm, and the reactive vaterite cement C having an average particle size of between 51-100 µm, wherein ratio of the water to the reactive vaterite cement in the wet composition is between about 0.1:1-1.2:1.

In some embodiments, the methods and systems described herein further comprise forming the cement product of bulk density between 25-65 lb/ft$^3$ when the reactive vaterite cement has spherical morphology; has a specific surface area of 100-1,000 m$^2$/kg; and/or has a bimodal distribution with the reactive vaterite cement B having an average particle size of between 11-50 µm, and the reactive vaterite cement C having an average particle size of between 51-100 µm, wherein ratio of the water to the reactive vaterite cement in the wet composition is between 0.1:1-1.2:1.

In some embodiments, the methods and systems described herein further comprise forming the lightweight aggregate of bulk density between 25-65 lb/ft$^3$ when the reactive vaterite cement has spherical morphology; has a specific surface area of 100-1,000 m$^2$/kg; and/or has a bimodal distribution with the reactive vaterite cement B having an average particle size of between 11-50 µm, and the reactive vaterite cement C having an average particle size of between 51-100 µm, wherein ratio of the water to the reactive vaterite cement in the wet composition is between about 0.1:1-1.2:1.

In some embodiments, the methods and systems described herein further comprise producing the reactive vaterite cement before the preparing step. The methods and systems to produce the reactive vaterite cement composition have been described herein.

Methods and Systems to Produce Reactive Vaterite Cement Compositions

In one aspect there are provided methods for producing the cement composition, comprising: (a) calcining limestone to form a mixture comprising lime and a gaseous stream comprising carbon dioxide; (b) dissolving the mixture comprising lime in a N-containing salt solution to produce an aqueous solution comprising calcium salt; and (c) treating the aqueous solution comprising calcium salt with the gaseous stream comprising carbon dioxide to form the composition comprising the bimodal distribution of the reactive vaterite cement comprising the reactive vaterite cement A having the average particle size of between about 0.1-10 µm and the reactive vaterite cement B having the average particle size of between about 11-50 µm.

In one aspect there are provided methods producing the cement composition, comprising: (a) calcining limestone to form a mixture comprising lime and a gaseous stream comprising carbon dioxide; (b) dissolving the mixture comprising lime in a N-containing salt solution to produce an aqueous solution comprising calcium salt; (c) treating the aqueous solution comprising calcium salt with the gaseous stream comprising carbon dioxide to form the composition comprising the reactive vaterite cement A having the average particle size of between about 0.1-10 µm; and treating the aqueous solution comprising calcium salt with the gaseous stream comprising carbon dioxide to form the composition comprising the reactive vaterite cement B having the average particle size of between about 11-50 µm; (d) mixing the composition comprising the reactive vaterite cement A and the composition comprising the reactive vaterite cement B to form the composition comprising the bimodal distribution of the reactive vaterite cement comprising the reactive vaterite cement A having the average particle size of between about 0.1-10 µm and the reactive vaterite cement B having the average particle size of between about 11-50 µm.

In one aspect there are provided methods for producing the cement composition, comprising: (a) dissolving limestone in a N-containing salt solution to produce an aqueous solution comprising calcium salt and a gaseous stream comprising carbon dioxide; and (b) treating the aqueous solution comprising calcium salt with the gaseous stream comprising carbon dioxide to form the composition comprising the bimodal distribution of the reactive vaterite cement comprising the reactive vaterite cement A having the average particle size of between about 0.1-10 µm and the reactive vaterite cement B having the average particle size of between about 11-50 µm.

In one aspect there are provided methods producing the cement composition, comprising: (a) dissolving limestone in a N-containing salt solution to produce an aqueous solution comprising calcium salt and a gaseous stream comprising carbon dioxide; (b) treating the aqueous solution comprising calcium salt with the gaseous stream comprising carbon dioxide to form the composition comprising the reactive vaterite cement A having the average particle size of between about 0.1-10 μm; and treating the aqueous solution comprising calcium salt with the gaseous stream comprising carbon dioxide to form the composition comprising the reactive vaterite cement B having the average particle size of between about 11-50 μm; (c) mixing the composition comprising the reactive vaterite cement A and the composition comprising the reactive vaterite cement B to form the composition comprising the bimodal distribution of the reactive vaterite cement comprising the reactive vaterite cement A having the average particle size of between about 0.1-10 μm and the reactive vaterite cement B having the average particle size of between about 11-50 μm.

In some embodiments of the aforementioned aspects, the methods further comprise forming the composition comprising the reactive vaterite cement C having an average particle size of between about 51-100 μm; and mixing the composition comprising reactive vaterite cement A and the composition comprising reactive vaterite cement B, with the composition comprising reactive vaterite cement C to form the composition comprising trimodal distribution.

In some embodiments, the bimodal distribution composition of the reactive vaterite cement comprising the reactive vaterite cement B having the average particle size of between about 11-50 μm and the reactive vaterite cement C having the average particle size of between about 51-100 μm, can be formed using aforementioned methods.

It is to be understood that the reactive vaterite cement compositions with specific particle sizes may be formed separately and then mixed to form the bimodal, trimodal, or multi-modal distribution and/or the reactive vaterite cement compositions with a mix of the particle sizes may be formed using the methods and systems described herein.

In some embodiments of the aforementioned aspects and embodiments, the methods further comprise adding water to the cement composition and transforming the reactive vaterite cement A and the reactive vaterite cement B and/or reactive vaterite cement C to the interlocking acicular shaped aragonite and/or calcite and/or carboaluminate upon dissolution and re-precipitation in water.

In some embodiments of the aforementioned aspects and embodiments, the composition comprising the reactive vaterite cement A and the reactive vaterite cement B and optionally the reactive vaterite cement C improve or increase packing density of cement paste by between about 1-35% and/or reduce viscosity of cement paste by 10% or more.

In some embodiments of the aforementioned aspects and embodiments, the methods further comprise setting and hardening of the aragonite and/or the calcite and forming a cement product.

In one aspect there are provided systems, comprising:
(i) a calcining reactor configured to calcine limestone to form a mixture comprising lime and a gaseous stream comprising carbon dioxide;
(ii) a dissolution reactor operably connected to the calcination reactor configured for dissolving the mixture comprising lime in an aqueous N-containing salt solution to produce an aqueous solution comprising calcium salt;
(iii) a treatment reactor operably connected to the dissolution reactor configured for treating the aqueous solution comprising calcium salt with the gaseous stream comprising carbon dioxide to form the composition comprising the bimodal distribution of the reactive vaterite cement comprising the reactive vaterite cement A having the average particle size of between about 0.1-10 μm and the reactive vaterite cement B having the average particle size of between about 11-50 μm.

In one aspect there are provided systems, comprising:
(i) a calcining reactor configured to calcine limestone to form a mixture comprising lime and a gaseous stream comprising carbon dioxide;
(ii) a dissolution reactor operably connected to the calcination reactor configured for dissolving the mixture comprising lime in an aqueous N-containing salt solution to produce an aqueous solution comprising calcium salt;
(iii) a treatment reactor operably connected to the dissolution reactor configured for treating the aqueous solution comprising calcium salt with the gaseous stream comprising carbon dioxide to form the composition comprising reactive vaterite cement A having the average particle size of between about 0.1-10 μm;
(iv) a treatment reactor operably connected to the dissolution reactor configured for treating the aqueous solution comprising calcium salt with the gaseous stream comprising carbon dioxide to form the composition comprising reactive vaterite cement B having the average particle size of between about 11-50 μm; and
(v) a mixing reactor operably connected to the treatment reactors configured for mixing the composition comprising reactive vaterite cement A and the composition comprising reactive vaterite cement B to form the composition comprising the bimodal distribution of the reactive vaterite cement comprising reactive vaterite cement A having the average particle size of between about 0.1-10 μm and the reactive vaterite cement B having the average particle size of between about 11-50 μm.

In some embodiments of the foregoing system aspects and embodiments, the treatment reactor in the systems further forms a composition comprising the trimodal distribution of the reactive vaterite cement comprising the reactive vaterite cement A having the average particle size of between about 0.1-10 μm, the reactive vaterite cement B having the average particle size of between about 11-50 μm, and the reactive vaterite cement C having the average particle size of between about 51-100 μm.

In some embodiments of the foregoing system aspects and embodiments, the system to form cement product is operably connected to the system to produce the composition comprising bimodal or the trimodal or the multi-modal distribution of the reactive vaterite cement, comprising a mixer system configured to prepare the wet composition by adding water to the composition comprising bimodal or the trimodal or the multi-modal distribution of the reactive vaterite cement; and a curing system configured to cure the composition to transform the reactive vaterite cement into interlocking acicular shaped aragonite and/or calcite, and/or carboaluminate to form the cement product.

In some embodiments of the foregoing aspects and embodiments, the mixer system is rotary mixer, static mixer, pin mixer, Hobart mixer, slant cylinder mixer, Omni Mixer, Henschel mixer, V-type mixer, or Nauta mixer. In some embodiments of the foregoing aspects and embodiments, the curing system is one or more autoclaves. In some embodiments of the foregoing aspects and embodiments, the system further comprises a control system configured to remotely and/or automatedly control the components of the systems.

In some embodiments of the foregoing aspects and embodiments, the system further comprises a blending reactor operably connected to the treatment reactor configured for blending one or more components selected from the group consisting of slag from metal production, Portland cement clinker, calcium aluminate cement clinker, calcium sulfoaluminate clinker, aluminosilicate material, SCM, and combination thereof, with the composition comprising the bimodal, trimodal, or multi-modal distribution of the reactive vaterite cement composition.

In some embodiments of the foregoing aspects and embodiments, the system further comprises a transfer system operably connected to the treatment reactor of the system producing the composition comprising reactive vaterite cement and the mixer system of the system forming the cement products and is configured to transfer the composition comprising reactive vaterite cement from the treatment reactor to the mixer system.

The reactive vaterite cement composition can be prepared using various methods and systems, as described further herein and illustrated in FIGS. 2A, 2B, 3A, 3B, 4A, and 4B. The reactive vaterite cement composition can be produced using the limestone as a feedstock where the limestone is used as is in the process or is calcined to form the lime. The methods and systems provided herein to produce the reactive vaterite cement composition have several advantages, such as but not limited to, reduction of carbon dioxide emissions through the incorporation of the carbon dioxide back into the process to form the reactive vaterite cement. Production of the reactive vaterite cement composition, in the methods and systems provided herein, offers advantages including operating expense savings through the reduction in fuel consumption, and reductions in carbon footprint. In the methods and systems provided herein, the emissions of the $CO_2$ from the calcination of the limestone to the lime may be avoided by recapturing it back in the cementitious reactive vaterite material. By recapturing the carbon dioxide, the cement products have the potential to eliminate significant amount of the cement carbon dioxide emissions and total global emissions from all sources. This reactive vaterite cement composition provided herein can be used as a self-cement and/or to replace Ordinary Portland Cement (OPC) or Portland cement clinker either entirely or partially as SCM.

Figure 2A:
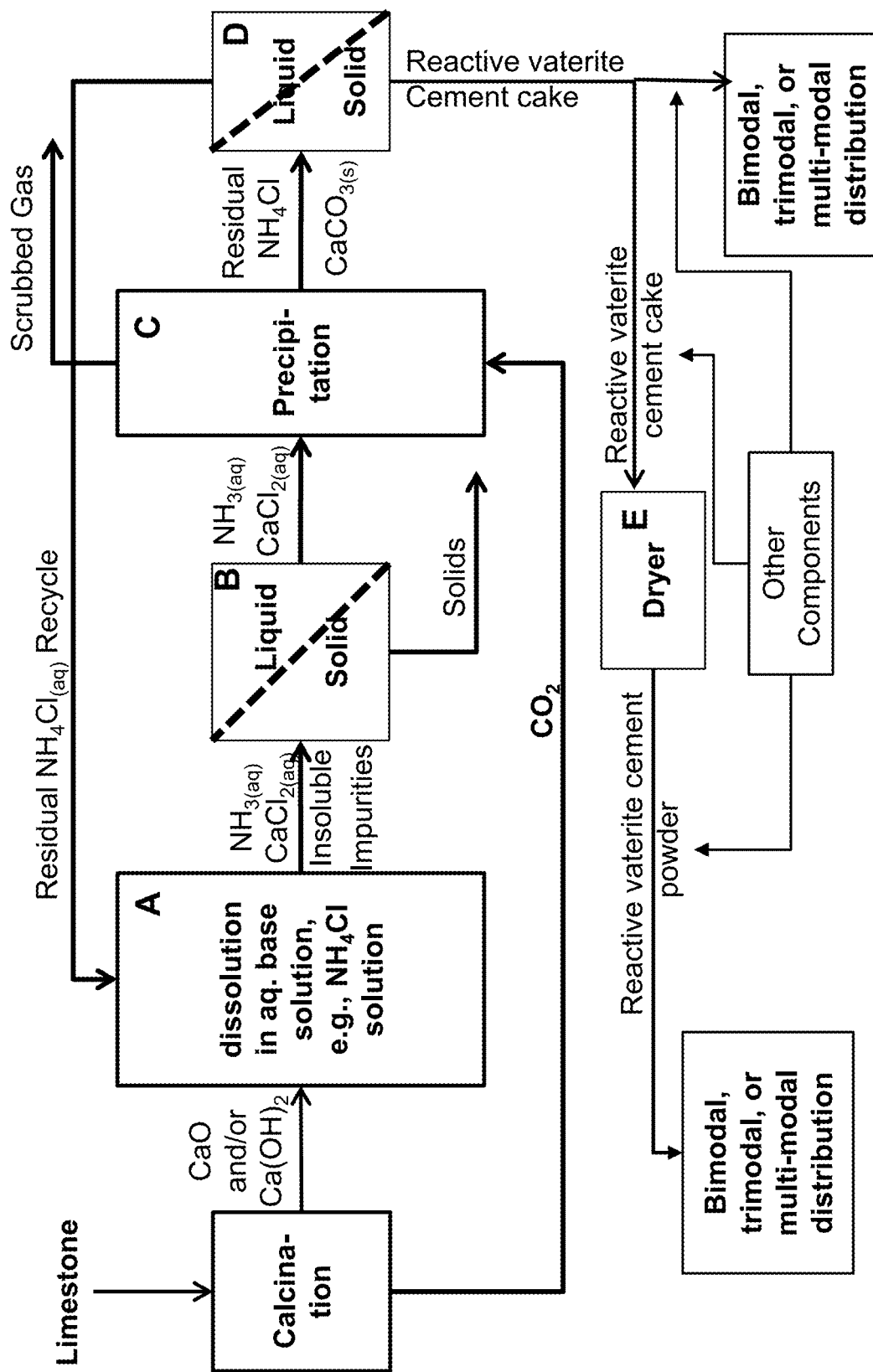
FIG. 2A illustrates some embodiments of the methods and systems provided herein employing calcination of the limestone to form the reactive vaterite cement composition.
Figure 2B:
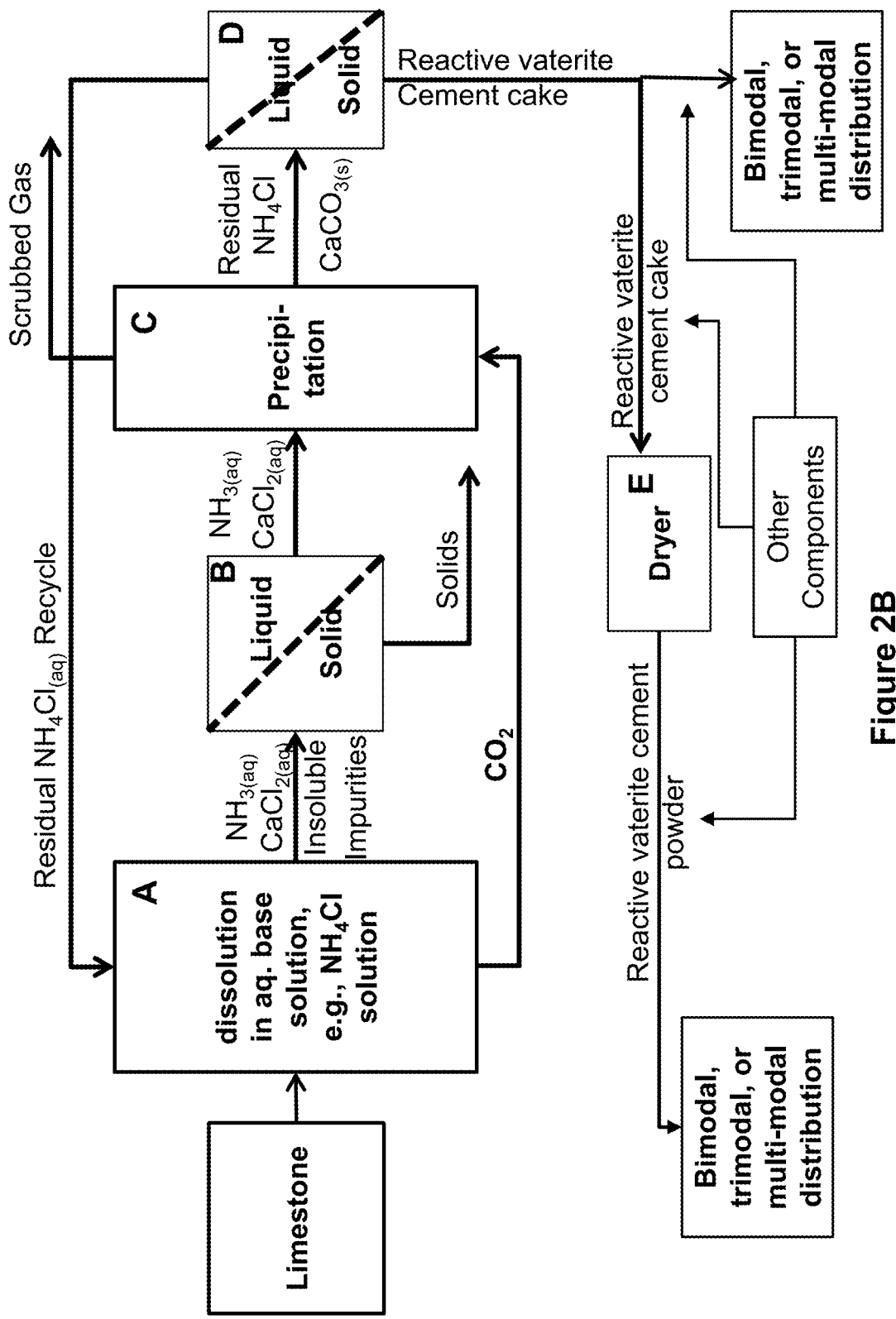
FIG. 2B illustrates some embodiments of the methods and systems provided herein employing limestone directly to form the reactive vaterite cement composition.
Figure 3A:
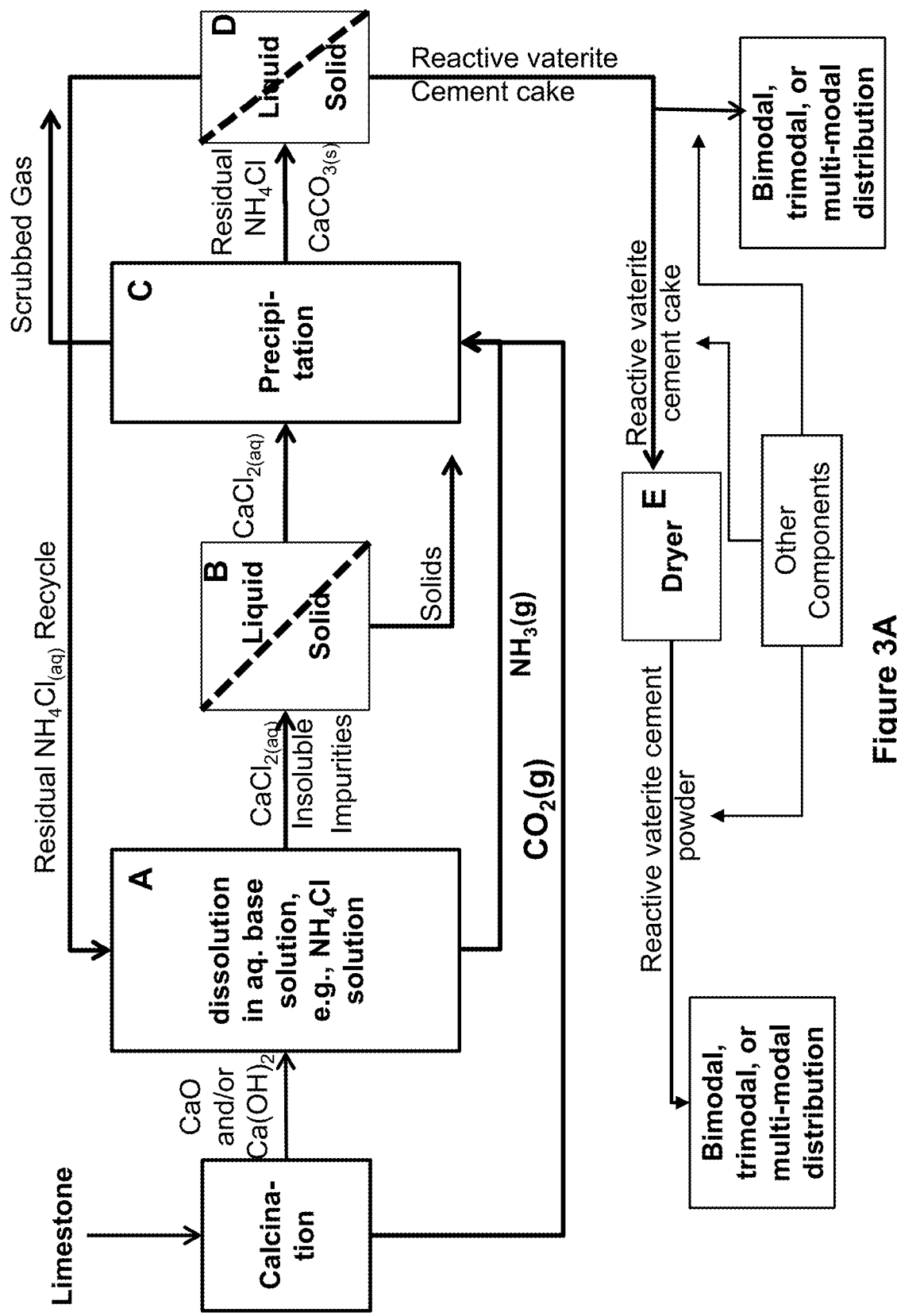
FIG. 3A illustrates some embodiments of the methods and systems provided herein employing calcination of the limestone to form the reactive vaterite cement composition.
Figure 3B:
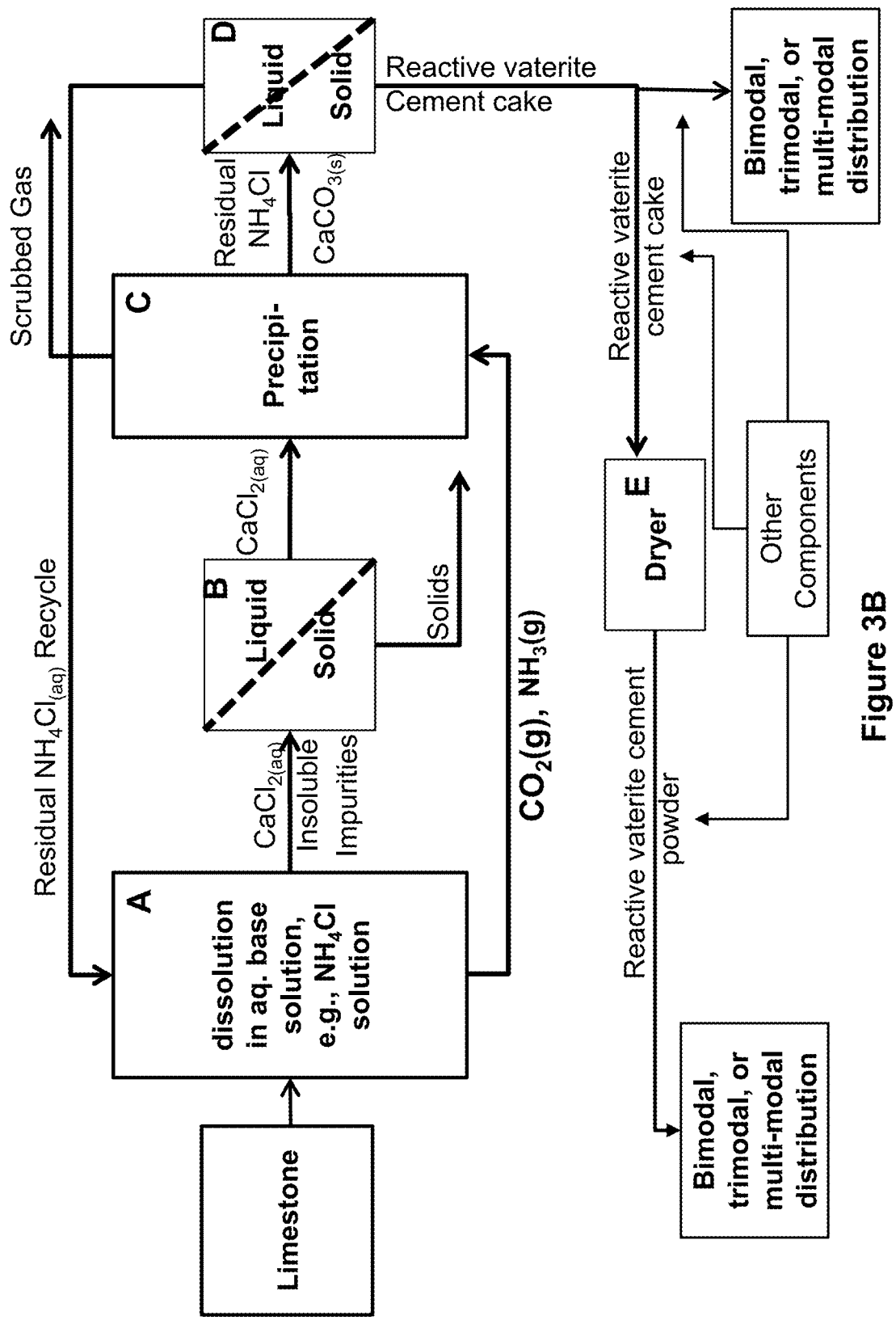
FIG. 3B illustrates some embodiments of the methods and systems provided herein employing limestone directly to form the reactive vaterite cement composition.
Figure 4A:
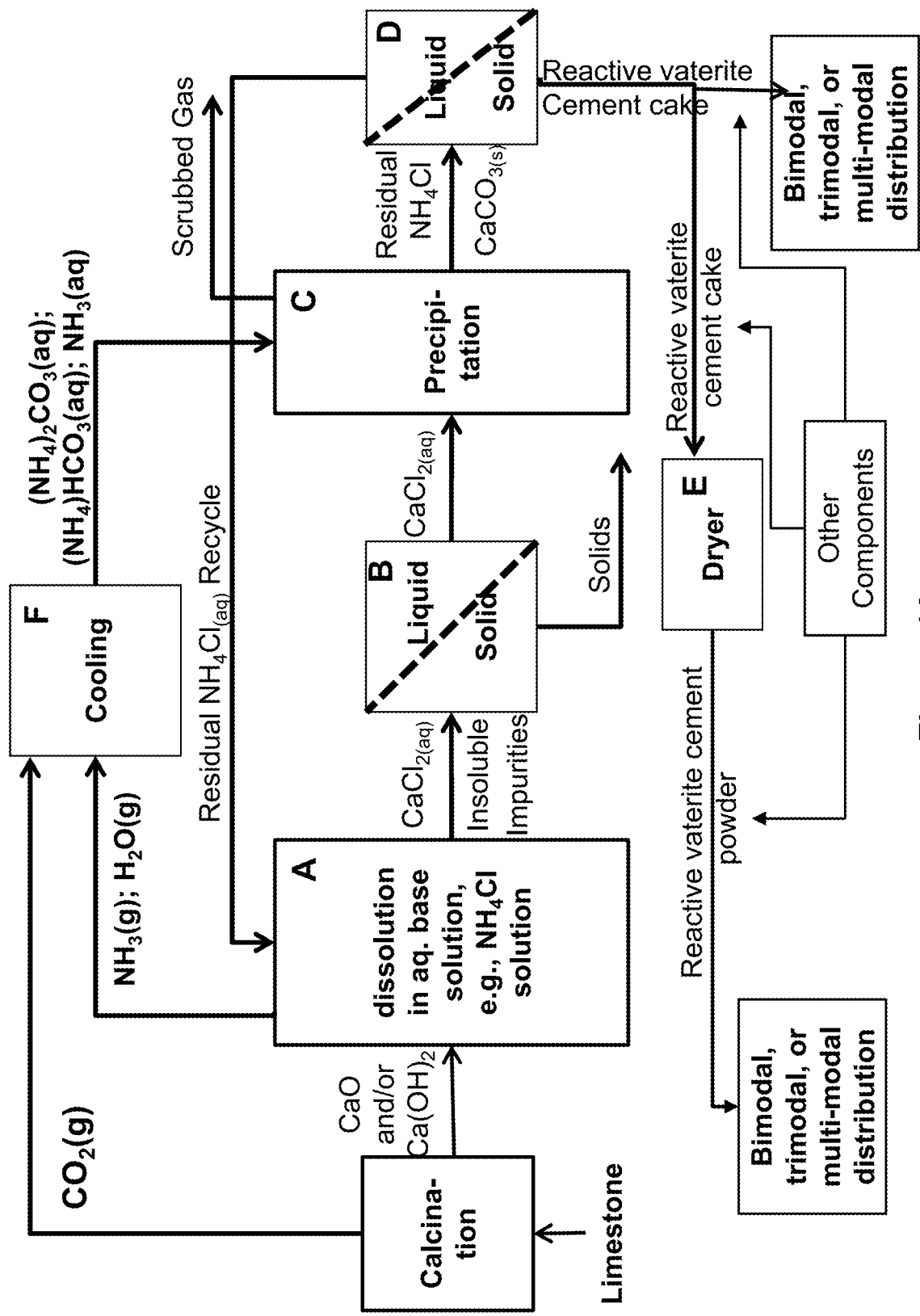
FIG. 4A illustrates some embodiments of the methods and systems provided herein employing calcination of the limestone to form the reactive vaterite cement composition.
Figure 4B:
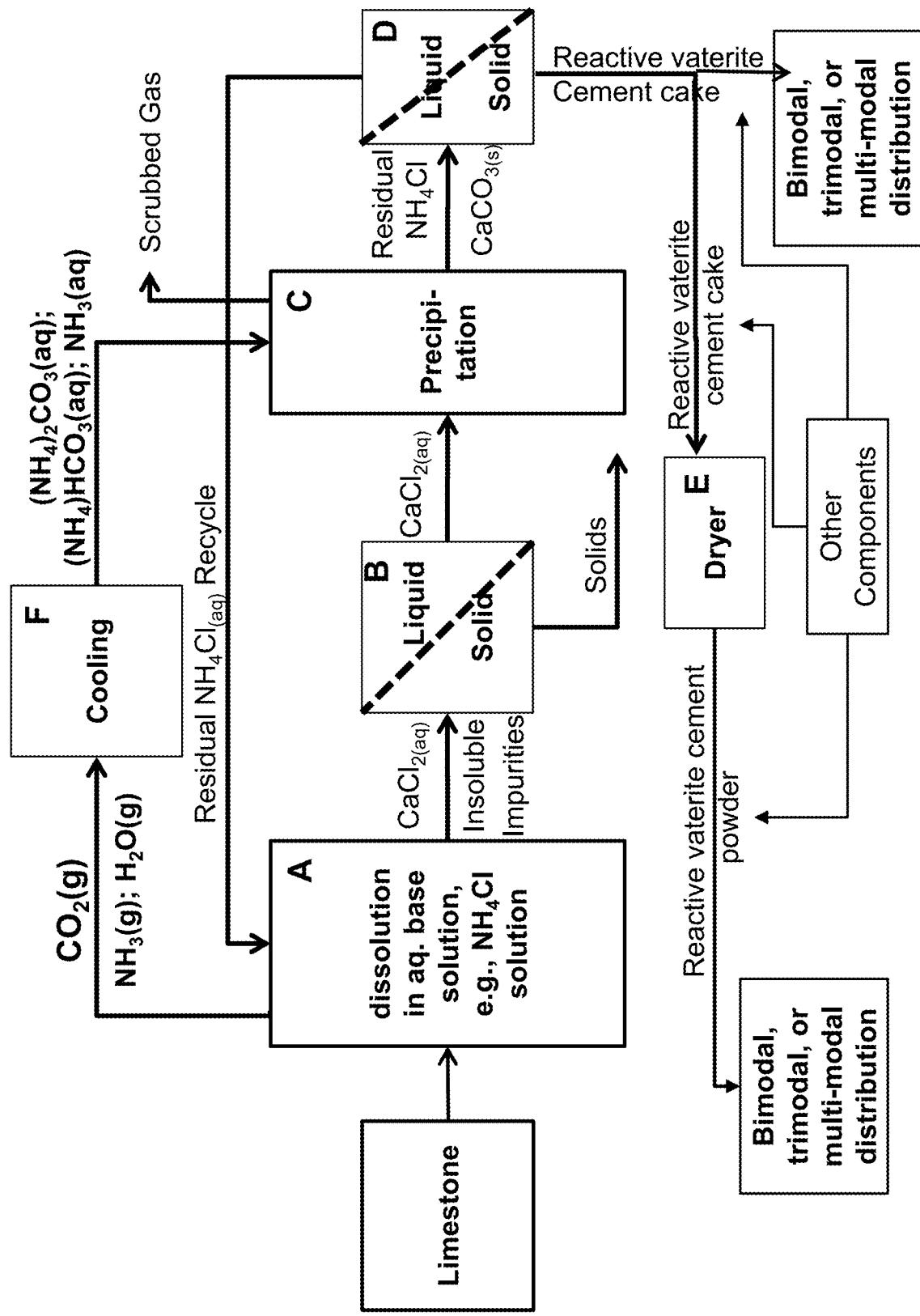
FIG. 4B illustrates some embodiments of the methods and systems provided herein employing limestone directly to form the reactive vaterite cement composition.

In some embodiments, the limestone can be used directly to form the reactive vaterite cement composition (as illustrated in FIGS. 2B, 3B, and 4B) or the limestone may be calcined to form the lime which may be used to form the reactive vaterite cement composition (as illustrated in FIGS. 2A, 3A, and 4A). The aforementioned aspects and embodiments of the methods and systems provided herein are as illustrated in FIGS. 2A, 2B, 3A, 3B, 4A, and 4B. It is to be understood that the steps illustrated in the figures may be modified or the order of the steps may be changed or more steps may be added or deleted depending on the desired outcome.

Calcination or calcining is a thermal treatment process to bring about a thermal decomposition of the limestone. The "limestone" as used herein, means $CaCO_3$ and may further include other impurities typically present in the limestone. Limestone is a naturally occurring mineral. The chemical composition of this mineral may vary from region to region as well as between different deposits in the same region. Therefore, the lime containing the calcium oxide and/or the calcium hydroxide obtained from calcining limestone from each natural deposit may be different. Typically, limestone may be composed of calcium carbonate ($CaCO_3$), magnesium carbonate ($MgCO_3$), silica ($SiO_2$), alumina ($Al_2O_3$), iron (Fe), sulphur (S) or other trace elements.

Limestone deposits are widely distributed. The limestone from the various deposits may differ in physical chemical properties and can be classified according to their chemical composition, texture, and geological formation. Limestone may be classified into the following types: high calcium limestone where the carbonate content may be composed mainly of calcium carbonate with a magnesium carbonate content not more than 5%; magnesium limestone containing magnesium carbonate to about 5-35%; or dolomitic limestone which may contain between 35-46% of $MgCO_3$, the balance amount is calcium carbonate. Limestones from different sources may differ considerably in chemical compositions and physical structures. It is to be understood that the methods and systems provided herein apply to all the cement plants calcining the limestone from any of the sources listed above or commercially available. The quarries include, but are not limited to, quarries associated with cement kiln, quarries for lime rock for aggregate for use in concrete, quarries for lime rock for other purposes (road base), and/or quarries associated with lime kiln.

The limestone calcination is a decomposition process where the chemical reaction for decomposition of the limestone is:

$$CaCO_3 \rightarrow CaO + CO_2 \text{ (g)}$$

This step is illustrated in FIGS. 2A, 3A, and 4A as a first step of the calcination of the limestone to form the lime. However, in some embodiments, the calcination step can be obviated, and the limestone is used directly as a feed stock (FIGS. 2B, 3B, and 4B).

In some embodiments, the limestone comprises between about 1-70% magnesium and/or a magnesium bearing mineral is mixed with the limestone before the calcination wherein the magnesium bearing mineral comprises between about 1-70% magnesium. In some embodiments, the magnesium upon the calcination forms the magnesium oxide which may be precipitated and/or incorporated in the reactive vaterite cement once formed. In some embodiments, the magnesium bearing mineral comprises magnesium carbonate, magnesium salt, magnesium hydroxide, magnesium silicate, magnesium sulfate, or combination thereof. In some embodiments, the magnesium bearing mineral includes, but not limited to, dolomite, magnesite, brucite, carnallite, talc, olivine, artinite, hydromagnesite, dypingite, barringonite, nesquehonite, lansfordite, kieserite, and combination thereof. In some embodiments, the magnesium oxide in the reactive vaterite cement composition when comes into contact with water, transforms to magnesium hydroxide which may bind with the transformed aragonite and/or calcite.

The "lime" as used herein relates to calcium oxide and/or calcium hydroxide. The presence and amount of the calcium oxide and/or the calcium hydroxide in the lime would vary depending on the conditions for the lime formation. The lime may be in dry form i.e., calcium oxide, and/or in wet form e.g., calcium hydroxide, depending on the conditions. The production of the lime may depend upon the type of kiln, conditions of the calcination, and the nature of the raw material i.e., limestone. In some embodiments, at relatively low calcination temperatures, products formed in the kiln may contain both un-burnt carbonate and lime and may be called underburnt lime. In some embodiments, as the temperature increases, soft burnt or high reactive lime may be produced. In some embodiments, at still higher temperatures, dead burnt or low reactive lime may be produced. The soft burnt lime is produced when the reaction front reaches the core of the charged limestone and converts all carbonate present to lime. A high productive product may be relatively soft, contains small lime crystallites and has open porous structure with an easily assessable interior. Such lime may have the optimum properties of high reactivity, high surface area and low bulk density. Increasing the degree of calcination beyond this stage may make lime crystallites grow larger, agglomerate and sinter. This may result in a decrease in surface area, porosity and reactivity and an increase in bulk density. This product may be known as dead burnt or low reactive lime. Without being limited by any theory, the methods and systems provided herein form and utilize any one or the combination of the aforementioned lime. Therefore, in some embodiments, the lime is dead burnt, soft burnt, underburnt, or combination thereof. In some embodiments, the lime is dead burnt lime. In some embodiments, the lime is under burnt lime. In some embodiments, the lime is soft burnt lime. In some embodiments, the lime is dead burnt lime, soft burnt lime, or combination thereof.

Production of the lime by calcining the limestone may be carried out using various types of kilns, such as, but not limited to, a shaft kiln or a rotary kiln or an electric kiln. The use of the electric kiln in the calcination and the advantages associated with it, have been described in U.S. application Ser. No. 17/363,537, filed Jun. 30, 2021, which is fully incorporated herein by reference in its entirety.

These apparatuses for calcining are suitable for calcining the limestone in the form of lumps having diameters of several to tens millimeters. Cement plant waste streams include waste streams from both wet process and dry process plants, which plants may employ shaft kilns, rotary kilns, electric kilns, or combinations thereof and may include pre-calciners. These industrial plants may each burn a single fuel or may burn two or more fuels sequentially or simultaneously.

As illustrated in FIGS. 2A, 2B, 3A, 3B, 4A, and 4B, the limestone obtained from the limestone quarry is subjected to the calcination in a cement plant resulting in the formation of the lime and $CO_2$ gas or is used directly. The lime may be calcium oxide in the form of a solid from dry kilns/cement processes and/or may be a combination of calcium oxide and calcium hydroxide in the form of slurry in wet kilns/cement processes. When wet the calcium oxide (also known as a base anhydride that converts to its hydroxide form in water) may be present in its hydrated form such as but not limited to, calcium hydroxide. While calcium hydroxide (also called slaked lime) is a common hydrated form of calcium oxide, other intermediate hydrated and/or water complexes may also be present in the slurry and are all included within the scope of the methods and systems provided herein. It is to be understood that while the lime is illustrated as CaO in some of the figures herein, it may be present as $Ca(OH)_2$ or combination of CaO and $Ca(OH)_2$.

The lime or the limestone may be sparingly soluble in water. In the methods and systems provided herein, the lime or the limestone solubility is increased by its treatment with solubilizers.

In the methods and systems provided herein, the lime or the limestone is solvated or dissolved or solubilized with a solubilizer (step A in FIGS. 2A, 2B, 3A, 3B, 4A, and 4B) to produce an aqueous solution comprising calcium salt. For illustration purposes only, the solubilizer, e.g., N-containing salt solution is being illustrated in the figures as ammonium chloride ($NH_4Cl$) solution and the subsequent calcium salt is being illustrated as calcium chloride ($CaCl_2$)). Various examples of the N-containing salt have been provided herein and are all within the scope of the invention.

In some embodiments, the N-containing salt solution solubilizes or dissolves the calcium from the lime or the limestone and leaves the solid impurities. The N-containing salt includes without limitation, N-containing inorganic salt, N-containing organic salt, or combination thereof.

The "N-containing inorganic salt" as used herein includes any inorganic salt with nitrogen in it. Examples of N-containing inorganic salt include, but not limited to, ammonium acetate, ammonium halide (halide is any halogen), ammonium sulfate, ammonium sulfite, ammonium nitrate, ammonium nitrite, and the like. In some embodiments, the ammonium halide is ammonium chloride or ammonium bromide. In some embodiments, the ammonium halide is ammonium chloride.

The "N-containing organic salt" as used herein includes any salt of an organic compound with nitrogen in it. Examples of N-containing organic compounds include, but not limited to, aliphatic amine, alicyclic amine, heterocyclic amine, and combination thereof.

The "aliphatic amine" as used herein includes any alkyl amine of formula $(R)_n$—$NH_{3-n}$ where n is an integer from 1-3, wherein R is independently between C1-C8 linear or branched and substituted or unsubstituted alkyl. An example of the corresponding halide salt (chloride salt, bromide salt, fluoride salt, or iodide salt) of the alkyl amine of formula $(R)_n$—$NH_{3-n}$ is $(R)_n$—$NH_{4-n}{}^+Cl^-$. In some embodiments, when R is substituted alkyl, the substituted alkyl is independently substituted with halogen, hydroxyl, acid and/or ester.

For example, when R is alkyl in $(R)_n$—$NH_{3-n}$, the alkyl amine can be a primary alkyl amine, such as for example only, methylamine, ethylamine, butylamine, pentylamine, etc.; the alkyl amine can be a secondary amine, such as for example only, dimethylamine, diethylamine, methylethylamine, etc.; and/or the alkyl amine can be a tertiary amine, such as for example only, trimethylamine, triethylamine, etc.

For example, when R is substituted alkyl substituted with hydroxyl in $(R)_n$—$NH_{3-n}$, the substituted alkyl amine is an alkanolamine including, but not limited to, monoalkanolamine, dialkanolamine, or trialkanolamine, such as e.g., monoethanolamine, diethanolamine, or triethanolamine, etc.

For example, when R is substituted alkyl substituted with halogen in $(R)_n$—$NH_{3-n}$, the substituted alkyl amine is, for example, chloromethylamine, bromomethylamine, chloroethylamine, bromoethylamine, etc.

For example, when R is substituted alkyl substituted with acid in $(R)_n$—$NH_{3-n}$, the substituted alkyl amine is, for example, amino acids. In some embodiments, the aforementioned amino acid has a polar uncharged alkyl chain, examples include without limitation, serine, threonine, asparagine, glutamine, or combination thereof. In some embodiments, the aforementioned amino acid has a charged alkyl chain, examples include without limitation, arginine, histidine, lysine, aspartic acid, glutamic acid, or combination thereof. In some embodiments, the aforementioned amino acid is glycine, proline, or combination thereof.

The "alicyclic amine" as used herein includes any alicyclic amine of formula $(R)_n$—$NH_{3-n}$ where n is an integer from 1-3, wherein R is independently one or more all-carbon rings which may be either saturated or unsaturated, but do not have aromatic character. Alicyclic compounds may have one or more aliphatic side chains attached. An example of the corresponding salt of the alicyclic amine of formula $(R)_n$—$NH_{3-n}$ is $(R)_n$—$NH_{4-n}{}^+Cl^-$. Examples of alicyclic amine include, without limitation, cycloalkylamine: cyclopropylamine, cyclobutylamine, cyclopentylamine, cyclohexylamine, cycloheptylamine, cyclooctylamine, and so on.

The "heterocyclic amine" as used herein includes at least one heterocyclic aromatic ring attached to at least one amine. Examples of heterocyclic rings include, without limitation, pyrrole, pyrrolidine, pyridine, pyrimidine, etc. Such chemicals are well known in the art and are commercially available.

In the methods and systems provided herein, the limestone or the lime is dissolved or solubilized with the N-containing salt solution (step A) to produce the aqueous solution comprising calcium salt. The dissolution step may form ammonia in the aqueous solution (illustrated in FIGS. 2A and 2B) and/or form a gaseous stream comprising ammonia gas (illustrated in FIGS. 3A, 3B, 4A, and 4B).

As illustrated in step A of FIGS. 2A, 3A, and 4A, the N-containing salt is exemplified as ammonium chloride ($NH_4Cl$). The lime is solubilized by treatment with $NH_4Cl$ (new and recycled as further explained below) when the reaction that may occur is:

$$CaO+2\ NH_4Cl\ (aq) \rightarrow CaCl_2\ (aq)+2\ NH_3+H_2O$$

$$Ca(OH)_2+2\ NH_4Cl\ (aq) \rightarrow 2\ NH_3+CaCl_2+2H_2O$$

Similarly, when the N-containing salt is N-containing organic salt, the reaction may be shown as below:

$$CaO+2\ NH_3RCl \rightarrow CaCl_2\ (aq)+2\ NH_2R+H_2O$$

Similarly, illustrated in step A of FIGS. 2B, 3B, and 4B, the N-containing salt is exemplified as ammonium chloride ($NH_4Cl$). The limestone is solubilized by treatment with $NH_4Cl$ (new and recycled as further explained below) when the reaction that may occur is:

$$CaCO_3\ (limestone)+2\ NH_4Cl \rightarrow CaCl_2\ (aq)+2\ NH_3+CO_2+H_2O$$

Similarly, when the base is N-containing organic salt, the reaction may be shown as below:

$$CaCO_3\ (limestone)+2\ NH_3RCl \rightarrow CaCl_2\ (aq)+2\ NH_2R+CO_2+H_2O$$

In some embodiments, the base or the N-containing inorganic salt such as, but not limited to, an ammonium salt, e.g., ammonium chloride solution may be supplemented with anhydrous ammonia or an aqueous solution of ammonia to maintain an optimum level of ammonium chloride in the solution.

In some embodiments, the aqueous solution comprising calcium salt obtained after dissolution of the lime or the limestone may contain sulfur depending on the source of the limestone. The sulfur may get introduced into the aqueous solution after the solubilization of the lime or the limestone with any of the N-containing salt described herein. In an alkaline solution, various sulfur compounds containing various sulfur ionic species may be present in the solution including, but not limited to, sulfite ($SO_3^{2-}$), sulfate ($SO_4^{2-}$), hydrosulfide ($HS^-$), thiosulfate ($S_2O_3^{2-}$), polysulfides ($S_n^{2-}$), thiol ($RSH$), and the like. The "sulfur compound" as used herein, includes any sulfur ion containing compound.

In some embodiments, the aqueous solution further comprises the N-containing salt, such as, ammonia and/or N-containing inorganic or N-containing organic salt.

In some embodiments, the amount of the N-containing inorganic salt, the N-containing organic salt, or combination thereof, is in more than 20% excess or more than 30% excess to the lime or the limestone. In some embodiments, the molar ratio of the N-containing salt:lime (or N-containing inorganic salt:lime or N-containing organic salt:lime or ammonium chloride:lime) or the molar ratio of the N-containing salt:limestone (or N-containing inorganic salt:limestone or N-containing organic salt:limestone or ammonium chloride:limestone) is between 0.5:1-2:1; or 0.5:1-1.5:1; or 1:1-1.5:1; or 1.5:1; or 2:1; or 2.5:1; or 1:1.

In some embodiments of the methods and systems described herein, the dissolution step takes place under one or more dissolution conditions selected from the group consisting of temperature between about 30-200° C., or between about 30-150° C., or between about 30-100° C., or between about 30-75° C., or between about 30-50° C., or between about 40-200° C., or between about 40-150° C., or between about 40-100° C., or between about 40-75° C., or between about 40-50° C., or between about 50-200° C., or between about 50-150° C., or between about 50-100° C.; pressure between about 0.1-50 atm, or between about 0.1-40 atm, or between about 0.1-30 atm, or between about 0.1-20 atm, or between about 0.1-10 atm, or between about 0.5-20 atm; N-containing inorganic or organic salt wt % in water between about 0.5-50%, or between about 0.5-25%, or between about 0.5-10%, or between about 3-30%, or between about 5-20%; or combination thereof.

Agitation may be used to affect dissolution of the lime or the limestone with the N-containing salt solution in the dissolution reactor, for example, by eliminating hot and cold spots to optimize the dissolution/solvation of the lime or the limestone, high shear mixing, wet milling, and/or sonication may be used to break open the lime or the limestone. During or after high shear mixing and/or wet milling, the lime or the limestone suspension may be treated with the N-containing salt solution.

In some embodiments, the dissolution of the lime or the limestone with the N-containing salt solution (illustrated as e.g., ammonium chloride) results in the formation of the aqueous solution comprising calcium salt and solid. In some embodiments, the solid insoluble impurities may be removed from the aqueous solution of the calcium salt (step B in FIGS. 2A, 2B, 3A, 3B, 4A, and 4B) before the aqueous solution is treated with the carbon dioxide in the process. The solid may optionally be removed from the aqueous solution by filtration and/or centrifugation techniques.

It is to be understood that the step B in FIGS. 2A, 2B, 3A, 3B, 4A, and 4B is optional and in some embodiments, the solid may not be removed from the aqueous solution (not shown in the figures) and the aqueous solution containing calcium salt as well as the solid is contacted with the carbon dioxide (in step C in FIGS. 2A, 2B, 3A, 3B, 4A, and 4B) to form the precipitate. In such embodiments, the precipitation material further comprises solid.

In some embodiments, the solid obtained from the dissolution of the lime or the limestone (shown as insoluble impurities in FIGS. 2A, 2B, 3A, 3B, 4A, and 4B) is calcium depleted solid and may be used as a cement substitute (such as a substitute for Portland cement). In some embodiments, the solid comprises silicate, iron oxide, alumina, or combination thereof. The silicate includes, without limitation, clay (phyllosilicate), alumino-silicate, etc.

In some embodiments, the solid is between about 1-85 wt %; or between about 1-80 wt %; or between about 1-75 wt %; or between about 1-70 wt %; or between about 1-60 wt %; or between about 1-50 wt %; or between about 1-40 wt %; or between about 1-30 wt %; or between about 1-20 wt %; or between about 1-10 wt % or between about 1-5 wt %; or between about 1-2 wt %, in the aqueous solution, in the precipitation material, or combination thereof.

As illustrated in step C in FIGS. 2A, 2B, 3A, 3B, 4A, and 4B, the aqueous solution comprising calcium salt (and optionally solid) and dissolved ammonia and/or ammonium salt is contacted with the gaseous stream comprising carbon dioxide recycled from the calcination step of the limestone calcination process or the dissolution step of the direct limestone process, to form the precipitation material comprising calcium carbonate, wherein the calcium carbonate comprises reactive vaterite, shown in the reaction below:

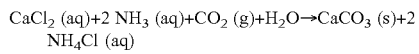

The absorption of the $CO_2$ into the aqueous solution produces $CO_2$-charged water containing carbonic acid, a species in equilibrium with both bicarbonate and carbonate. The precipitation material is prepared under one or more precipitation conditions (as described herein) suitable to form reactive vaterite cement material.

In one aspect, the ammonia formed in the dissolution step A may be partially or fully present in a gaseous form. This aspect is illustrated in FIGS. 3A and 3B.

In one aspect, there are provided methods to form the reactive vaterite cement composition by (a) calcining the limestone to form the mixture comprising lime and the gaseous stream comprising carbon dioxide; (b) dissolving the mixture comprising lime in the N-containing salt solution to produce the aqueous solution comprising calcium salt, and the gaseous stream comprising ammonia; and (c) treating the aqueous solution comprising calcium salt with the gaseous stream comprising carbon dioxide and the gaseous stream comprising ammonia to form the reactive vaterite cement composition. This aspect is illustrated in FIG. 3A, wherein the gaseous stream comprising $CO_2$ from the calcination step and the gaseous stream comprising $NH_3$ from step A of the process is recirculated to the precipitation reactor (step C) for the formation of the reactive vaterite cement. The remaining steps of FIG. 3A are identical to the steps of FIG. 2A. It is to be understood that the processes of both FIG. 2A and FIG. 3A can also take place simultaneously such that the N-containing salt, such as the N-containing inorganic salt or the N-containing organic salt and optionally ammonia may be partially present in the aqueous solution and partially present in the gaseous stream.

The reaction taking place in the aforementioned aspect may be shown as below:

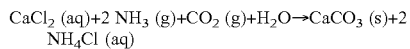

In one aspect, there are provided methods to form the reactive vaterite cement composition by (a) dissolving the limestone in the N-containing salt solution to produce the aqueous solution comprising calcium salt, and the gaseous stream comprising ammonia and the gaseous stream comprising carbon dioxide; and (c) treating the aqueous solution comprising calcium salt with the gaseous stream comprising carbon dioxide and the gaseous stream comprising ammonia to form the reactive vaterite cement composition. This aspect is illustrated in FIG. 3B, wherein the gaseous stream comprising $CO_2$ and the gaseous stream comprising $NH_3$ from step A of the process is recirculated to the precipitation reactor (step C) for the formation of the reactive vaterite cement. The remaining steps of FIG. 3B are identical to the steps of FIG. 2B. It is to be understood that the processes of both FIG. 2B and FIG. 3B can also take place simultaneously such that the N-containing salt, such as the N-containing inorganic salt or the N-containing organic salt and optionally ammonia may be partially present in the aqueous solution and partially present in the gaseous stream.

In some embodiments of the aspects and embodiments provided herein, the gaseous stream comprising ammonia may have ammonia from an external source and/or is recovered and re-circulated from step A of the process.

In some embodiments of the aspects and embodiments provided herein, wherein the gaseous stream comprises ammonia and/or the gaseous stream comprises carbon dioxide, no external source of carbon dioxide and/or ammonia is used, and the process is a closed loop process. Such a closed loop process is being illustrated in the figures described herein.

In some embodiments, the dissolution of the lime or the limestone with some of the N-containing organic salt may not result in the formation of ammonia gas or the amount of ammonia gas formed may not be substantial. In embodiments where the ammonia gas is not formed or is not formed in substantial amounts, the methods and systems illustrated in FIGS. 2A and 2B where the aqueous solution comprising calcium salt is treated with the carbon dioxide gas, are applicable. In such embodiments, the organic amine salt may remain in the aqueous solution in fully or partially dissolved state or may separate as an organic amine layer, as shown in the reaction below:

The N-containing organic salt or the N-containing organic compound remaining in the supernatant solution after the precipitation may be called residual N-containing organic salt or residual N-containing organic compound. Methods and systems have been described herein to recover the residual compounds from the precipitate as well as the supernatant solution.

In one aspect, the ammonia gas and the $CO_2$ gas may be recovered and cooled down in a cooling reactor before mixing the cooled solution with the aqueous solution comprising calcium salt. This aspect is illustrated in FIGS. 4A and 4B.

In one aspect, there are provided methods to form the reactive vaterite cement composition by (i) calcining the limestone to form the lime and the gaseous stream comprising carbon dioxide; (ii) dissolving the lime in the aqueous N-containing inorganic salt solution or N-containing organic salt solution to produce a first aqueous solution comprising calcium salt, and the gaseous stream comprising ammonia; (iii) recovering the gaseous stream comprising carbon dioxide and the gaseous stream comprising ammonia and subjecting the gaseous streams to a cooling process to condense a second aqueous solution comprising ammonium bicarbonate, ammonium carbonate, ammonia, ammonium carbamate, or combination thereof; and (iv) treating the first aqueous solution comprising calcium salt with the second aqueous solution comprising ammonium bicarbonate, ammonium carbonate, ammonia, ammonium carbamate, or combination thereof to form the reactive vaterite cement composition. This aspect is illustrated in FIG. 4A, wherein the gaseous stream comprising $CO_2$ from the calcination step and the gaseous stream comprising $NH_3$ from step A of the process is recirculated to the cooling reactor/reaction (step F) for the formation of the carbonate and bicarbonate solution as shown in the reactions further herein below. Remaining steps of FIG. 4A are identical to the steps of FIGS. 2A and 3A.

It is to be understood that the aforementioned aspect illustrated in FIG. 4A may be combined with the aspects illustrated in FIG. 2A and/or FIG. 3A such that the precipitation step C comprises treating the first aqueous solution comprising calcium salt with the second aqueous solution comprising ammonium bicarbonate, ammonium carbonate, ammonia, ammonium carbamate, or combination thereof (illustrated in FIG. 4A), as well as comprises treating the aqueous solution comprising calcium salt with the gaseous stream comprising carbon dioxide (illustrated in FIG. 2A) and/or comprises treating the aqueous solution comprising calcium salt with the gaseous stream comprising carbon dioxide and the gaseous stream comprising ammonia (illustrated in FIG. 3A). In such embodiments, the gaseous stream comprising carbon dioxide is split between the stream going to the cooling process and the stream going to the precipitation process. Similarly, in such embodiments, the gaseous stream comprising ammonia is split between the stream going to the cooling process and the stream going to the precipitation process. Any combination of the processes depicted in FIGS. 2A, 3A, and 4A is possible and all are within the scope of this disclosure.

In one aspect, there are provided methods to form the reactive vaterite cement composition by (i) dissolving the limestone in the aqueous N-containing inorganic salt solution or N-containing organic salt solution to produce the first aqueous solution comprising calcium salt, the gaseous stream comprising carbon dioxide and the gaseous stream comprising ammonia; (ii) recovering the gaseous stream comprising carbon dioxide and the gaseous stream comprising ammonia and subjecting the gaseous streams to a cooling process to condense a second aqueous solution comprising ammonium bicarbonate, ammonium carbonate, ammonia, ammonium carbamate, or combination thereof; and (iii) treating the first aqueous solution comprising calcium salt with the second aqueous solution comprising ammonium bicarbonate, ammonium carbonate, ammonia, ammonium carbamate, or combination thereof to form the reactive vaterite cement composition. This aspect is illustrated in FIG. 4B, wherein the gaseous stream comprising $CO_2$ and the gaseous stream comprising $NH_3$ from step A of the process are recirculated to the cooling reactor/reaction (step F) for the formation of the carbonate and bicarbonate solutions as shown in the reactions further herein below. The remaining steps of FIG. 4B are identical to the steps of FIGS. 2B and 3B.

It is to be understood that the aforementioned aspect illustrated in FIG. 4B may be combined with the aspects illustrated in FIG. 2B and/or FIG. 3B such that the precipitation step C comprises treating the first aqueous solution comprising calcium salt with the second aqueous solution comprising ammonium bicarbonate, ammonium carbonate, ammonia, ammonium carbamate, or combination thereof (illustrated in FIG. 4B), as well as comprises treating the aqueous solution comprising calcium salt with the gaseous stream comprising carbon dioxide (illustrated in FIG. 2B) and/or comprises treating the aqueous solution comprising calcium salt with the gaseous stream comprising carbon dioxide and the gaseous stream comprising ammonia (illustrated in FIG. 3B). In such embodiments, the gaseous stream comprising carbon dioxide is split between the stream going to the cooling process and the stream going to the precipitation process. Similarly, in such embodiments, the gaseous stream comprising ammonia is split between the stream going to the cooling process and the stream going to the precipitation process. Any combination of the processes depicted in FIGS. 2B, 3B, and 4B is possible and all are within the scope of this disclosure.

The ammonium carbamate has a formula $NH_4[H_2NCO_2]$ consisting of ammonium ions $NH_4^+$, and carbamate ions $H_2NCO_2^-$.

The combination of these condensed products in the second aqueous solution may be dependent on the one or more of the cooling conditions during the cooling step.

In some embodiments of the aforementioned aspect and embodiments, the gaseous stream (e.g., the gaseous streams going to the cooling reaction/reactor (step F in FIGS. 4A and 4B)) further comprises water vapor. In some embodiments of the aforementioned aspect and embodiments, the gaseous stream further comprises between about 20-90%; or between about 20-80%; or between about 20-70%; or between about 20-60%; or between about 20-55%; or between about 20-50%; or between about 20-40%; or between about 20-30%; or between about 20-25%; or between about 30-90%; or between about 30-80%; or between about 30-70%; or between about 30-60%; or between about 30-50%; or between about 30-40%; or between about 40-90%; or between about 40-80%; or between about 40-70%; or between about 40-60%; or between about 40-50%; or between about 50-90%; or between about 50-80%; or between about 50-70%; or between about 50-60%; or between about 60-90%; or between about 60-80%; or between about 60-70%; or between about 70-90%; or between about 70-80%; or between about 80-90%, water vapor.

Intermediate steps in the cooling reaction/reactor may include the formation of ammonium carbonate and/or ammonium bicarbonate and/or ammonium carbamate, by reactions as below:

$$2\ NH_3+CO_2+H_2O \rightarrow (NH_4)_2CO_3$$

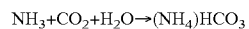
$$NH_3+CO_2+H_2O \rightarrow (NH_4)HCO_3$$

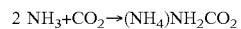
$$2\ NH_3+CO_2 \rightarrow (NH_4)NH_2CO_2$$

Similar reactions may be shown for the N-containing organic salt:

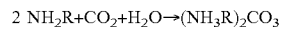
$$2\ NH_2R+CO_2+H_2O \rightarrow (NH_3R)_2CO_3$$

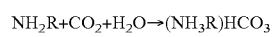
$$NH_2R+CO_2+H_2O \rightarrow (NH_3R)HCO_3$$

An advantage of cooling the ammonia in the cooling reaction/reactor is that ammonia may have a limited vapor pressure in the vapor phase of the dissolution reaction. By reacting the ammonia with $CO_2$, as shown in the reactions above, can remove some ammonia from the vapor space, allowing more ammonia to leave the dissolution solution.

The second aqueous solution comprising ammonium bicarbonate, ammonium carbonate, ammonia, ammonium carbamate or combination thereof (exiting the cooling reaction/reactor in FIGS. 4A and 4B) is then treated with the first aqueous solution comprising calcium salt from the dissolution reaction/reactor, in the precipitation reaction/reactor (step C) to form the precipitation material comprising reactive vaterite cement:

$$(NH_4)_2CO_3+CaCl_2 \rightarrow CaCO_3\ (vaterite)+2\ NH_4Cl$$

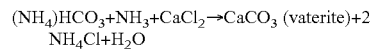
$$(NH_4)HCO_3+NH_3+CaCl_2 \rightarrow CaCO_3\ (vaterite)+2\ NH_4Cl+H_2O$$

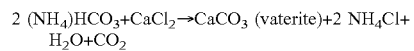
$$2\ (NH_4)HCO_3+CaCl_2 \rightarrow CaCO_3\ (vaterite)+2\ NH_4Cl+H_2O+CO_2$$

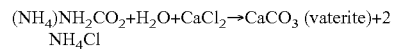
$$(NH_4)NH_2CO_2+H_2O+CaCl_2 \rightarrow CaCO_3\ (vaterite)+2\ NH_4Cl$$

In some embodiments of the aspects and embodiments provided herein, the cooling step takes place under the one or more cooling conditions comprising temperature between about 0-200° C., or between about 0-150° C., or between about 0-75° C., or between about 0-100° C., or between about 0-80° C., or between about 0-60° C., or between about 0-50° C., or between about 0-40° C., or between about 0-30° C., or between about 0-20° C., or between about 0-10° C.

In some embodiments of the aspects and embodiments provided herein, the one or more cooling conditions comprise pressure between about 0.5-50 atm; or between about 0.5-25 atm; or between about 0.5-10 atm; or between about 0.1-10 atm; or between about 0.5-1.5 atm; or between about 0.3-3 atm.

In some embodiments, the formation, the particle size or its distribution, and the quality of the reactive vaterite formed in the methods and systems provided herein, is dependent on the amount and/or the ratio of the condensed products in the second aqueous solution comprising ammonium bicarbonate, ammonium carbonate, ammonia, ammonium carbamate, or combination thereof.

In some embodiments, the presence or absence or distribution of the condensed products in the second aqueous solution comprising ammonium bicarbonate, ammonium carbonate, ammonia, ammonium carbamate, or combination thereof, can be selected in order to maximize the formation of the reactive vaterite and/or to obtain a desired particle size distribution. This selection can be based on the one or more cooling conditions, such as, pH of the aqueous solution in the cooling reactor, flow rate of the $CO_2$ and the $NH_3$ gases, and/or ratio of the $CO_2$:$NH_3$ gases. The inlets for the cooling reactor may be carbon dioxide ($CO_{2(g)}$), the dissolution reactor gas exhaust containing ammonia ($NH_{3(g)}$), water vapor, and optionally fresh makeup water (or some other dilute water stream). The outlet may be a slipstream of the reactor's recirculating fluid (the second aqueous solution), which is directed to the precipitation reactor for contacting with the first aqueous solution and optionally additional carbon dioxide and/or ammonia. The pH of the system may be controlled by regulating the flow rate of $CO_2$ and $NH_3$ into the cooling reactor. The conductivity of the system may be controlled by the addition of dilute makeup water to the cooling reactor. Volume may be maintained constant by using a level detector in the cooling reactor or its reservoir.

It is to be understood that while FIGS. 4A and 4B illustrate a separate cooling reaction/reactor, in some embodiments, the dissolution reaction/reactor may be integrated with the cooling reaction/reactor. For example, the dissolution reactor may be integrated with a condenser acting as a cooling reactor. Various configurations of the integrated reactor described above, are described in U.S. application Ser. No. 17/184,933, filed Feb. 25, 2021, which is incorporated herein by reference in its entirety.

In the aforementioned aspects, both the dissolution and the cooling reactors are fitted with inlets and outlets to receive the required gases and collect the aqueous streams. In some embodiments of the aforementioned aspect, the dissolution reactor comprises a stirrer to mix the lime or the limestone with the aqueous N-containing salt solution. The stirrer can also facilitate upward movement of the gases. In some embodiments of the aforementioned aspect, the dissolution reactor is configured to collect the solids settled at the bottom of the reactor after removing the first aqueous solution comprising calcium salt. In some embodiments of the aforementioned aspect, the cooling tower comprises one or more trays configured to catch and collect the condensed second aqueous solution and prevent it from falling back into the dissolution reactor. As such, the cooling/condensation may be accomplished through use of infusers, bubblers, fluidic Venturi reactors, spargers, gas filters, sprays, trays, or packed column reactors, and the like.

In some embodiments, the contacting of the aqueous solution comprising calcium salt with carbon dioxide and optionally ammonia or second aqueous solution is achieved by contacting the aqueous solution to achieve and maintain a desired pH range, a desired temperature range, and/or desired divalent cation concentration using a convenient protocol as described herein (precipitation conditions). In some embodiments, the systems include a precipitation reactor configured to contact the aqueous solution comprising calcium salt with carbon dioxide and optionally ammonia from step A of the process or the systems include a precipitation reactor configured to contact the first aqueous solution comprising calcium salt with the second aqueous solution comprising ammonium bicarbonate, ammonium carbonate, ammonia, ammonium carbamate, or combination thereof.

In some embodiments, the aqueous solution comprising calcium salt may be placed in a precipitation reactor, wherein the amount of the aqueous solution comprising calcium salt added is sufficient to raise the pH to a desired level (e.g., a pH that induces precipitation of the precipitation material) such as pH 7-9, pH 7-8.7, pH 7-8.5, pH 7-8, pH 7.5-8, pH 8-8.5, pH 8.5-9, pH 9-14, pH 10-14, pH 11-14, pH 12-14, or pH 13-14. In some embodiments, the pH of the aqueous solution comprising calcium salt when contacted with the carbon dioxide and optionally the $NH_3$ or the second aqueous solution, is maintained at between 7-9 or between 7-8.7 or between 7-8.5 or between 7.5-8.5 or between 7-8, or between 7.6-8.5, or between 8-8.5, or between 7.5-9.5 in order to form the reactive vaterite.

The aqueous solution comprising calcium salt may be contacted with the gaseous stream comprising the $CO_2$ and optionally the $NH_3$ using any convenient protocol. The contact protocols of interest include, but not limited to, direct contacting protocols (e.g., bubbling the gases through the first aqueous solution), concurrent contacting means (i.e., contact between unidirectional flowing gaseous and liquid phase streams), countercurrent means (i.e., contact between oppositely flowing gaseous and liquid phase streams), and the like. As such, contact may be accomplished through use of infusers, bubblers, fluidic Venturi reactors, spargers, gas filters, sprays, trays, or packed column reactors, and the like, in the precipitation reactor. In some embodiments, gas-liquid contact is accomplished by forming a liquid sheet of solution with a flat jet nozzle, wherein the gases and the liquid sheet move in countercurrent, co-current, or crosscurrent directions, or in any other suitable manner. In some embodiments, gas-liquid contact is accomplished by contacting liquid droplets of the solution having an average diameter of 500 micrometers or less, such as 100 micrometers or less, with the gas source.

Any number of the gas-liquid contacting protocols described herein may be utilized. Gas-liquid contact or the liquid-liquid contact is continued until the pH of the precipitation reaction mixture is optimum (various optimum pH values have been described herein to form the precipitation material comprising e.g., reactive vaterite), after which the precipitation reaction mixture is allowed to stir. The rate at which the pH drops may be controlled by addition of more of the aqueous solution comprising calcium salt during gas-liquid contact or the liquid-liquid contact. In addition, additional aqueous solution may be added after sparging to raise the pH back to basic levels for precipitation of a portion or all the precipitation material. In any case, the precipitation material may be formed upon removing protons from certain species in the precipitation reaction mixture. The precipitation material comprising carbonates may then be separated and optionally, further processed.

The one or more precipitation conditions include those that modulate the environment of the precipitation reaction mixture to produce the desired precipitation material comprising reactive vaterite. Such one or more precipitation conditions include, but not limited to, temperature, pH, pressure, ion ratio, precipitation rate, presence of additive, presence of ionic species, concentration of additive and ionic species, stirring, residence time, mixing rate, forms of agitation such as ultrasonics, presence of seed crystal, catalyst, membrane, or substrate, dewatering, drying, ball milling, etc. In some embodiments, the average particle size of the reactive vaterite may also depend on the one or more precipitation conditions used in the precipitation of the precipitation material.

For example, the temperature of the precipitation reaction may be raised to a point at which an amount suitable for precipitation of the desired precipitation material occurs. In such embodiments, the temperature of the precipitation reaction may be raised to a value, such as from 20° C. to 60° C., and including from 25° C. to 60° C.; or from 30° C. to 60° C.; or from 35° C. to 60° C.; or from 40° C. to 60° C.; or from 50° C. to 60° C.; or from 25° C. to 50° C.; or from 30° C. to 50° C.; or from 35° C. to 50° C.; or from 40° C. to 50° C.; or from 25° C. to 40° C.; or from 30° C. to 40° C.; or from 25° C. to 30° C. In some embodiments, the temperature of the precipitation reaction may be raised using energy generated from low or zero carbon dioxide emission sources (e.g., solar energy source, wind energy source, hydroelectric energy source, waste heat from the flue gases of the carbon emitter, etc).

The pH of the precipitation reaction may also be raised to an amount suitable for the precipitation of the desired precipitation material. In such embodiments, the pH of the precipitation reaction may be raised to alkaline levels for precipitation. In some embodiments, the precipitation conditions required to form the precipitation material include pH higher than 7 or pH of 8 or pH of between 7.1-8.5 or pH of between 7.5-8 or between 7.5-8.5 or between 8-8.5 or between 8-9 or between 7.6-8.4, in order to form the precipitation material. The pH may be raised to pH 9 or higher, such as pH 10 or higher, including pH 11 or higher or pH 12.5 or higher.

Adjusting major ion ratios during precipitation may influence the nature of the precipitation material. Major ion ratios may have considerable influence on polymorph formation. For example, as the magnesium:calcium ratio in the water increases, aragonite may become the major polymorph of calcium carbonate in the precipitation material over low-magnesium vaterite. At low magnesium:calcium ratios, low-magnesium calcite may become the major polymorph. In some embodiments, where $Ca^{2+}$ and $Mg^{2+}$ are both present, the ratio of $Ca^{2+}$ to $Mg^{2+}$ (i.e., $Ca^{2+}:Mg^{2+}$) in the precipitation material is 1:1 to 1:2.5; 1:2.5 to 1:5; 1:5 to 1:10; 1:10 to 1:25; 1:25 to 1:50; 1:50 to 1:100; 1:100 to 1:150; 1:150 to 1:200; 1:200 to 1:250; 1:250 to 1:500; or 1:500 to 1:1000. In some embodiments, the ratio of $Mg^{2+}$ to $Ca^{2+}$ (i.e., $Mg^{2+}:Ca^{2+}$) in the precipitation material is 1:1 to 1:2.5; 1:2.5 to 1:5; 1:5 to 1:10; 1:10 to 1:25; 1:25 to 1:50; 1:50 to 1:100; 1:100 to 1:150; 1:150 to 1:200; 1:200 to 1:250; 1:250 to 1:500; or 1:500 to 1:1000.

In some embodiments, the one or more precipitation conditions to produce the desired precipitation material from the precipitation reaction may include, as above, the temperature and pH, as well as, in some instances, the concentrations of additives and ionic species in the water. The additives have been described herein. The presence of the additives and the concentration of the additives may also favor formation of stable or reactive vaterite or PCC. In some embodiments, a middle chain or long chain fatty acid ester may be added to the first aqueous solution during the precipitation to form the PCC. Examples of fatty acid esters include, without limitation, cellulose such as carboxymethyl cellulose, sorbitol, citrate such as sodium or potassium citrate, stearate such as sodium or potassium stearate, phosphate such as sodium or potassium phosphate, sodium tripolyphosphate, hexametaphosphate, EDTA, or combination thereof. In some embodiments, a combination of stearate and citrate may be added during the precipitation step of the process to form the PCC.

In some embodiments, the gas leaving the precipitation reactor (shown as "scrubbed gas" in the figures) passes to a gas treatment unit for a scrubbing process. The mass balance and equipment design for the gas treatment unit may depend on the properties of the gases. In some embodiments, the gas treatment unit may incorporate an HCl scrubber for recovering the small amounts of $NH_3$ in the gas exhaust stream that may be carried from the $CO_2$ absorption, precipitation step by the gas. $NH_3$ may be captured by the HCl solution through:

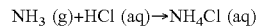

$NH_3$ (g)+HCl (aq)→$NH_4Cl$ (aq)

The $NH_4Cl$ (aq) from the HCl scrubber may be recycled to the dissolution step A.

In some embodiments, the gas exhaust stream comprising ammonia (shown as "scrubbed gas" in the figures) may be subjected to a scrubbing process where the gas exhaust stream comprising ammonia is scrubbed with the carbon dioxide from the industrial process and water to produce a solution of ammonia. The inlets for the scrubber may be carbon dioxide ($CO_{2(g)}$), the reactor gas exhaust containing ammonia ($NH_{3(g)}$), and fresh makeup water (or some other dilute water stream). The outlet may be a slipstream of the scrubber's recirculating fluid (e.g. $H_3N$—$CO_{2(aq)}$ or carbamate), which may optionally be returned back to the main reactor for contacting with carbon dioxide and precipitation. The pH of the system may be controlled by regulating the flow rate of $CO_{2(g)}$ into the scrubber.

In some embodiments, the methods and systems provided herein further include separating the precipitation material (step D in FIGS. 2A, 2B, 3A, 3B, 4A, and 4B) from the aqueous solution by dewatering to form reactive vaterite cake or wet form or slurry form of the reactive vaterite cement. The reactive vaterite cement cake may be subjected optionally to rinsing, and optionally drying (step E in FIGS. 2A, 2B, 3A, 3B, 4A, and 4B). The dried reactive vaterite cement composition with desired particle size(s) and distribution may then be mixed optionally with other components to form a blended composition of the reactive vaterite cement composition and sent to the methods and systems to form the cement products (shown in FIGS. 2A, 2B, 3A, 3B, 4A, and 4B). In some embodiments, the reactive vaterite cement cake may not be dried and may be sent as is to the methods and systems to form the cement products (shown in FIGS. 2A, 2B, 3A, 3B, 4A, and 4B).

The methods and systems provided herein may result in residual N-containing salt such as the residual N-containing inorganic or N-containing organic salt, e.g., residual ammonium salt remaining in the supernatant solution as well as in the precipitate itself after the formation of the precipitate. The residual base such as the N-containing inorganic or N-containing organic salt, e.g., residual ammonium salt (e.g., residual $NH_4Cl$) as used herein includes any salt that may be formed by ammonium ions and anions present in the solution including, but not limited to halogen ions such as chloride ions, nitrate or nitrite ions, and sulfur ions such as, sulfate ions, sulfite ions, thiosulfate ions, hydrosulfide ions, and the like. In some embodiments, the residual N-containing inorganic salt comprises ammonium acetate, ammonium halide, ammonium sulfate, ammonium sulfite, ammonium hydrosulfide, ammonium thiosulfate, ammonium nitrate, ammonium nitrite, or combination thereof. These residual salts may be removed and optionally recovered from the supernatant solution as well as the precipitate. In some embodiments, the supernatant solution further comprising the N-containing inorganic or N-containing organic salt, e.g., residual ammonium salt (e.g., residual $NH_4Cl$), is recycled back to the dissolution reactor for the dissolution of the lime or the limestone (to step A in FIGS. 2A, 2B, 3A, 3B, 4A, and 4B).

The cake comprising reactive vaterite cement may be sent to the dryer (step E in FIGS. 2A, 2B, 3A, 3B, 4A, and 4B) to form dry powder composition containing multi-modal distribution of the reactive vaterite cement or the reactive vaterite cement with desired particle size. The powder form of the reactive vaterite cement is used further to form the cement products, as described herein. The cake may be dried using any drying techniques known in the art such as, but not limited to fluid bed dryer or swirl fluidizer. The resulting solid powder may be then mixed with other components such as, aluminosilicate material, SCM, e.g., limestone, Portland cement clinker, admixture, accelerator, additive, or mixture thereof to make different types of the reactive vaterite cement compositions described herein. In some embodiments, the slurry form with reduced water or the cake form of the reactive vaterite cement composition is directly used to form the cement products, as described herein.

Depending on the particular drying protocol of the system, the drying station may include a filtration element, freeze-drying structure, spray-drying structure, etc. In some embodiments, the precipitate may be dried by fluid bed dryer. In certain embodiments, waste heat from a power plant or similar operation may be used to perform the drying step when appropriate.

The reactive vaterite cement in the cement products (optionally including solid from step B as described herein) undergoes curing and transformation to the interlocking acicular shaped aragonite (optionally containing one or more voids forming a honeycomb structure) or calcite or carboaluminate (when combined with Portland cement or aluminosilicate material) and sets and hardens into the cement product.

In the systems provided herein, the separation or dewatering step D may be carried out on the separation station. The cake or the precipitate comprising reactive vaterite cement may be stored in the supernatant for a period of time following precipitation and prior to separation. For example, the precipitate comprising reactive vaterite cement may be stored in the supernatant for a period of time ranging from few min to hours to 1 to 1000 days or longer, such as 1 to 10 days or longer, at a temperature ranging from 1° C. to 40° C., such as 20° C. to 25° C. Separation or dewatering may be achieved using any of a number of convenient approaches, including draining (e.g., gravitational sedimentation of the precipitate comprising reactive vaterite cement followed by draining), decanting, filtering (e.g., gravity filtration, vacuum filtration, filtration using forced air), centrifuging, pressing, or any combination thereof. Separation of the bulk water from the precipitate comprising reactive vaterite cement produces a wet cake of the composition comprising reactive vaterite cement, or a dewatered composition comprising reactive vaterite cement. Liquid-solid separator such as Epuramat's Extrem-Separator ("ExSep") liquid-solid separator, Xerox PARC's spiral concentrator, or a modification of either of Epuramat's ExSep or Xerox PARC's spiral concentrator, may be useful for the separation of the composition comprising reactive vaterite cement.

In some embodiments, the reactive vaterite cement composition may be activated such that the reactive vaterite cement leads to the interlocking acicular shaped aragonitic pathway and not calcite pathway during dissolution-re-precipitation process. In some embodiments, the reactive vaterite cement composition is activated in such a way that after the dissolution-re-precipitation process, the interlocking acicular shaped aragonite formation is enhanced, and the calcite formation is suppressed. The activation of the reactive vaterite cement composition may result in control over the interlocking acicular shaped aragonite formation and crystal growth. Various examples of the activation of the reactive vaterite cement composition, such as, but not limited to, nuclei activation, thermal activation, mechanical activation, chemical activation, or combination thereof, are described herein. In some embodiments, the reactive vaterite is activated through various processes such that the interlocking acicular shaped aragonite optionally containing the calcite in minor amount and its morphology and/or crystal growth can be controlled upon reaction of the reactive vaterite cement composition with water. The interlocking acicular shaped aragonite with optional calcite formed results in higher tensile strength and fracture tolerance to the cement products formed from the reactive vaterite.

In some embodiments, the reactive vaterite may be activated by mechanical means, as described herein. For example, the reactive vaterite cement composition may be activated by creating surface defects on the vaterite composition such that the interlocking acicular shaped aragonite formation is accelerated. In some embodiments, the activated vaterite is a ball-milled reactive vaterite or is a reactive vaterite with surface defects such that the interlocking acicular shaped aragonite formation pathway is facilitated.

The reactive vaterite cement composition may also be activated by providing chemical or nuclei activation to the vaterite composition. Such chemical or nuclei activation may be provided by one or more of aragonite seeds, inorganic additive, or organic additive. The aragonite seed present in the compositions provided herein may be obtained from natural or synthetic sources. The natural sources include, but not limited to, reef sand, lime, hard skeletal material of certain fresh-water and marine invertebrate organisms, including pelecypods, gastropods, mollusk shell, and calcareous endoskeleton of warm- and cold-water corals, pearls, rocks, sediments, ore minerals (e.g., serpentine), and the like. The synthetic sources include, but not limited to, precipitated aragonite, such as formed from sodium carbonate and calcium chloride; or the interlocking acicular shaped aragonite formed by the transformation of the reactive vaterite to the aragonite, such as transformed reactive vaterite described herein.

In some embodiments, the inorganic additive or the organic additive in the compositions provided herein can be any additive that activates reactive vaterite. Some examples of inorganic additive or organic additive in the compositions provided herein, include, but not limited to, sodium decyl sulfate, lauric acid, sodium salt of lauric acid, urea, citric acid, sodium salt of citric acid, phthalic acid, sodium salt of phthalic acid, taurine, creatine, dextrose, poly(n-vinyl-1-pyrrolidone), aspartic acid, sodium salt of aspartic acid, magnesium chloride, acetic acid, sodium salt of acetic acid, glutamic acid, sodium salt of glutamic acid, strontium chloride, gypsum, lithium chloride, sodium chloride, glycine, sodium citrate dehydrate, sodium bicarbonate, magnesium sulfate, magnesium acetate, sodium polystyrene, sodium dodecylsulfonate, poly-vinyl alcohol, or combination thereof. In some embodiments, inorganic additive or organic additive in the compositions provided herein, include, but not limited to, taurine, creatine, poly(n-vinyl-1-pyrrolidone), lauric acid, sodium salt of lauric acid, urea, magnesium chloride, acetic acid, sodium salt of acetic acid, strontium chloride, magnesium sulfate, magnesium acetate, or combination thereof. In some embodiments, inorganic additive or organic additive in the compositions provided herein, include, but not limited to, magnesium chloride, magnesium sulfate, magnesium acetate, or combination thereof.

During the mixing of the reactive vaterite cement composition optionally with other components as mentioned herein and mixing with the aqueous medium to form the wet composition, the reactive vaterite cement composition may be subjected to high shear mixer (in the mixer system). The components of the reactive vaterite cement composition can be blended using any suitable protocol. Each material may be mixed at the time of work, or part of or all of the materials may be mixed in advance. As a mixing apparatus, any conventional apparatus can be used. For example, Hobart mixer, pin mixer, slant cylinder mixer, Omni Mixer, Henschel mixer, V-type mixer, and Nauta mixer can be employed.

The methods and systems provided herein further comprise a control system configured to remotely and/or automatedly control the calcining reactor, the dissolution reactor, and/or the treatment reactor.

The methods and systems may also include one or more detectors configured for monitoring the systems producing the reactive vaterite cement composition and the systems producing the cement products. Monitoring may include, but is not limited to, collecting data about the pressure, temperature, humidity, and composition. The detectors may be any convenient device configured to monitor, for example, pressure sensors (e.g., electromagnetic pressure sensors, potentiometric pressure sensors, etc.), temperature sensors (resistance temperature detectors, thermocouples, gas thermometers, thermistors, pyrometers, infrared radiation sensors, etc.), volume sensors (e.g., geophysical diffraction tomography, X-ray tomography, hydroacoustic surveyors, etc.), and devices for determining chemical makeup of the composition (e.g, IR spectrometer, NMR spectrometer, UV-vis spectrophotometer, high performance liquid chromatographs, inductively coupled plasma emission spectrometers, inductively coupled plasma mass spectrometers, ion chromatographs, X-ray diffractometers, gas chromatographs, gas chromatography-mass spectrometers, flow-injection analysis, scintillation counters, acidimetric titration, and flame emission spectrometers, etc.).

In some embodiments, detectors may also include a computer interface which is configured to provide a user with the collected data about the composition. In some embodiments, the summary may be stored as a computer readable data file or may be printed out as a user readable document.

In some embodiments, the detector may be a monitoring device such that it can collect real-time data (e.g., internal pressure, temperature, etc.). In other embodiments, the detector may be one or more detectors configured to determine the parameters at regular intervals, e.g., determining the composition every 1 minute, every 5 minutes, every 10 minutes, every 30 minutes, every 60 minutes, every 100 minutes, every 200 minutes, every 500 minutes, or some other interval.

A control station may include a set of valves or multi-valve systems which are manually, mechanically, or digitally controlled, or may employ any other convenient flow regulator protocol. In some instances, the control station may include a computer interface, (where regulation is computer-assisted or is entirely controlled by computer) configured to provide a user with input and output parameters to control the production of the cement products, as described above.

III. Cement Products

In one aspect, there are provided cement products formed from the compositions comprising the bimodal, trimodal, or multi-modal reactive vaterite compositions provided herein. In some embodiments, the cement product comprises an interlocking acicular shaped aragonite microstructure, calcite, carboaluminate, or combination thereof. In some embodiments, the interlocking acicular shaped aragonite surrounds one or more voids. In some embodiments, the interlocking acicular shaped aragonite surrounding one or more voids forms a honeycomb structure. In some embodiments, the cement product is lightweight cement product with low packing density or low bulk density.

The "cement product" as used herein includes any cement product formed from the reactive vaterite cement compositions provided herein.

In some embodiments, the cement product formed from the compositions provided herein, is a building material. The "building material" used herein includes material used in construction. Examples of such structures or the building materials include, but are not limited to, building, driveway, foundation, kitchen slab, furniture, pavement, road, bridge, motorway, overpass, parking structure, brick, block, wall, footing for a gate, fence, pole, or module thereof.

In some embodiments, the cement product formed from the compositions provided herein, is aggregates, such as e.g., lightweight aggregates.

In some embodiments, the cement product provided herein comprising interlocking acicular shaped aragonite has up to about 99.9% aragonite, or up to 99% aragonite, or up to 97% aragonite, or up to 95% aragonite, or up to 90% aragonite, or up to 80% aragonite, or between about 80-99.9% aragonite, or between about 80-99% aragonite, or between about 80-95% aragonite. In some embodiments, the remaining amount in the cement product is vaterite and/or calcite. The % of aragonite may be wt %.

In some embodiments, the cement product provided herein comprising interlocking acicular shaped aragonite, has porosity of between about 10-90%. The % of porosity may be vol %. In some embodiments, depending on the average particle size and the particle distribution of the composition comprising reactive vaterite cement, the porosity of the cement products may be controlled to be between 10%-90%. Porosity may be beneficial for making lightweight cement products that may be useful for building applications, thermal insulating, filtration applications, and the like. In some embodiments, a highly porous cement product comprising the interlocking acicular shaped aragonite may be desired, in others a cement product of moderate porosity may be desired, while in other cases cement products of low porosity, or no porosity, may be desired. The aforementioned porous cement product may be lightweight cement product. Porosities of the cement products may be measured, e.g., by water uptake after oven drying followed by fully saturating the cement products by water immersion, expressed as % dry weight (measured relative to the dry weight), can be in the range of about 10-90%; or between about 10-80%; or between about 10-70%; or between about 10-60%; or between about 10-50%; or between about 10-40%; or between about 10-30%; or between about 10-20%; or between about 20-90%; or between about 20-80%; or between about 20-70%; or between about 20-60%; or between about 20-50%; or between about 20-40%; or between about 20-30%; or between about 30-90%; or between about 30-80%; or between about 30-70%; or between about 30-60%; or between about 30-50%; or between about 30-40%; or between about 40-90%; or between about 40-80%; or between about 40-70%; or between about 40-60%; or between about 40-50%; or between about 50-90%; or between about 50-80%; or between about 50-70%; or between about 50-60%; or between about 60-80%; or between about 70-80%; or between about 1-40%, such as 2-20%, or 2-15%, including 2-10% or even 3-9%.

In some embodiments, the aggregates provided herein comprising interlocking acicular shaped aragonite, may provide for mortars as fine aggregates and/or concretes as coarse aggregates. The fine aggregates may be materials that almost entirely pass through a Number 4 sieve (ASTM C 125 and ASTM C 33) and the coarse aggregate may be materials that are predominantly retained on a Number 4 sieve (ASTM C 125 and ASTM C 33).

In some embodiments, the cement product ranges in bulk density (unit weight) from 25-200 lb/ft$^3$ (pound/cubic feet), or from 25-110 lb/ft$^3$, or from 25-75 lb/ft$^3$, or from 25-50 lb/ft$^3$, or from 50-200 lb/ft$^3$, or from 50-100 lb/ft$^3$, or from 50-75 lb/ft$^3$, or from 75-175 lb/ft$^3$, or from 25-55 lb/ft$^3$, or from 75-125 lb/ft$^3$, or from 90-115 lb/ft$^3$, or from 100-200 lb/ft$^3$, or from 125-175 lb/ft$^3$, or from 140-160 lb/ft$^3$. Some embodiments include lightweight cement products, e.g., aggregates that have the bulk density (unit weight) of 25 lb/ft$^3$ to 75 lb/ft$^3$. Some embodiments include lightweight aggregates, e.g., aggregates that have the bulk density (unit weight) of 25 lb/ft$^3$ to 55 lb/ft$^3$.

In some embodiments of the foregoing aspects and the foregoing embodiments, the cement product provided herein comprising interlocking acicular shaped aragonite has a compressive strength of between about 250-5000 psi; or between about 250-4000 psi; or between about 250-3000 psi; or between about 250-2000 psi; or between about 250-1000 psi; or between about 250-500 psi; or between about 500-5000 psi; or between about 500-4000 psi; or between about 500-3000 psi; or between about 500-2000 psi; or between about 500-1000 psi; or between about 1000-5000 psi; or between about 1000-4000 psi; or between about 1000-3000 psi; or between about 1000-2000 psi; or between about 2000-5000 psi; or between about 2000-4000 psi; or between about 2000-3000 psi; or between about 3000-5000 psi; or between about 3000-4000 psi; or between about 4000-5000 psi. In some embodiments, the compressive strengths described herein are the compressive strengths after 1 day, or 3 days, or 7 days, or 28 days, or 56 days, or longer. In some embodiments, the cement product after setting and hardening has a 28-day compressive strength of at least 250 psi. In some embodiments, the cement product after setting and hardening has a 28-day compressive strength of at least 21 MPa (megapascal) or at least 3046 psi.

In some embodiments, the aggregates, such as e.g., the lightweight aggregates provided herein, are used in making various types of materials used in construction. For example only, the lightweight aggregates provided herein are a form of coarse or fine aggregates that have lower bulk density (more voids or porosity forming honeycomb microstructure) and are utilized to produce lightweight concrete. Common cementitious applications for the lightweight aggregates include, but not limited to, floor slabs in high-rise buildings, concrete masonry units, or any application where reduced weight of the concrete or the product is desired. The lightweight aggregates can also be utilized to increase the R-Value or insulating properties of the concrete or other materials by trapping air inside its structure. In some embodiments, internal curing of the concrete is another use of the lightweight aggregates where the lightweight aggregates may be pre-saturated with water prior to mixing concrete. The water may be then slowly released to the surrounding cement paste providing it with water to chemically react and gain strength. In some embodiments, the lightweight aggregates are used in agricultural applications as a soil additive to improve aeration and water retention or as a soilless growing media, such as used in certain hydroponic setups.

In some embodiments, following ASTM Standards may be applicable to the lightweight aggregates provided herein: ASTM C330M-17a Standard Specification for Lightweight Aggregates for Structural Concrete; ASTM C331M-17 Standard Specification for Lightweight Aggregates for Concrete Masonry Units; ASTM C332-17 Standard Specification for Lightweight Aggregates for Insulating Concrete; ASTM C495M-19 Standard Test Method for Compressive Strength of Lightweight Insulating Concrete; ASTM C513M-19 Obtaining and Testing Specimens of Hardened Lightweight Insulating Concrete for Compressive Strength; ASTM C567M-19 Standard Test Method for Determining Density of Structural Lightweight Concrete; ASTM C641-17 Standard Test Method for Iron Staining Materials in Lightweight Concrete Aggregates; ASTM C1761M-17 Standard Specification for Lightweight Aggregate for Internal Curing of Concrete.

In some embodiments, the lightweight aggregates used in forming the concrete contribute to reduced density of the concrete without compromising the compressive strength of the concrete.

In some embodiments, the cement product formed from the compositions provided herein, is a formed building material. The "formed building material" used herein includes material shaped into structure with defined physical shape.

Examples of the formed building materials that can be produced by the foregoing methods and systems, include, but not limited to, masonry unit, for example only, brick, block, and tile including, but not limited to, ceiling tile; construction panel, for example only, cement board and/or drywall; conduit; basin; beam; column, slab; acoustic barrier; insulation material; or combination thereof. Construction panels are formed building materials employed in a broad sense to refer to any non-load-bearing structural element that are characterized such that their length and width are substantially greater than their thickness. As such the panel may be a plank, a board, shingle, and/or tile.

In some embodiments, the cement board and/or the drywall may be used in making different types of boards such as, but not limited to, paper-faced board, fiberglass-faced or glass mat-faced board (e.g., surface reinforcement with glass fiber mat), fiberglass mesh reinforced board (e.g., surface reinforcement with glass mesh), and/or fiber-reinforced board (e.g., cement reinforcement with cellulose, glass, fiber etc.). These boards may be used in various applications including, but not limited to, siding such as, fiber-cement siding, roofing, soffit, sheathing, cladding, decking, ceiling, shaft liner, wall board, backer, trim, frieze, shingle, and fascia, and/or underlayment. The cement boards are formed building materials which in some embodiments, are used as backer boards for ceramics that may be employed behind bathroom tile, kitchen counter, backsplash, etc. and may have lengths ranging from 100 to 200 cm. Cement boards may vary in physical and mechanical properties. In some embodiments, the flexural strength may vary, ranging between 1 to 7.5 MPa, including 2 to 6 MPa, such as 5 MPa. The compressive strengths may also vary, ranging from 5 to 50 MPa, including 10 to 30 MPa, such as 15 to 20 MPa. In some embodiments, cement boards may be employed in environments having extensive exposure to moisture (e.g., commercial saunas).

Another type of construction panel is backer board. The backer board may be used for the construction of interior, and/or exterior floors, walls, and ceilings. Another type of construction panel is drywall. The drywall includes board that is used for construction of interior, and/or exterior floor, wall, and ceiling. One of the applications of the cement board or drywall is fiber cement siding.

In some embodiments, the formed building material is masonry unit. Masonry unit is formed building material used in the construction of load-bearing and non-load-bearing structures that is generally assembled using mortar, grout, and the like. Exemplary masonry units include bricks, blocks, and tiles.

Another formed building material is a conduit. Conduits are tubes or analogous structures configured to convey a gas or liquid, from one location to another. Conduits can include any number of different structures used in the conveyance of a liquid or gas that include, but are not limited to, pipes, culverts, box culverts, drainage channels and portals, inlet structures, intake towers, gate wells, outlet structures, and the like.

Another formed building material is basins. The term basin may include any configured container used to hold a liquid, such as water. As such, a basin may include, but is not limited to structures such as wells, collection boxes, sanitary manholes, septic tanks, catch basins, grease traps/separators, storm drain collection reservoirs, etc.

Another formed building material is a beam, which, in a broad sense, refers to a horizontal load-bearing structure possessing large flexural and compressive strengths. Beams may be rectangular cross-shaped, C-channel, L-section edge beams, I-beams, spandrel beams, H-beams, possess an inverted T-design, etc. Beams may also be horizontal load-bearing units, which include, but are not limited to joists, lintels, archways, and cantilevers.

Another formed building material is a column, which, in a broad sense, refers to a vertical load-bearing structure that carries loads chiefly through axial compression and includes structural elements such as compression members. Other vertical compression members may include, but are not limited to pillars, piers, pedestals, or posts.

Another formed building material is a concrete slab. Concrete slabs are those building materials used in the construction of prefabricated foundations, floors, and wall panels. In some instances, a concrete slab may be employed as a floor unit (e.g., hollow plank unit or double tee design).

Another formed building material is an acoustic barrier, which refers to a structure used as a barrier for the attenuation or absorption of sound. As such, an acoustic barrier may include, but is not limited to, structures such as acoustical panels, reflective barriers, absorptive barriers, reactive barriers, etc.

Another formed building material is an insulation material, which refers to a material used to attenuate or inhibit the conduction of heat. Insulation may also include those materials that reduce or inhibit radiant transmission of heat.

In some embodiments, the other formed building materials such as pre-cast concrete products include, but not limited to, bunker silo; cattle feed bunk; cattle grid; agricultural fencing; H-bunks; J-bunks; livestock slats; livestock watering troughs; architectural panel walls; cladding (brick); building trim; foundation; floors, including slab on grade; walls; double wall precast sandwich panel; aqueducts; mechanically stabilized earth panels; box culverts; 3-sided culverts; bridge systems; RR crossings; RR ties; sound walls/barriers; Jersey barriers; tunnel segments; reinforced concrete box; utility protection structure; hand holes; hollow core product; light pole base; meter box; panel vault; pull box; telecom structure; transformer pad; transformer vault; trench; utility vault; utility pole; controlled environment vaults; underground vault; mausoleum; grave stone; coffin; Hazmat storage container; detention vaults; catch basins; manholes; aeration system; distribution box; dosing tank; dry well; grease interceptor; leaching pit; sand-oil/oil-water interceptor; septic tank; water/sewage storage tank; wet wells; fire cisterns; floating dock; underwater infrastructure; decking; railing; sea walls; roofing tiles; pavers; community retaining wall; res. retaining wall; modular block systems; and segmental retaining walls.

In some embodiments, the methods and systems described herein include making artificial marine structures from the compositions provided herein including, but not limited to, artificial corals and reefs. In some embodiments, the artificial structures can be used in aquariums or the sea. In some embodiments, the aragonitic cement provides neutral or close to neutral pH which may be conducive for maintenance and growth of marine life. The aragonitic reefs may provide suitable habitat for marine species.

Throughout the description, where compositions are described as having, including, or comprising specific components, or where processes and methods are described as having, including, or comprising specific steps, it is contemplated that, additionally, there are compositions of the present invention that consist essentially of, or consist of, the recited components, and that there are processes and methods according to the present invention that consist essentially of, or consist of, the recited processing steps.

In the application, where an element or component is said to be included in and/or selected from a list of recited elements or components, it should be understood that the element or component can be any one of the recited elements or components, or the element or component can be selected from a group consisting of two or more of the recited elements or components.

Further, it should be understood that elements and/or features of a composition or a process described herein can be combined in a variety of ways without departing from the spirit and scope of the present invention, whether explicit or implicit herein. For example, where reference is made to a particular composition, that composition can be used in various embodiments of compositions of the present invention and/or in processes of the present invention, unless otherwise understood from the context. In other words, within this application, embodiments have been described and depicted in a way that enables a clear and concise application to be written and drawn, but it is intended and will be appreciated that embodiments may be variously combined or separated without parting from the present teachings and invention(s). For example, it will be appreciated that all features described and depicted herein can be applicable to all aspects of the invention(s) described and depicted herein.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

The use of the term "include," "includes," "including," "have," "has," "having," "contain," "contains," or "containing," including grammatical equivalents thereof, should be understood generally as open-ended and non-limiting, for example, not excluding additional unrecited elements or steps, unless otherwise specifically stated or understood from the context.

The use of any and all examples, or exemplary language herein, for example, "such as" or "including," is intended merely to illustrate better the present invention and does not pose a limitation on the scope of the invention unless claimed. No language in the specification should be construed as indicating any non-claimed element as essential to the practice of the present invention.

Certain ranges are presented herein with numerical values being preceded by the term "about." The term "about" is used herein to provide literal support for the exact number that it precedes, as well as a number that is near to or approximately the number that the term precedes. As used herein, the term "about" refers to a ±10% variation from the nominal value unless otherwise indicated or inferred.

Unless defined otherwise, all technical and scientific terms used herein have the same meaning as commonly understood by one of ordinary skill in the art to which this invention belongs. Although any processes and materials similar or equivalent to those described herein can also be used in the practice or testing of the invention, representative illustrative processes and materials are described herein.

All publications, patents, and patent applications cited in this specification are incorporated herein by reference to the same extent as if each individual publication, patent, or patent application were specifically and individually indicated to be incorporated by reference. Furthermore, each cited publication, patent, or patent application is incorporated herein by reference to disclose and describe the subject matter in connection with which the publications are cited. The citation of any publication is for its disclosure prior to the filing date and should not be construed as an admission that the invention described herein is not entitled to antedate such publication by virtue of prior invention. Further, the dates of publication provided may be different from the actual publication dates, which may need to be independently confirmed.

It should be understood that the expression "at least one of" includes individually each of the recited objects after the expression and the various combinations of two or more of the recited objects unless otherwise understood from the context and use. The expression "and/or" in connection with three or more recited objects should be understood to have the same meaning unless otherwise understood from the context.

It is noted that, as used herein and in the appended claims, the singular forms "a", "an", and "the" include plural references unless the context clearly dictates otherwise. For example, where the plural form is used for compounds, salts, and the like, this is taken to mean also a single compound, salt, or the like. It is further noted that the claims may be drafted to exclude any optional element.

As will be apparent to those of skill in the art upon reading this disclosure, each of the individual embodiments described and illustrated herein has discrete components and features which may be readily separated from or combined with the features of any of the other several embodiments without departing from the scope or spirit of the invention. Any recited process can be carried out in the order of events recited or in any other order, which is logically possible. It should be understood that the order of steps or order for performing certain actions is immaterial so long as the present invention remain operable. Moreover, two or more steps or actions may be conducted simultaneously.

The following examples are put forth to provide those of ordinary skill in the art with a complete disclosure and description of how to make and use the invention and are not intended to limit the scope of what the inventors regard as their invention nor are they intended to represent that the experiments below are all or the only experiments performed. Efforts have been made to ensure accuracy with respect to numbers used (e.g., amounts, temperature, etc.) but some experimental errors and deviations should be accounted for.

EXAMPLES

Example 1

Figure 5:
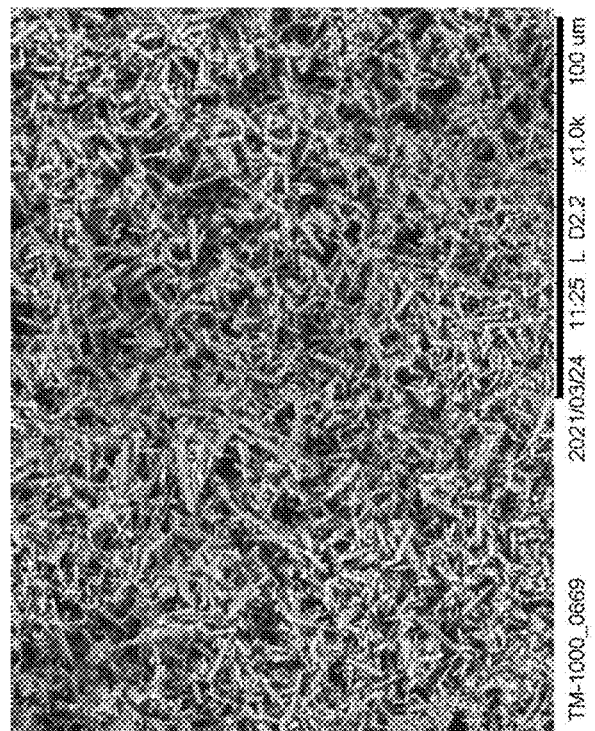
FIG. 5 illustrates SEM images of the aragonitic acicular shaped microstructure, as provided in Example 1 herein.
Figure 5:
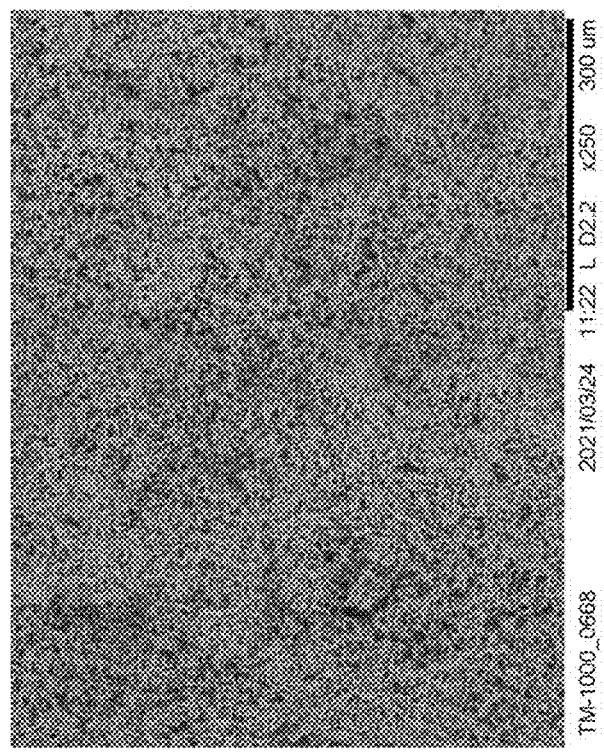

Effect of the Smaller Sized Particles of the Reactive Vaterite Cement on the Morphology of the Cement Product One hundred grams of reactive vaterite cement with a median size of 7.2 µm was combined with 24.8 g of 0.4 M magnesium nitrate solution. After sitting for 30 seconds, the material was mixed for 30 seconds at low speed in a 5-quart Hobart mixer. After 30 seconds of mixing at medium speed, the blended moist powder was transferred to a disc pelletizer. An additional solution was sprayed onto the tumbling powder in the disc pelletizer until it began to agglomerate. The disk pelletizer was then allowed to run for a sufficient time to achieve the desired size of the aggregate. At which time, the aggregate was dusted with additional reactive vaterite cement until the surface of the aggregates appeared dull or dry. The final water to cement ratio for the aggregate was 0.68. The aggregates were then placed in sealed container and cured for 1 day at 80° C. and 98% relative humidity. The aggregates were then dried at 110° C. until constant mass. The aggregates were then observed via scanning electron microscopy (SEM), which revealed an interlocking acicular shaped aragonite microstructure. The phase composition of the lightweight aggregate was then determined to be 0.1% vaterite, 92.6% aragonite, and 7.3% calcite via quantitative x-ray diffraction. FIG. 5 shows the interlocking acicular shaped aragonite microstructure formed from the reactive vaterite cement with a median size of 7.2 µm. The image on the left side is 250× magnification and the image on the right is 1000× magnification. The aggregate was found to contain less voids or less honeycomb structure due to relatively homogenous distribution of the acicular aragonite because of the smaller size particles of the reactive vaterite cement.

Example 2

Effect of the Larger Sized Particles of the Reactive Vaterite Cement on the Morphology and the Bulk Density of the Cement Product Ten kilograms of reactive vaterite cement with a median size of 16.1 µm was combined with 2,500 g of 0.1 M magnesium nitrate and 0.05 M strontium nitrate solution in 500 g batches of cement. The material was mixed for 30 seconds at low speed followed by 60 seconds at medium speed in a 5-quart Hobart mixer. The blended moist powder was then transferred to a disc pelletizer. An additional solution was sprayed onto the tumbling powder in the disc pelletizer until it began to agglomerate. The disk pelletizer was then allowed to run for a sufficient time to achieve the desired size of the aggregate. At which time, the aggregate was dusted with additional reactive vaterite cement until the surface of the aggregates appeared dull or dry. The final water to cement ratio for the aggregate was 0.25. The aggregate was then placed in sealed containers and cured for 3 days at 80° C. and 98% relative humidity. The aggregates were then dried at 110° C. until constant mass. The aggregates were then observed via SEM, which revealed an interlocking acicular shaped aragonite microstructure. The phase composition of the lightweight aggregate was then determined to be 3.9% vaterite, 95.2% aragonite, and 0.9% calcite via quantitative x-ray diffraction. Sieve analysis showed that the lightweight aggregate had 99.3, 36.3, and 0.3% passing the 19, 9.5, and 4.75 mm sieves, respectively. The lightweight aggregate produced met the gradation requirements for 19.0 to 4.75 mm lightweight aggregate for structural concrete according to ASTM C330. The dry loose bulk density was 54.6 lbft$^3$, which was less than the maximum dry loose bulk density of 55 lb/ft$^3$ for lightweight coarse aggregate specified by ASTM C330.

FIG. 6 shows the interlocking acicular shaped aragonite microstructure as well as the voids surrounded by the aciculars (forming a honeycomb like structure) formed from the reactive vaterite cement with a median size of 16.1 μm. The image on the left side is 2500× magnification of the core of the aggregate and the image on the right is 2500× magnification of the surface of the aggregate.

Example 3

Effect of the Bimodal Distribution on the Flow and Strength of the Cement Blends Binary cement mortars were mixed and cast according to ASTM C305 and C109. The sand to cement ratio was 2.75, and the water to cementitious materials ratio was 0.485. The Portland cement utilized conformed to ASTM C150 as a Type II/V cement. Twenty percent of the cementitious material was replaced by the reactive vaterite cement. The five binary cement blends tested are presented in Table 1. All cementitious materials were preblended to uniformity prior to mixing. The mixing procedure was to combine the cement blend and water in a 5-quart Hobart stand mixer and mix on low for 30 seconds. The sand was then introduced over 30 seconds while continuing to mix on low. The speed was then increased to medium for 30 seconds. The mixer was then stopped for 90 seconds and scrapped down for 15 seconds loosening any material stuck to the mixing bowl and paddle. After scraping down, the mixer bowl was covered until mixing resumed for 1 additional minute at medium speed. The mortar was then immediately tested for flow according to ASTM C1437, then remixed at medium for 15 seconds before casting 2" mortar cubes. The mortar cubes were then stored at 23° C. and 98% relative humidity. After 24 hours of curing the mortars were demolded and moved to a saturated lime bath until testing at 3, 7, 28, and 56 days for compressive strength according to ASTM C109. Three mortar cubes were tested at each age.

TABLE 1

Binary mortar mixes containing unimodal and bimodal particle distribution

| Mix # | Portland cement (g) | 5 μm Reactive vaterite (g) | 16 μm Reactive vaterite (g) | Sand (g) | Water (g) |
|---|---|---|---|---|---|
| 1 | 400 | 100 | 0 | 1375 | 242 |
| 2 | 400 | 75 | 25 | 1375 | 242 |
| 3 | 400 | 50 | 50 | 1375 | 242 |
| 4 | 400 | 25 | 75 | 1375 | 242 |
| 5 | 400 | 0 | 100 | 1375 | 242 |

Figure 7:
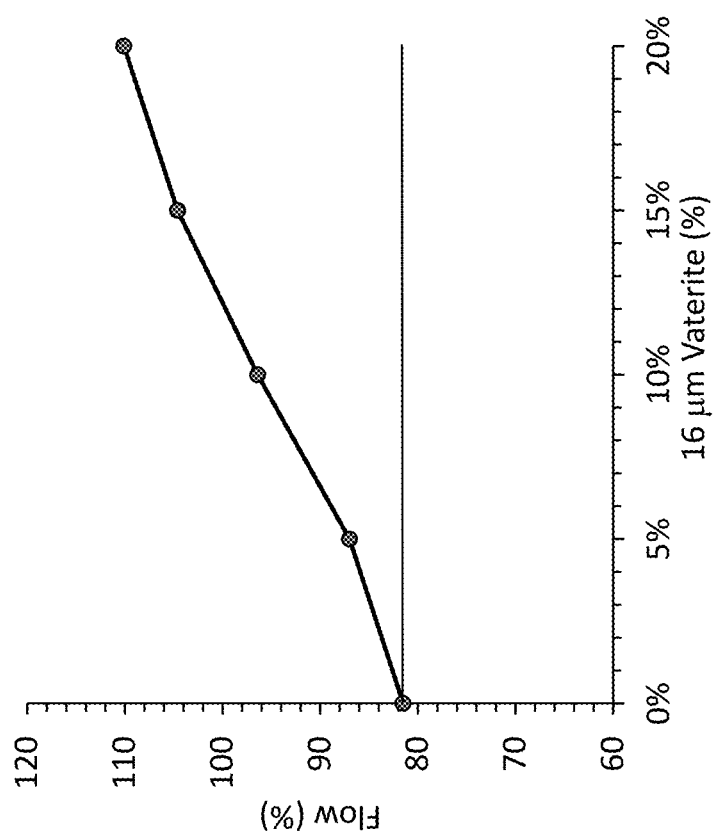
FIG. 7 illustrates the effect of the bimodal distribution on the flow of the mortar, as described in Example 3 herein.
Figure 8:
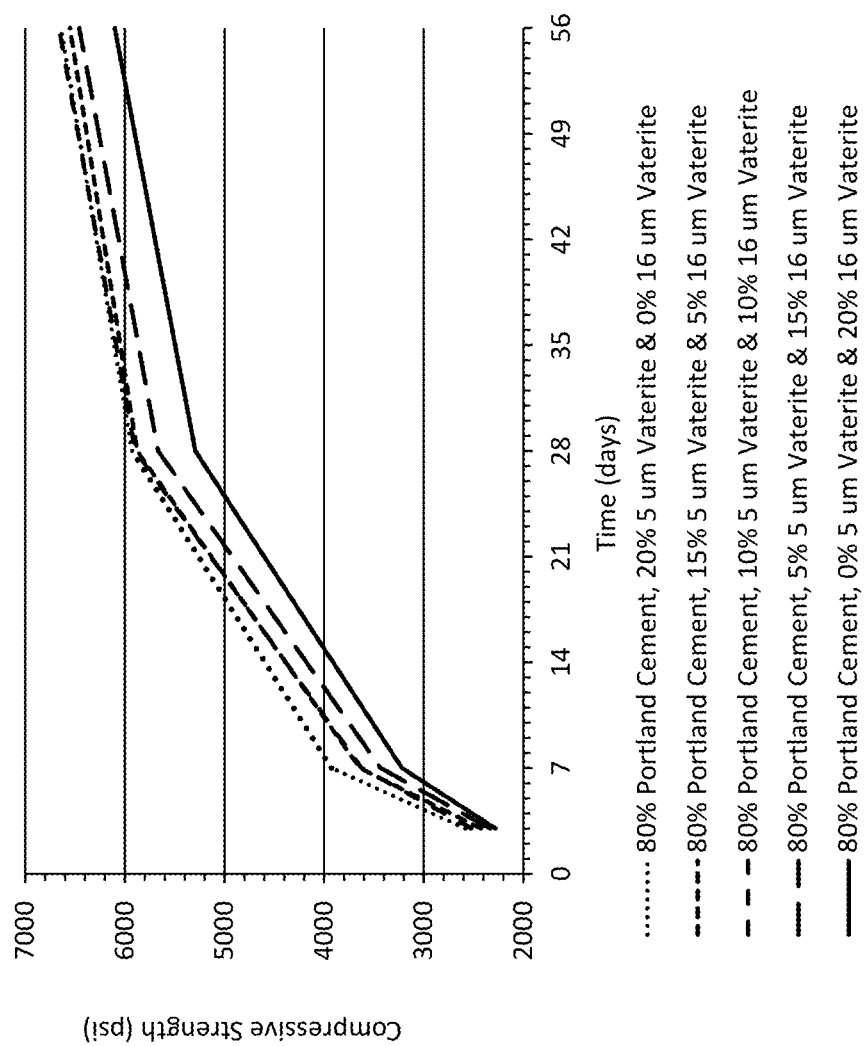
FIG. 8 illustrates the effect of the bimodal distribution on the compressive strength, as described in Example 3 herein.

As is shown in FIG. 7, in binary cement blends containing up to 20 percent reactive vaterite cement, the flow of the resulting mortar increased with increasing quantity of the larger reactive vaterite particle of the size 16 μm. However, as seen in FIG. 8, the strength did not decline in the same consistent manner as the flow increased, rather the bimodal distribution of 5 and 16 μm (or um) reactive vaterite particles produced the same 28-day strength as the mortar that utilized only 5 μm reactive vaterite particles as the vaterite cement component.

Example 4

Effect of the Multi-Modal Distribution on Paste Viscosity and Flow

In this experiment, surface area and particle size of the reactive vaterite cement were varied to test the viscosity of the reactive vaterite cement and Portland cement mixture. The viscosity values were generated by mixing various particle sizes of the reactive vaterite cement with 85% Portland cement at a water to cement mass ratio of 0.485. The viscosity was measured in mPa*s (millipascal-second) at a shear rate of 250 rpm (revolutions per minute) on the downward flow curve using a MCR 92 by Anton Par. The particle size used for the model was the median particle size as measured by an LA-960 Horiba laser scattering particle size distribution analyzer. Surface area was measured by a Gemini V BET by Micromeritics. Porosity was measured by an AccuPyc II 1340 pycnometer by Micromeritics. The 100% Portland cement had a viscosity of approximately 1,600 mPa*s.

The reactive vaterite cement (Vat.) of differing particle sizes were blended with Portland cement (PC) as shown in Table 2. The bimodal distribution of the reactive vaterite cement with Portland cement is shown as blended compositions B1-B6 in Table 2. Cement pastes were prepared by mixing the cement blend with half of the water for 60 seconds at 600 rpm, then the remainder of the water was added, and the cement paste was mixed at 1200 rpm for an additional 90 seconds. The prepared paste was then transferred to the rheometer (MCR 92 by Anton Par). The reactive vaterite surface areas were measured in water and the Portland cement surface area was measured in isopropyl alcohol.

TABLE 2

Reactive vaterite cement and Portland cement mixes

| | | Sample Names | | | | | | | | | | | |
|---|---|---|---|---|---|---|---|---|---|---|---|---|---|
| Material | PC | 4 μm Vat. | 7 μm Vat. | 9 μm Vat. | 15 μm Vat. | 17 μm Vat. | 26 μm Vat. | B1 | B2 | B3 | B4 | B5 | B6 |
| 4 μm Vat. | | 15% | | | | | | 2.8% | | 9.5% | 3.8% | | 7.5% |
| 7 μm Vat. | | | 15% | | | | | 5.7% | 7.5% | | 3.8% | 6.0% | |
| 9 μm Vat. | | | | 15% | | | | | | | | | |
| 15 μm Vat. | | | | | 15% | | | | | | | | |
| 17 μm Vat. | | | | | | 15% | | 6.6% | 7.5% | 5.5% | 7.5% | 9.0% | 7.5% |
| 26 μm Vat. | | | | | | | 15% | | | | | | |
| PC | 100% | 85% | 85% | 85% | 85% | 85% | 85% | 85% | 85% | 85% | 85% | 85% | 85% |

Figure 9:
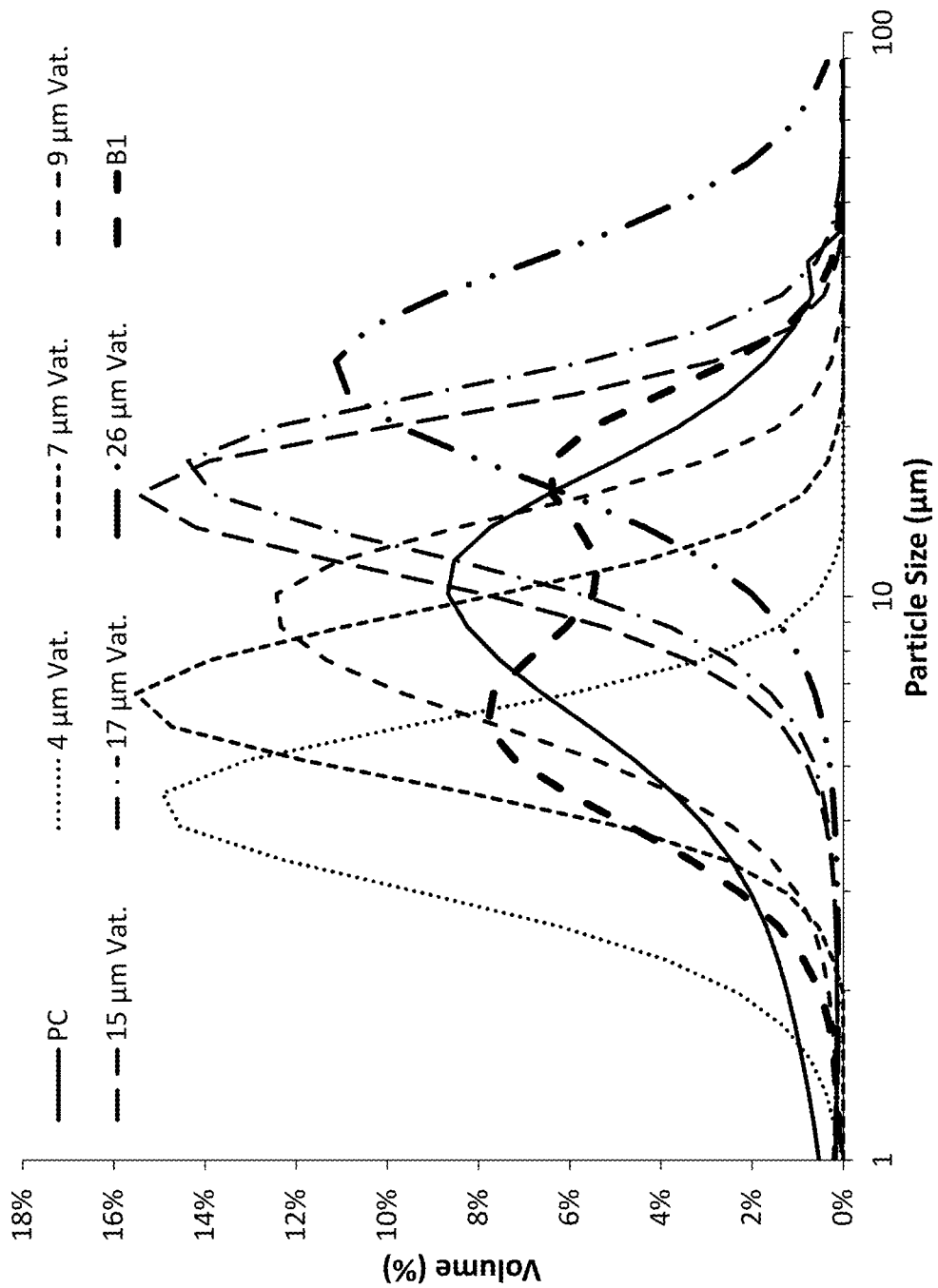
FIG. 9 illustrates particle size distribution of the Portland cement; unimodal reactive vaterite mixes used to create the blended cement mixes; and multi-modal blend (B1), as described in Example 4.

The particle size distribution of the Portland cement; the unimodal reactive vaterite mixes with the PC to create the blended cement mixes; and the bimodal blend (B1) are demonstrated in FIG. 9.

Figure 10:
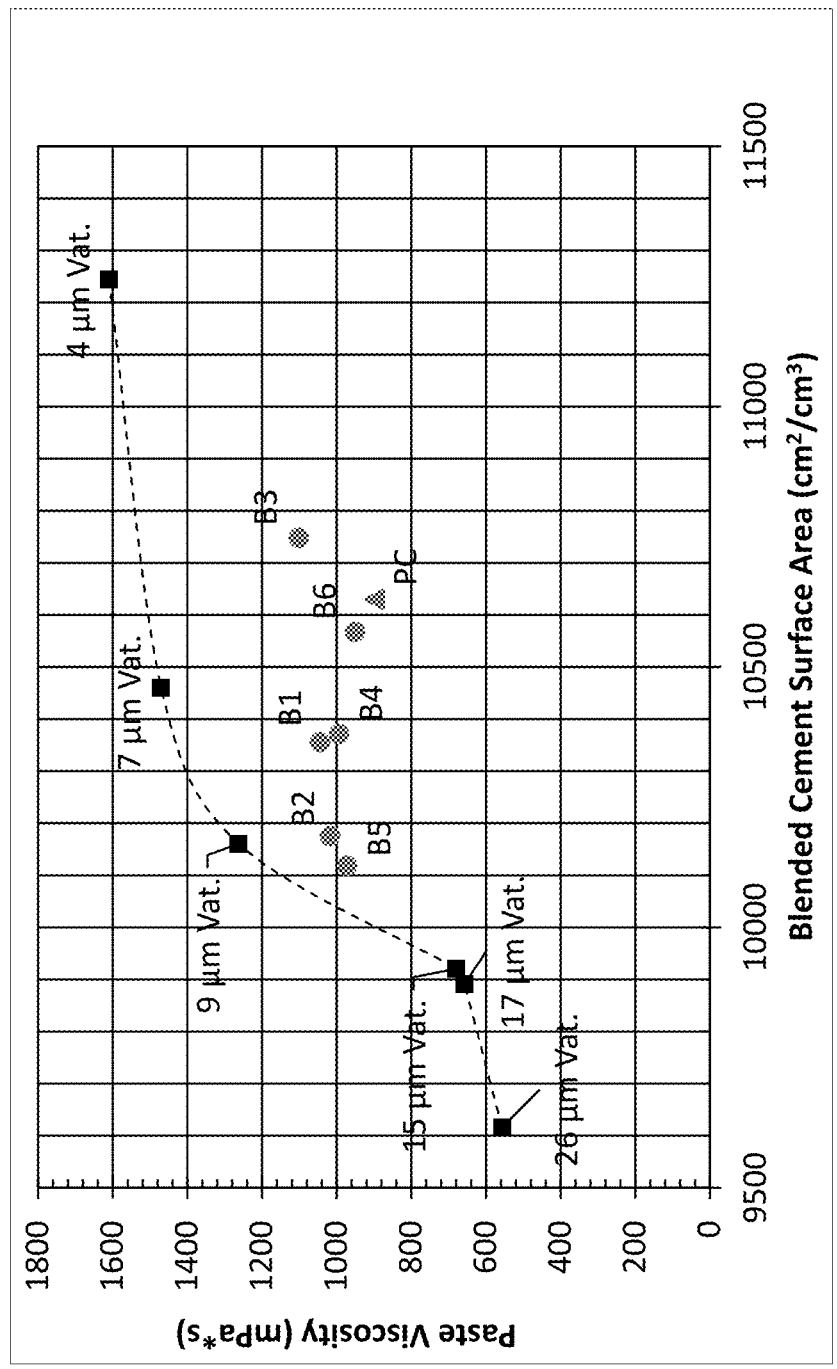
FIG. 10 illustrates the paste viscosity as a function of the blended cement surface area, as described in Example 4.

FIG. 10 demonstrates the paste viscosity as a function of the blended cement surface area. The unimodal reactive vaterite cement blends with the PC (4, 7, 9, 15, 17 and 26 μm Vat.) are marked with squares and the dotted line in FIG. 10. For the unimodal distribution of the reactive vaterite cement particles, the paste viscosity increased with increasing surface area (or decreasing particle size). However, it was found that when the reactive vaterite particles were combined in the bimodal distribution (e.g., the reactive vaterite cement A having an average particle size of between about 0.1-10 μm and the reactive vaterite cement B having an average particle size of between about 11-50 μm) to create blends (B1, B2, B3, B4, B5, and B6) (marked with round dots in FIG. 10), the blends had lower paste viscosity than their surface areas would indicate if the pastes were produced using the unimodal reactive vaterite. For instance, the bimodal blend B6 had a blended cement paste viscosity of 951 mPa*s, but if the paste had been produced from the unimodal vaterite, the paste viscosity would be 1500 mPa*s. Lower paste viscosities are related to higher flows in mortars and higher slumps in concrete.

Additionally, it was also found that the more the surface area in the reactive vaterite cement particles present in the blended cement, the more the surface area was available to nucleate calcium silicate hydrate (C-S-H) of the PC. The more calcium silicate hydrate that nucleated, the faster the PC dissolved and produced strength in the blended cement composite. The acceleratory effect of the reactive vaterite cement particle's bimodal or multimodal distribution on the PC hydration enabled the blended cement composites to be produced that had similar workability or the paste viscosity or the flow to their Portland cement control (100% Portland cement), while providing additional surface area for C-S-H formation and strength enhancement, compared to the blended cement produced with the unimodal reactive vaterite cement particles.

Although the foregoing invention has been described in some detail by way of illustration and example for purposes of clarity of understanding, it should be readily apparent to those of ordinary skill in the art in light of the teachings of this invention that certain changes and modifications may be made thereto without departing from the spirit or scope of the appended claims. Accordingly, the preceding merely illustrates the principles of the invention. It will be appreciated that those skilled in the art will be able to devise various arrangements, which, although not explicitly described or shown herein, embody the principles of the invention, and are included within its spirit and scope. Furthermore, all examples and conditional language recited herein are principally intended to aid the reader in understanding the principles of the invention and the concepts contributed by the inventors to furthering the art and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the invention, therefore, is not intended to be limited to the exemplary embodiments shown and described herein. It is intended that the following claims define the scope of the invention and that methods and structures within the scope of these claims and their equivalents be covered thereby.

What is claimed is:

1. A cement composition, comprising: a bimodal distribution of reactive vaterite cement comprising reactive vaterite cement A having an average particle size of between about 0.1-10 μm and reactive vaterite cement B having an average particle size of between about 11-50 μm.

2. The cement composition of claim 1, further comprising reactive vaterite cement C having an average particle size of between about 51-100 μm in a trimodal distribution.

3. The cement composition of claim 1, wherein the reactive vaterite cement A is between about 5-95% by weight in the composition and the reactive vaterite cement B is between about 5-95% by weight in the composition.

4. The cement composition of claim 1, wherein the composition increases packing density of cement paste in water by between about 1-35%.

5. The cement composition of claim 1, wherein the composition reduces viscosity of cement paste in water by between about 10-50%.

6. The cement composition of claim 1, wherein the composition provides paste viscosity in water of between about 800-1600 mPa*s.

7. The cement composition of claim 1, wherein ratio of the reactive vaterite cement A:reactive vaterite cement B is between about 1:20-20:1.

8. The cement composition of claim 1, wherein the reactive vaterite cement A has a specific surface area of between about 4,000-40,000 m2/kg and the reactive vaterite cement B has a specific surface area of between about 100-6,000 m2/kg.

9. The cement composition of claim 1, further comprising Portland cement to form a blended cement composition.

10. The cement composition of claim 9, wherein the reactive vaterite cement A having a specific surface area of between about 4,000-40,000 m2/kg provides high surface area to nucleate calcium silicate hydrate and dissolve Portland cement in water.

11. The cement composition of claim 9, wherein the bimodal distribution in the blended cement composition provides paste viscosity in water of between about 800-1600 mPa*s.

12. The cement composition of claim 1, further comprising slag from metal production, Portland cement clinker, calcium aluminate cement clinker, and/or calcium sulfoaluminate cement clinker.

13. A cement paste or cement slurry composition, comprising: reactive vaterite cement A having an average particle size of between about 0.1-10 μm; reactive vaterite cement B having an average particle size of between about 11-50 μm; water; and interlocking acicular shaped aragonite.

14. The cement paste or cement slurry composition of claim 13, further comprising Portland cement.

15. The cement paste or cement slurry composition of claim 14, wherein the reactive vaterite cement A having a specific surface area of between about 4,000-40,000 m2/kg provides high surface area to nucleate calcium silicate hydrate and dissolve Portland cement in water.

16. The cement paste or cement slurry composition of claim 13, wherein the reactive vaterite cement A and the reactive vaterite cement B provides paste viscosity of between about 800-1600 mPa*s.

17. A method of producing a cement composition, comprising:
(a) calcining limestone to form a mixture comprising lime and a gaseous stream comprising carbon dioxide; (b) dissolving the mixture comprising lime in a N-containing salt solution to produce an aqueous solution comprising calcium salt; and (c) treating the aqueous solution comprising calcium salt with the gaseous stream comprising carbon dioxide to form a composition comprising a bimodal distribution of reactive vaterite cement comprising reactive vaterite cement A having an average particle size of between about 0.1-10 μm and reactive vaterite cement B having an average particle size of between about 11-50 μm.

18. The method of claim 17, further comprising adding water to the cement composition and transforming the reactive vaterite cement A and the reactive vaterite cement B to interlocking acicular shaped aragonite upon dissolution and re-precipitation in water.

19. The method of claim 17, wherein the reactive vaterite cement A and/or the reactive vaterite cement B improves packing density of cement paste in water by between about 1-35% and/or reduces viscosity of cement paste in water by between about 10-50%.

20. The method of claim 18, further comprising setting and hardening of the interlocking acicular shaped aragonite and forming a cement product.

* * * * *